US011516077B2

(12) United States Patent
Hankins et al.

(10) Patent No.: US 11,516,077 B2
(45) Date of Patent: Nov. 29, 2022

(54) DEPLOYMENT OF NETWORK-RELATED FEATURES OVER CLOUD NETWORK

(71) Applicant: Cradlepoint, Inc., Boise, ID (US)

(72) Inventors: Scott Andrew Hankins, Cupertino, CA (US); Michael A. Cartsonis, Sunnyvale, CA (US); Andrew John Mastracci, Kelowna (CA)

(73) Assignee: Cradlepoint, Inc., Boise, ID (US)

( * ) Notice: Subject to any disclaimer, the term of this patent is extended or adjusted under 35 U.S.C. 154(b) by 183 days.

(21) Appl. No.: 17/017,555

(22) Filed: Sep. 10, 2020

(65) Prior Publication Data
US 2020/0412610 A1 Dec. 31, 2020

Related U.S. Application Data

(63) Continuation of application No. 16/277,926, filed on Feb. 15, 2019, now Pat. No. 10,819,569, which is a continuation of application No. 16/128,985, filed on Sep. 12, 2018, now Pat. No. 10,637,729, which is a continuation of application No. 13/831,306, filed on Mar. 14, 2013, now Pat. No. 10,135,677, which is a continuation-in-part of application No. 13/829,611, filed on Mar. 14, 2013, now Pat. No. 10,110,417, which is a continuation-in-part of application No. 13/802,529, filed on Mar. 13, 2013, now Pat. No. 10,177,957, which is a continuation-in-part of application No. 13/747,371, filed on Jan. 22, 2013, now abandoned, which is a continuation-in-part of application No. 13/675,552, filed on Nov. 13, 2012, (Continued)

(51) Int. Cl.
| | |
|---|---|
| H04L 41/0806 | (2022.01) |
| H04L 12/46 | (2006.01) |
| H04L 12/18 | (2006.01) |
| H04L 9/40 | (2022.01) |

(52) U.S. Cl.
CPC ...... *H04L 41/0806* (2013.01); *H04L 12/1886* (2013.01); *H04L 12/4633* (2013.01); *H04L 12/4641* (2013.01); *H04L 63/0272* (2013.01)

(58) Field of Classification Search
CPC ... H04L 12/46; H04L 12/4625; H04L 12/467; H04L 12/4633; H04L 12/4641; H04L 45/66; H04L 45/64; H04L 41/0893; H04L 41/5051; H04L 41/5054; H04L 49/70; H04L 49/351; H04L 49/354; H04L 61/6022; H04L 63/0272
See application file for complete search history.

(56) References Cited

U.S. PATENT DOCUMENTS

| | | |
|---|---|---|
| 5,430,730 A | 7/1995 | Sepulveda-Garese |
| 5,548,646 A | 8/1996 | Aziz |

(Continued)

OTHER PUBLICATIONS

Aerohive Networks—"Aerohive Demonstrates Industry First Bonjour Gateway to Enable Apple AirPlay and Apple AirPrint Across Multi-subnet Enterprise Networks", Sunnyvale, CA, Mar. 5, 2012, 3 pages, Doc 2002.

(Continued)

*Primary Examiner* — Tae K Kim
(74) *Attorney, Agent, or Firm* — Berkeley Law & Technology Group, LLP

(57) ABSTRACT

Briefly, methods and/or apparatuses of virtual deployment of network-related features are disclosed.

21 Claims, 10 Drawing Sheets

Related U.S. Application Data now Pat. No. 10,880,162, which is a continuation-in-part of application No. 13/543,729, filed on Jul. 6, 2012, now Pat. No. 9,118,495.

(56) References Cited

U.S. PATENT DOCUMENTS

| | | |
|---|---|---|
| 5,968,126 A | 10/1999 | Ekstrom |
| 6,041,166 A | 3/2000 | Hart |
| 6,055,568 A | 4/2000 | Adams |
| 6,195,347 B1 | 2/2001 | Sehgal |
| 6,209,033 B1 | 3/2001 | Datta |
| 6,269,404 B1 | 7/2001 | Hart |
| 6,286,038 B1 | 9/2001 | Reichmeyer |
| 6,442,169 B1 | 8/2002 | Lewis |
| 6,457,061 B1 | 9/2002 | Bal |
| 6,487,600 B1 | 11/2002 | Lynch |
| 6,516,417 B1 | 2/2003 | Pegrum |
| 6,594,272 B1 | 7/2003 | Ketcham |
| 6,609,153 B1 | 8/2003 | Salkewicz |
| 6,614,774 B1 | 9/2003 | Wang |
| 6,640,251 B1 | 10/2003 | Wiget |
| 6,680,945 B1 | 1/2004 | Merchant |
| 6,717,919 B1 | 4/2004 | Ketcham |
| 6,781,982 B1 | 8/2004 | Borella |
| 6,826,182 B1 | 11/2004 | Parthasarathy |
| 6,847,620 B1 | 1/2005 | Meier |
| 6,877,041 B2 | 4/2005 | Sullivan |
| 6,937,566 B1 | 8/2005 | Forslow |
| 6,954,459 B1 | 10/2005 | Vaidhyanathan et al. |
| 7,000,012 B2 | 2/2006 | Moore |
| 7,000,015 B2 | 2/2006 | Moore |
| 7,000,079 B2 | 2/2006 | Moore |
| 7,039,687 B1 | 5/2006 | Jamieson |
| 7,043,540 B2 | 5/2006 | Moore |
| 7,072,964 B1 | 7/2006 | Whittle |
| 7,119,713 B2 | 10/2006 | Shuey |
| 7,154,861 B1 | 12/2006 | Merchant |
| 7,194,622 B1 | 3/2007 | Halasz |
| 7,320,088 B1 | 1/2008 | Gawali |
| 7,366,894 B1 | 4/2008 | Kalimuthu et al. |
| 7,447,166 B1 * | 11/2008 | Kaluve .................... H04L 12/66 370/254 |
| 7,480,710 B1 | 1/2009 | Olson |
| 7,519,056 B2 | 4/2009 | Ishwar |
| 7,633,948 B2 | 12/2009 | Yokomitsu |
| 7,644,437 B2 | 1/2010 | Volpano |
| 7,743,155 B2 | 6/2010 | Pisharody |
| 7,760,632 B2 * | 7/2010 | Yano .................... H04L 49/354 370/230.1 |
| 7,774,837 B2 | 8/2010 | McAllister |
| 7,894,432 B2 | 2/2011 | Rana |
| 7,937,471 B2 | 5/2011 | Alkhatib |
| 7,941,837 B1 | 5/2011 | Jiang |
| 7,954,145 B2 | 5/2011 | Mohanty |
| 7,961,725 B2 | 6/2011 | Nagarajan |
| 8,036,664 B2 | 10/2011 | Khetawat |
| 8,041,824 B1 | 10/2011 | Maeng |
| 8,116,226 B1 | 2/2012 | Liao |
| 8,150,397 B2 | 4/2012 | Khetawat |
| 8,159,986 B2 | 4/2012 | Yun |
| 8,170,037 B2 | 5/2012 | Polcha |
| 8,189,600 B2 | 5/2012 | Jabr |
| 8,204,502 B2 | 6/2012 | Khetawat |
| 8,228,818 B2 | 7/2012 | Chase |
| 8,230,051 B1 | 7/2012 | Zahavi |
| 8,234,361 B2 * | 7/2012 | Krywaniuk .......... H04L 63/0227 710/60 |
| 8,327,437 B2 | 12/2012 | McAllister |
| 8,422,380 B2 | 4/2013 | Gaskill |
| 8,428,049 B2 | 4/2013 | Gass |
| 8,477,775 B2 | 7/2013 | Choudhary |
| 8,595,359 B2 | 11/2013 | Shaffer |
| 8,619,771 B2 | 12/2013 | Lambeth |
| 8,644,188 B1 | 2/2014 | Brandwine |
| 8,660,129 B1 | 2/2014 | Brendel |
| 8,725,860 B1 | 5/2014 | Voltmer |
| 8,862,725 B1 | 10/2014 | Voltmer |
| 8,892,696 B1 | 11/2014 | Thai |
| 8,938,470 B1 | 1/2015 | Kumbhari et al. |
| 8,966,027 B1 | 2/2015 | Brandwine |
| 9,032,077 B1 | 5/2015 | Klein |
| 9,118,495 B1 | 8/2015 | Hankins |
| 9,154,327 B1 | 10/2015 | Marino |
| 9,306,910 B2 | 4/2016 | Lambeth |
| 9,356,833 B2 | 5/2016 | Xu |
| 9,392,313 B2 | 7/2016 | Bugenhagen |
| 9,888,097 B2 | 2/2018 | Lambeth |
| 9,900,410 B2 | 2/2018 | Dalal |
| 9,906,429 B2 | 2/2018 | Johnsen |
| 9,973,415 B2 | 5/2018 | Cheng |
| 9,992,062 B1 | 6/2018 | Hankins |
| 10,091,065 B1 | 10/2018 | Gast |
| 10,103,980 B1 | 10/2018 | Tiwari |
| 10,110,417 B1 | 10/2018 | Hankins |
| 10,135,677 B1 | 11/2018 | Hankins |
| 10,177,957 B1 | 1/2019 | Hankins |
| 10,326,652 B2 | 6/2019 | Hankins |
| 10,389,583 B2 | 8/2019 | Hankins |
| 10,505,989 B2 | 12/2019 | Hankins |
| 10,560,343 B1 | 2/2020 | Cartsonis |
| 10,601,653 B2 | 3/2020 | Hankins |
| 10,637,729 B2 | 4/2020 | Hankins |
| 10,764,110 B2 | 9/2020 | Hankins |
| 10,819,569 B2 | 10/2020 | Hankins |
| 10,880,162 B1 | 12/2020 | Hankins |
| 10,892,955 B1 | 1/2021 | Cartsonis |
| 10,985,968 B2 | 4/2021 | Hankins |
| 11,184,230 B2 | 11/2021 | Hankins et al. |
| 2001/0042131 A1 | 11/2001 | Mathon |
| 2001/0047407 A1 | 11/2001 | Moore |
| 2002/0012327 A1 | 1/2002 | Okada |
| 2002/0032780 A1 | 3/2002 | Moore |
| 2002/0057684 A1 | 5/2002 | Miyamoto |
| 2002/0065906 A1 | 5/2002 | Davidson |
| 2002/0097732 A1 | 7/2002 | Worster |
| 2003/0009540 A1 | 1/2003 | Benfield |
| 2003/0030662 A1 | 2/2003 | Poisson |
| 2003/0041136 A1 | 2/2003 | Cheline |
| 2003/0051195 A1 | 3/2003 | Bosa |
| 2003/0069958 A1 | 4/2003 | Lava |
| 2003/0140131 A1 * | 7/2003 | Chandrashekhar ......................... H04L 63/0272 709/223 |
| 2003/0198208 A1 | 10/2003 | Koos |
| 2003/0200295 A1 | 10/2003 | Roberts |
| 2004/0017816 A1 * | 1/2004 | Ishwar .................... H04L 41/00 370/392 |
| 2004/0032856 A1 | 2/2004 | Sandstrom |
| 2004/0057430 A1 | 3/2004 | Paavolainen |
| 2004/0133689 A1 | 7/2004 | Vasisht |
| 2004/0156345 A1 | 8/2004 | Steer |
| 2004/0210649 A1 | 10/2004 | Bhogal |
| 2004/0221026 A1 | 11/2004 | Dorland |
| 2004/0228290 A1 | 11/2004 | Graves |
| 2004/0252722 A1 | 12/2004 | Wybenga |
| 2004/0261116 A1 | 12/2004 | McKeown |
| 2005/0025160 A1 | 2/2005 | Meier |
| 2005/0076339 A1 * | 4/2005 | Merril .................... H04L 47/70 718/104 |
| 2005/0154790 A1 * | 7/2005 | Nagata .................... H04L 45/00 709/223 |
| 2005/0190705 A1 | 9/2005 | Moore |
| 2005/0193103 A1 | 9/2005 | Drabik |
| 2005/0193127 A1 | 9/2005 | Moore |
| 2005/0208947 A1 | 9/2005 | Bahl |
| 2005/0283822 A1 | 12/2005 | Appleby et al. |
| 2005/0288961 A1 | 12/2005 | Tabrizi |
| 2006/0005185 A1 | 1/2006 | Nguyen |
| 2006/0184998 A1 | 8/2006 | Smith |
| 2006/0215582 A1 | 9/2006 | Castagnoli |
| 2006/0221913 A1 | 10/2006 | Hermel |
| 2006/0245373 A1 | 11/2006 | Bajic |
| 2006/0262771 A1 | 11/2006 | Martinez et al. |

(56) References Cited

U.S. PATENT DOCUMENTS

| | | |
|---|---|---|
| 2007/0047557 A1 | 3/2007 | Martini |
| 2007/0070937 A1 | 3/2007 | Demirhan |
| 2007/0121565 A1 | 5/2007 | Halasz |
| 2007/0127461 A1 | 6/2007 | Yamada |
| 2007/0168547 A1* | 7/2007 | Krywaniuk ......... H04L 63/0227 |
| | | 709/238 |
| 2007/0195800 A1 | 8/2007 | Yang |
| 2007/0201375 A1 | 8/2007 | Hallinan |
| 2007/0234419 A1 | 10/2007 | Shouno |
| 2007/0271606 A1 | 11/2007 | Amann |
| 2007/0275701 A1 | 11/2007 | Jonker |
| 2008/0034077 A1 | 2/2008 | Takashige |
| 2008/0046435 A1 | 2/2008 | Watson |
| 2008/0049777 A1 | 2/2008 | Morrill |
| 2008/0076419 A1 | 3/2008 | Khetawat |
| 2008/0089334 A1 | 3/2008 | Soja-Molloy |
| 2008/0080508 A1 | 4/2008 | Das |
| 2008/0101366 A1 | 5/2008 | Venkitaraman |
| 2008/0101367 A1 | 5/2008 | Weinman |
| 2008/0104215 A1 | 5/2008 | Excoffier |
| 2008/0114863 A1 | 5/2008 | Baskey |
| 2008/0144625 A1 | 6/2008 | Wu |
| 2008/0148379 A1 | 6/2008 | Xu |
| 2008/0183853 A1 | 7/2008 | Manion |
| 2008/0298367 A1 | 12/2008 | Furukawa |
| 2009/0034431 A1 | 2/2009 | Nagarajan |
| 2009/0046714 A1 | 2/2009 | Holmer |
| 2009/0059930 A1 | 3/2009 | Ryan |
| 2009/0086742 A1 | 4/2009 | Ghai |
| 2009/0106394 A1 | 4/2009 | Lin |
| 2009/0119256 A1 | 5/2009 | Waters |
| 2009/0129386 A1 | 5/2009 | Rune |
| 2009/0138620 A1 | 5/2009 | Johnson |
| 2009/0213859 A1* | 8/2009 | De Silva ............. H04L 12/4625 |
| | | 370/395.53 |
| 2009/0300750 A1 | 12/2009 | Chou |
| 2009/0303880 A1 | 12/2009 | Maltz et al. |
| 2009/0310610 A1 | 12/2009 | Sandstrom |
| 2010/0023958 A1 | 1/2010 | Bugenhagen |
| 2010/0054260 A1 | 3/2010 | Pandey et al. |
| 2010/0061288 A1 | 3/2010 | Yun |
| 2010/0061724 A1 | 3/2010 | Sun |
| 2010/0077204 A1 | 3/2010 | Kawano |
| 2010/0180014 A1 | 7/2010 | Kannan |
| 2010/0199188 A1 | 8/2010 | Abu-Hakima |
| 2010/0290398 A1 | 11/2010 | Choudhary |
| 2010/0290445 A1 | 11/2010 | Ankaiah |
| 2010/0299385 A1 | 11/2010 | Root |
| 2010/0322251 A1 | 12/2010 | Li |
| 2011/0019674 A1 | 1/2011 | Iovanna |
| 2011/0122834 A1 | 5/2011 | Walker |
| 2011/0158208 A1 | 6/2011 | Solanki |
| 2011/0160879 A1 | 6/2011 | Gutha |
| 2011/0162060 A1 | 6/2011 | Vijayakumar |
| 2011/0231543 A1 | 9/2011 | Akazawa |
| 2011/0252230 A1 | 10/2011 | Segre |
| 2011/0261828 A1* | 10/2011 | Smith ..................... H04L 49/70 |
| | | 370/401 |
| 2011/0320640 A1 | 12/2011 | Butler |
| 2012/0014387 A1* | 1/2012 | Dunbar ................. H04L 12/462 |
| | | 370/400 |
| 2012/0051217 A1 | 3/2012 | Lee et al. |
| 2012/0063451 A1 | 3/2012 | Keesara |
| 2012/0079090 A1 | 3/2012 | Johnsen et al. |
| 2012/0173694 A1 | 7/2012 | Yan |
| 2012/0315882 A1 | 12/2012 | Chang |
| 2012/0323947 A1 | 12/2012 | Bice |
| 2013/0018994 A1 | 1/2013 | Flavel |
| 2013/0044629 A1* | 2/2013 | Biswas ................. H04L 49/356 |
| | | 370/254 |
| 2013/0044763 A1 | 2/2013 | Koponen |
| 2013/0060966 A1 | 3/2013 | Moisiadis |
| 2013/0086280 A1 | 4/2013 | James |
| 2013/0103827 A1 | 4/2013 | Dunlap et al. |
| 2013/0114465 A1 | 5/2013 | McGovern |
| 2013/0121154 A1 | 5/2013 | Guay |
| 2013/0121209 A1 | 5/2013 | Padmanabhan |
| 2013/0163594 A1* | 6/2013 | Sharma ................... H04L 45/66 |
| | | 370/392 |
| 2013/0182712 A1 | 7/2013 | Aguayo |
| 2013/0250951 A1* | 9/2013 | Koganti ............. H04L 61/5007 |
| | | 370/392 |
| 2013/0276090 A1 | 10/2013 | Kopti |
| 2013/0287022 A1 | 10/2013 | Banavalikar |
| 2013/0287026 A1 | 10/2013 | Davie |
| 2013/0311778 A1 | 11/2013 | Cherukuri |
| 2013/0347072 A1 | 12/2013 | Dinha |
| 2014/0040750 A1 | 2/2014 | Kamath |
| 2014/0112343 A1 | 4/2014 | Lambeth |
| 2014/0133354 A1* | 5/2014 | Scharf ..................... H04L 12/46 |
| | | 370/254 |
| 2014/0153572 A1* | 6/2014 | Hampel ................. H04L 45/64 |
| | | 370/392 |
| 2014/0226652 A1 | 8/2014 | Rao |
| 2014/0244847 A1 | 8/2014 | Pouyllau |
| 2014/0282850 A1 | 9/2014 | Mattes |
| 2015/0106913 A1 | 4/2015 | Wang |
| 2015/0365281 A1* | 12/2015 | Marino ............... H04L 63/0485 |
| | | 713/150 |
| 2016/0294638 A1 | 10/2016 | Masuda |
| 2018/0139713 A1 | 5/2018 | Shukla |
| 2018/0324043 A1 | 11/2018 | Hankins |
| 2018/0331902 A1 | 11/2018 | Hankins |
| 2019/0044822 A1 | 2/2019 | Gast |
| 2019/0075011 A1 | 3/2019 | Hankins |
| 2019/0081856 A1 | 3/2019 | Hankins |
| 2019/0158539 A1 | 5/2019 | Hankins |
| 2019/0182099 A1 | 6/2019 | Hankins |
| 2019/0182111 A1 | 6/2019 | Hankins |
| 2019/0238418 A1 | 8/2019 | Aguayo et al. |
| 2019/0268224 A1 | 8/2019 | Hankins |
| 2020/0162513 A1 | 5/2020 | Hankins |
| 2020/0252278 A1 | 8/2020 | Hankins |
| 2020/0412610 A1 | 12/2020 | Hankins |
| 2021/0288866 A1 | 9/2021 | Hankins |
| 2022/0038506 A1 | 2/2022 | Hankins |
| 2022/0045905 A1 | 2/2022 | Hankins |

OTHER PUBLICATIONS

Chowdhury—"A Survey of Network Virtualization", Computer Networks, 54 (2010), pp. 862-876, 15 pages, Doc 2000.

"Domain Definition", 2015 retrieved from https://techterms.com, on Nov. 1, 2015, 1 page, Doc 2003.

Indiana University—"What is a domain?," 2006, retrieved from http://kb.iu.edu/d/aoup on Nov. 1, 2015, 2 pages, Doc 2004.

McQuerry—"CCNA Self-Study (ICND Exam): Extending Switched Networks with Virtual LANs" Dec. 5, 2003, 4 pages, Doc 2005.

Mitchell—"-Subnet" retrieved from http://compnetworking.about.com on Nov. 1, 2015, 3 pages, Doc 2006.

Mitchell—"LAN—Local Area Network" retrieved from http://compnetworking.about.com on Nov. 1, 2015, 3 pages, Doc 2007.

Onsick—"Network Overlays: An Introduction", Network Computing, https://www.networkcomputing.com, published Dec. 2011, retrieved Dec. 16, 2018, 7 pages, Doc 2001.

U.S. Appl. No. 13/543,729 / Preliminary Amendment, dated Sep. 11, 2012, 8 pages, Doc 1033.

U.S. Appl. No. 13/543,729 / Preliminary Amendment, dated Dec. 18, 2012, 17 pages, Doc 1034.

U.S. Appl. No. 13/543,729 / Non-Final Office Action, dated Jan. 9, 2014, 23 pages, Doc 1035.

U.S. Appl. No. 13/543,729 / Applicant Initiated Interview Summary (PTOL-413) dated Feb. 3, 2014, 3 pages, Doc 1036.

U.S. Appl. No. 13/543,729 / Response to Non-Final Office Action filed Apr. 9, 2014, 38 pages, Doc 1037.

U.S. Appl. No. 13/543,729 / Final Office Action dated Apr. 30, 2014, 21 pages, Doc 1038.

U.S. Appl. No. 13/543,729 / Amendment After Final or under 37 CFR 1.312 dated Jun. 30, 2014, 39 pages, Doc 1040.

(56) References Cited

OTHER PUBLICATIONS

U.S. Appl. No. 13/543,729 / Advisory Action dated Jul. 9, 2014, 4 pages, Doc 2025.
U.S. Appl. No. 13/543,729 / Request for Continued Examination and Amendment filed Jul. 16, 2014, 40 pages, Doc 1041.
U.S. Appl. No. 13/543,729 / Notice of Allowance and Notice of Allowability dated Apr. 23, 2015, 48 pages, Doc 1048.
U.S. Appl. No. 13/675,552 / Applicant Response to Pre-Exam Formalities Notice with Replacement Drawings filed Jan. 3, 2013, 12 pages, Doc 1003.
U.S. Appl. No. 13/675,552 / Preliminary Amendment filed Apr. 2, 2013, 6 pages, Doc 1005.
U.S. Appl. No. 13/675,552 / Non-final Rejection dated Oct. 30, 2014, 21 pages, Doc 1043.
U.S. Appl. No. 13/675,552 / Amendment/Request for Reconsideration After Non-final Rejection filed Mar. 2, 2015, 23 pages, Doc 1044.
U.S. Appl. No. 13/675,552 / Final Rejection dated Jun. 8, 2015, 19 pages, Doc 1050.
U.S. Appl. No. 13/675,552 / Request for Continued Examination and Amendment filed Dec. 1, 2015, 35 pages, Doc 1055.
U.S. Appl. No. 13/675,552 / Non-final Rejection dated Jan. 12, 2016, 18 pages, Doc 1056.
U.S. Appl. No. 13/675,552 / Amendment/Request for Reconsideration After Non-final Rejection filed May 12, 2016, 20 pages, Doc 1057.
U.S. Appl. No. 13/675,552 / Final Rejection dated Aug. 17, 2016, 16 pages, Doc 1058.
U.S. Appl. No. 13/675,552 / Request for Continued Examination and Amendment filed Dec. 19, 2016, 23 pages, Doc 1059.
U.S. Appl. No. 13/675,552 / Non-final Rejection dated Apr. 3, 2017, 19 pages, Doc 1060.
U.S. Appl. No. 13/675,552 / Amendment/Request for Reconsideration After Non-final Rejection dated Aug. 3, 2017, 29 pages, Doc 1061.
U.S. Appl. No. 13/675,552 / Final Rejection dated Sep. 26, 2017, 19 pages, Doc 1062.
U.S. Appl. No. 13/675,552 / Response After Final Office Action dated Dec. 26, 2017, 22 pages, Doc 1063.
U.S. Appl. No. 13/675,552 / Advisory Action and After Final Consideration Program Decision dated Jan. 2, 2018, 4 pages, Doc 1064.
U.S. Appl. No. 13/675,552 / Applicant Initiated Interview Summary dated Jan. 24, 2018, 4 pages, Doc 2026.
U.S. Appl. No. 13/675,552 / RCE and Amendment dated Jan. 26, 2018, 22 pages, Doc 1065.
U.S. Appl. No. 13/675,552 / Non-final Rejection dated Mar. 22, 2018, 19 pages, Doc 1066.
U.S. Appl. No. 13/675,552 / Applicant Initiated Interview Summary dated Jun. 29, 2018, 4 pages, Doc 2027.
U.S. Appl. No. 13/675,552 / Amendment/Request for Reconsideration After Non-final Rejection dated Jul. 20, 2018, 21 pages, Doc 1069.
U.S. Appl. No. 13/675,552 / Final Rejection dated Nov. 23, 2018, 16 pages, Doc 1070.
U.S. Appl. No. 13/675,552 / Response After Final Rejection dated Jan. 25, 2019, 22 pages, Doc 1071.
U.S. Appl. No. 13/675,552 / Advisory Action dated Feb. 8, 2019, 4 pages, Doc 1072.
U.S. Appl. No. 13/675,552 / Request for Continued Examination and Amendment dated Feb. 15, 2019, 25 pages, Doc 1073.
U.S. Appl. No. 13/675,552 / Non-final Office Action dated Mar. 14, 2019, 33 pages, Doc 1074.
U.S. Appl. No. 13/675,552 / Amendment filed Jun. 12, 2019, 26 pages, Doc 1075.
U.S. Appl. No. 13/675,552 / Final Office Action dated Sep. 23, 2019, 30 pages, Doc 1076.
U.S. Appl. No. 13/675,552 / Response to Final Office action dated Nov. 22, 2019, 27 pages, Doc 1077.
U.S. Appl. No. 13/675,552 / Advisory Action dated Dec. 2, 2019, 3 pages, Doc 1078.
U.S. Appl. No. 13/675,552 / Request for Continued Examination and Amendment dated Dec. 23, 2019, 30 pages, Doc 2008.
U.S. Appl. No. 13/675,552 / Non-final Office Action dated Feb. 3, 2020, 18 pages, Doc 2011.
U.S. Appl. No. 13/675,552 / Response to Non-final Office Action dated May 1, 2020, 28 pages, Doc 2079.
U.S. Appl. No. 13/675,552 / Final Office Action dated Jun. 18, 2020, 18 pages, Doc 2075.
U.S. Appl. No. 13/675,552 / Request for Continued Examination and Amendment filed Sep. 15, 2020, 22 pages, Doc 2081.
U.S. Appl. No. 13/675,552 / Request for Continued Examination and Amendment filed Sep. 18, 2020, 22 pages, Doc 2076.
U.S. Appl. No. 13/675,552 / Notice of Allowance and Allowability dated Oct. 5, 2020, 11 pages, Doc 2082.
U.S. Appl. No. 13/747,371, filed Jan. 22, 2013, 75 Pages, Doc 1006.
U.S. Appl. No. 13/747,371 / Notice to File Missing Parts and Filing Receipt, Mailed Feb. 15, 2013, 5 Pages, Doc 1007.
U.S. Appl. No. 13/747,371 / Replacement Application Data Sheet filed Mar. 13, 2013, 9 pages, Doc 1008.
U.S. Appl. No. 13/747,371 / Updated Filing Receipt mailed Jun. 13, 2013, 3 pages, Doc 1011.
U.S. Appl. No. 13/747,371 / Non-final Rejection dated Mar. 2, 2015, 31 pages, Doc 1045.
U.S. Appl. No. 13/747,371 / Response to Non-final Rejection filed Aug. 31, 2015, 32 pages, Doc 2028.
U.S. Appl. No. 13/747,371 / Final Rejection dated Nov. 6, 2015, 51 pages, Doc 1079.
U.S. Appl. No. 13/747,371 / Response to Final Office Action and After Final Consideration Program Request dated Jan. 7, 2016, 32 pages, Doc 1080.
U.S. Appl. No. 13/747,371 / Advisory Action and After Final Decision dated Jan. 29, 2016, 17 pages, Doc 1081.
U.S. Appl. No. 13/747,371 / Request for Continued Examination and Amendment filed Mar. 4, 2016, 30 pages, Doc 1082.
U.S. Appl. No. 13/747,371 / Non-Final Rejection dated Aug. 11, 2016, 7 pages, Doc 1083.
U.S. Appl. No. 13/747,371 / Abandonment dated Feb. 23, 2017, 2 pages, Doc 1084.
U.S. Appl. No. 15/348,902 / Preliminary Amendment dated Nov. 10, 2016, 18 pages, Doc 1086.
U.S. Appl. No. 17/144,842, filed Jan. 8, 2021, 84 pages, Doc 2099.
U.S. Appl. No. 17/144,842—Response to Missing Parts and Preliminary Amendment filed Mar. 23, 2021, 39 pages, Doc 2108.
U.S. Appl. No. 13/802,529 / Non-Final Office Action dated 22/2014, 25 pages, Doc 1016.
U.S. Appl. No. 13/802,529 / Response to Non-Final Office Action filed Nov. 5, 2014, 30 pages, Doc 1046.
U.S. Appl. No. 13/802,529 / Final Office Action dated Feb. 19, 2015, 26 pages, Doc 1047.
U.S. Appl. No. 13/802,529 / Request for Continued Examination and Amendment filed Aug. 17, 2015, 27 pages, Doc 1101.
U.S. Appl. No. 13/802,529 / Non-final Office Action dated Dec. 29, 2015, 36 pages, Doc 1102.
U.S. Appl. No. 13/802,529 / Response to Non-final Office Action filed Mar. 24, 2016, 46 pages, Doc 1103.
U.S. Appl. No. 13/802,529 / Final Rejection dated Jul. 14, 2016, 36 pages, Doc 1104.
U.S. Appl. No. 13/802,529 / Response After Final Action dated Oct. 14, 2016, 46 pages, Doc 1105.
U.S. Appl. No. 13/802,529 / Advisory Action dated Nov. 7, 2016, 4 pages, Doc 1106.
U.S. Appl. No. 13/802,529 / Response to Final Action and After Final Pilot program Request dated Dec. 9, 2016, 27 pages, Doc 1107.
U.S. Appl. No. 13/802,529 / Advisory Action dated Dec. 29, 2016, 11 pages, Doc 1108.
U.S. Appl. No. 13/802,529 / Request for Continued Examination and Amendment dated Jan. 6, 2017, 27 pages, Doc 1109.
U.S. Appl. No. 13/802,529 / Non-final Rejection dated Mar. 29, 2017, 36 pages, Doc 1110.

(56) References Cited

OTHER PUBLICATIONS

U.S. Appl. No. 13/802,529 / Amendment/Request for Reconsideration After Non-final Rejection dated Jun. 29, 2017, 26 pages, Doc 1111.
U.S. Appl. No. 13/802,529 / Non-final Rejection dated Feb. 7, 2018, 45 pages, Doc 1112.
U.S. Appl. No. 13/802,529 / Response to Non-final Rejection dated May 4, 2018, 28 pages, Doc 2030.
U.S. Appl. No. 13/802,529 / Terminal Disclaimer dated Aug. 8, 2018, 5 pages, Doc 1115.
U.S. Appl. No. 13/802,529 / Notice of Allowance dated Sep. 5, 2018, 54 pages, Doc 1116.
U.S. Appl. No. 16/192,539 / Applicant Response to Notice of Missing Parts and Preliminary Amendment filed Feb. 7, 2019, 20 pages, Doc 1122.
U.S. Appl. No. 16/192,539 / Non-Final Office Action dated Apr. 1, 2019, 23 pages, Doc 1124.
U.S. Appl. No. 16/192,539 / Amendment and Terminal Disclaimer dated Jun. 27, 2019, 20 pages, Doc 1125.
U.S. Appl. No. 16/192,539 / Notice of Allowance and Notice of Allowability dated Aug. 14, 2019, 44 pages, Doc 1127.
U.S. Appl. No. 16/688,846 / Response to Notice to File Missing Parts and Preliminary Amendment filed Feb. 5, 2020, 21 pages, Doc 2013.
U.S. Appl. No. 16/688,846 / Non-final Office Action dated Jan. 7, 2021, 35 pages, Doc 2102.
U.S. Appl. No. 13/829,611 / Non-Final Office Action dated Jun. 16, 2015, 18 pages, Doc 1051.
U.S. Appl. No. 13/829,611 / Response to Non-final Office Action filed Dec. 15, 2015, 24pages, Doc 1134.
U.S. Appl. No. 13/829,611 / Final Office Action dated Dec. 30, 2016, 16 pages, Doc 1135.
U.S. Appl. No. 13/829,611 / Response to Final Office Action and Pilot Request filed Mar. 24, 2016, 23 pages, Doc 1136.
U.S. Appl. No. 13/829,611 / Advisory Action dated Apr. 5, 2016, 5 pages, Doc 1137.
U.S. Appl. No. 13/829,611 / Request for Continued Examination and Amendment filed May 2, 2016, 31 pages, Doc 1138.
U.S. Appl. No. 13/829,611 / Non-final Office Action dated Jun. 16, 2016, 15 pages, Doc 1139.
U.S. Appl. No. 13/829,611 / Response to Non-final Office Action dated Sep. 16, 2016, 21 pages, Doc 1140.
U.S. Appl. No. 13/829,611 / Final Office Action dated Oct. 5, 2016, 18 pages, Doc 1141.
U.S. Appl. No. 13/829,611 / Response to Final Office Action filed Jan. 5, 2017, 19 pages, Doc 1142.
U.S. Appl. No. 13/829,611 / Advisory Action dated Jan. 30, 2017, 3 pages, Doc 1143.
U.S. Appl. No. 13/829,611 / RCE and Amendment filed Feb. 21, 2017, 22 pages, Doc 1144.
U.S. Appl. No. 13/829,611 / Non-final Office Action dated Mar. 23, 2017, 15 pages, Doc 1145.
U.S. Appl. No. 13/829,611 / Amendment dated Jun. 22, 2017, 18 pages, Doc 1146.
U.S. Appl. No. 13/829,611 / Final Rejection dated Sep. 12, 2017 16 pages, Doc 1147.
U.S. Appl. No. 13/829,611 / Advisory Action and Amendment dated Dec. 27, 2017, 17 pages, Doc 1149.
U.S. Appl. No. 13/829,611 / RCE and Amendment dated Mar. 7, 2018, 25 pages, Doc 1150.
U.S. Appl. No. 13/829,611 / Notice of Allowance and Fees Due dated May 17, 2018, 13 pages, Doc 1151.
U.S. Appl. No. 13/829,611 / Notice of Allowance and Fees Due and Amendment dated Aug. 3, 2018, 16 pages, Doc 1155.
U.S. Appl. No. 13/829,611 / Notice of Allowance and fees Due dated Aug. 9, 2018, 2 pages, Doc 1156.
U.S. Appl. No. 13/829,611 / Certificate of Correction dated Dec. 4, 2018, 1 page, Doc 1266.
U.S. Appl. No. 16/125,578 / Applicant Response to PreExam Formalities Notice and Preliminary Amendment dated Nov. 27, 2018, 28 pages, Doc 1163.
U.S. Appl. No. 16/125,578 / Non-final Office action dated Sep. 5, 2019, 28 pages, Doc 1166.
U.S. Appl. No. 16/125,578 / Amendment and Terminal Disclaimer dated Dec. 5, 2019, 18 pages, Doc 1167.
U.S. Appl. No. 16/125,578 / Notice of Allowance and Notice of Allowability dated Jan. 6, 2020, 11 pages, Doc 2010.
U.S. Appl. No. 16/125,578 / Notice of Allowance and Notice of Allowability dated Apr. 21, 2020, 22 pages, Doc 2072.
U.S. Appl. No. 16/277,911 / Non-final Office Action dated Aug. 21, 2020, 33 pages, Doc 2080.
U.S. Appl. No. 16/277,911 / Response to Office Action and Terminal Disclaimer filed Nov. 23, 2020, 12 pages, Doc 2104.
U.S. Appl. No. 16/277,911 / Notice of Allowance and Allowability dated Dec. 22, 2020, 11 pages, Doc 2105.
U.S. Appl. No. 17/212,917 / U.S. Appl. No. 17/212,917, filed Mar. 25, 2021, 94 pages, Doc 2112.
U.S. Appl. No. 13/831,306 / Non-Final Rejection dated Jun. 25, 2015, 13 pages, Doc 1052.
U.S. Appl. No. 13/831,306 / Amendment After Final Rejection dated Dec. 28, 2015, 25 pages, Doc 1170.
U.S. Appl. No. 13/831,306 / Final Rejection dated Mar. 22, 2016, 15 pages, Doc 1171.
U.S. Appl. No. 13/831,306 / Response After Final dated Jul. 19, 2016, 19 pages, Doc 1172.
U.S. Appl. No. 13/831,306 / Advisory Action dated Jul. 22, 2016, 3 pages, Doc 1173.
U.S. Appl. No. 13/831,306 / Filing Receipt dated Jul. 27, 2016, 4 pages, Doc 1174.
U.S. Appl. No. 13/831,306 / RCE and Amendment dated Aug. 22, 2016, 10 pages, Doc 1175.
U.S. Appl. No. 13/831,306 / Non-Final Rejection dated Sep. 28, 2016, 12 pages, Doc 1176.
U.S. Appl. No. 13/831,306 / Amendment dated Jan. 6, 2017, 15 pages, Doc 1177.
U.S. Appl. No. 13/831,306 / Supplemental Response dated Feb. 21, 2017, 16 pages, Doc 1178.
U.S. Appl. No. 13/831,306 / Final Rejection dated Jun. 12, 2017, 11 pages, Doc 1179.
U.S. Appl. No. 13/831,306 / Response After Final Rejection dated Aug. 14, 2017, 15 pages, Doc 1180.
U.S. Appl. No. 13/831,306 / Advisory Action dated Aug. 30, 2017, 3 pages, Doc 1181.
U.S. Appl. No. 13/831,306 / RCE and Amendment dated Sep. 12, 2017, 33 pages, Doc 1182.
U.S. Appl. No. 13/831,306 / Non-Final Rejection dated Oct. 5, 2017, 15 pages, Doc 1183.
U.S. Appl. No. 13/831,306 / Amendment filed Jan. 5, 2018, 25 pages, Doc 1184.
U.S. Appl. No. 13/831,306 / Final Rejection dated May 1, 2018, 13 pages, Doc 1185.
U.S. Appl. No. 13/831,306 / After Final Consideration Program Request dated May 10, 2018, 13 pages, Doc 1186.
U.S. Appl. No. 13/831,306 / Amendment After Allowance dated Aug. 27, 2018, 11 pages, Doc 1190.
U.S. Appl. No. 13/831,306 / Response to 312 Amendment dated Sep. 5, 2018, 3 pages, Doc 1191.
U.S. Appl. No. 16/128,985 / Filing Receipt dated Oct. 2, 2018, 4 pages, Doc 1196.
U.S. Appl. No. 16/128,985 / Preliminary Amendment dated Dec. 3, 2018, 13 pages, Doc 1198.
U.S. Appl. No. 16/128,985 / Request for Corrected Filing Receipt dated Dec. 3, 2018, 6 pages, Doc 1199.
U.S. Appl. No. 16/128,985 / Filing Receipt dated Dec. 6, 2018, 4 pages, Doc 1200.
U.S. Appl. No. 16/128,985 / Non-final Office Action dated Aug. 21, 2019, 25 pages, Doc 1202.
U.S. Appl. No. 16/128,985 / Amendment and Terminal Disclaimer dated Nov. 11, 2019, 21 pages, Doc 1203.
U.S. Appl. No. 16/128,985 / Notice of Allowance and Notice of Allowability dated Dec. 16, 2019, 12 pages, Doc 1211.

(56) References Cited

OTHER PUBLICATIONS

U.S. Appl. No. 16/128,985 / Issue Fee Payment and Terminal Disclaimer filed Mar. 16, 2020, 9 pages, Doc 2021.
U.S. Appl. No. 16/128,985 / Supplemental Notice of Allowability dated Mar. 24, 2020, 11 pages, Doc 2032.
U.S. Appl. No. 16/277,926 / Non-final Office Action dated Oct. 2, 2019, 9 pages, Doc 1206.
U.S. Appl. No. 16/277,926 / Response to Office Action and Terminal Disclaimer filed Jan. 2, 2020, 17 pages, Doc 1212.
U.S. Appl. No. 16/277,926 / Notice of Allowance and Notice of Allowability date Feb. 21, 2020, 29 pages, Doc 2016.
U.S. Appl. No. 16/277,926 / Request for Continued Examination filed May 21, 2020, 7 pages, Doc 2077.
U.S. Appl. No. 16/277,926 / e-Terminal Disclaimer filed May 26, 2020, 6 pages, Doc 2073.
U.S. Appl. No. 16/277,926 / Notice of Allowance and Allowability dated Jun. 4, 2020, 11 pages, Doc 2074.
U.S. Appl. No. 13/844,254 / Non-final Office Action dated Aug. 4, 2015, 17 pages, Doc 1207.
U.S. Appl. No. 13/844,254 / Amendment dated Jan. 4, 2016 40 pages, Doc 1208.
U.S. Appl. No. 13/844,254 / Final Office Action dated Apr. 7, 2016, 27 pages, Doc 1209.
U.S. Appl. No. 13/844,254 / Response to Final Office Action dated Jul. 7, 2016, 48 pages, Doc 1210.
U.S. Appl. No. 13/844,254 / Advisory Action dated Jul. 20, 2016, 2 pages, Doc 1211.
U.S. Appl. No. 13/844,254 / RCE and Amendment dated Aug. 8, 2016, 50 pages, Doc 1212.
U.S. Appl. No. 13/844,254 / Non-final Office Action dated Nov. 29, 2016, 13 pages, Doc 1213.
U.S. Appl. No. 13/844,254 / Amendment dated Feb. 28, 2017, 23 pages, Doc 1214.
U.S. Appl. No. 13/844,254 / Final Office Action dated Apr. 26, 2017, 16 pages, Doc 1215.
U.S. Appl. No. 13/844,254 / Response to Final Office Action dated Jun. 22, 2017, 17 pages, Doc 1216.
U.S. Appl. No. 13/844,254 / Advisory Action dated Jun. 30, 2017, 5 pages, Doc 1217.
U.S. Appl. No. 13/844,254 / RCE and Amendment dated Aug. 28, 2017, 21 pages, Doc 1218.
U.S. Appl. No. 13/844,254 / Amendment After Allowance dated Mar. 21, 2018, 13 pages, Doc 1221.
U.S. Appl. No. 13/844,254 / Amendment After Allowance dated Mar. 26, 2018, 12 pages, Doc 1222.
U.S. Appl. No. 15/940,870 / Preliminary Amendment dated Jun. 19, 2018, 185 pages, Doc 1228.
U.S. Appl. No. 15/940,870 / Request for Corrected Filing Receipt dated Jul. 26, 2018, 11 pages, Doc 1231 or 2049.
U.S. Appl. No. 15/940,870 / Filing Receipt dated Jul. 30, 2018, 4 pages, Doc 1230 or 2050.
U.S. Appl. No. 15/940,870 / Preliminary Amendment dated Sep. 7, 2018, 11 pages, Doc 1232.
U.S. Appl. No. 15/940,870 / Request for Corrected Filing Receipt dated Oct. 31, 2018, 6 pages, Doc 1233.
U.S. Appl. No. 15/940,870 / Non-final Office Action dated Nov. 1, 2018, 14 pages, Doc 1234.
U.S. Appl. No. 15/940,870 / Filing Receipt dated Nov. 2, 2018, 4 pages, Doc 1235.
U.S. Appl. No. 15/940,870 / Amendment and Terminal Disclaimer dated Dec. 27, 2018, 21 pages, Doc 1237.
U.S. Appl. No. 15/940,870 / Notice of Allowance dated Jan. 30, 2019, 21 pages, Doc 1238.
U.S. Appl. No. 16/045,624 / Request for Corrected Filing Receipt dated Jul. 26, 2018, 11 pages, Doc 1243.
U.S. Appl. No. 16/045,624 / Filing Receipt dated Aug. 9, 2018, 3 pages, Doc 1244.
U.S. Appl. No. 16/045,624 / Non-final Office Action dated Nov. 1, 2018, 11 pages, Doc 1245.
U.S. Appl. No. 16/045,624 / Amendment dated Dec. 27, 2018, 21 pages, Doc 1248.
U.S. Appl. No. 16/045,624 / Final Office Action dated Jan. 29, 2019, 11 pages, Doc 1249.
U.S. Appl. No. 16/045,624 / Amendment and Terminal Disclaimer dated Mar. 19, 2019, X pages, Doc 1250.
U.S. Appl. No. 16/045,624 / Notice of Allowance and Notice of Allowability dated Apr. 1, 2019, 11 pages, Doc 1251.
U.S. Appl. No. 16/045,624 / Corrected Notice of Allowability dated Jul. 16, 2019, 11 pages, Doc 1253 or 2064.
U.S. Appl. No. 16/405,825 / Request for Corrected Filing Receipt filed Aug. 20, 2019, 12 pages, Doc 1262 or 2065.
U.S. Appl. No. 16/405,825 / Corrected Filing Receipt dated Aug. 23, 2019, 4 pages, Doc 1263 or 2066.
U.S. Appl. No. 16/405,825 / Preliminary Amendment and Terminal Disclaimer filed Oct. 23, 2019, 26 pages, Doc 1264.
U.S. Appl. No. 16/405,825 / Notice of Allowance and Notice of Allowability dated Nov. 1, 2019, 36 pages, Doc 1265.
U.S. Appl. No. 16/785,992 / Preliminary Amendment filed Feb. 10, 2020, 14 pages, Doc 2117.
U.S. Appl. No. 16/785,992 / First Office Action dated Mar. 26, 2021, 55 pages, Doc 2113.
Christensson—"Domain Definition", 2006, retrieved from https://techterms.com, on Nov. 1, 2015, 1 page, Doc 2003.
Mitchell—"What is a Subnet?" retrieved from http://compnetworking.about.com on Nov. 1, 2015, 3 pages, Doc 2006.
Mitchell—"What is a Local Area Network (LAN)?" retrieved from http://compnetworking.about.com on Nov. 1, 2015, 3 pages, Doc 2007.
Williams—"Pertino Offers a Cloud-Based Network, No Hardware Required," Feb. 12, 2013, www.techcrunch.com, 3 Pages, Doc 2070.
U.S. Appl. No. 13/543,729, filed Jul. 6, 2012, 65 Pages, Doc 1030.
U.S. Appl. No. 13/543,729 / Filing Receipt, Mailed Jul. 23, 2012, 3 pages, Doc 1031.
U.S. Appl. No. 13/543,729 / Application Data Sheet filed Aug. 14, 2012, 11 pages, Doc 1032.
U.S. Appl. No. 13/543,729 / After Final Consideration Program Request mailed Jun. 30, 2014, 2 pages, Doc 1039.
U.S. Appl. No. 13/543,729 / Corrected Filing Receipt dated May 14, 2015, 3 pages, Doc 1049.
U.S. Appl. No. 13/543,729 / Issue Fee Payment and Rule 312 Amendment dated Jul. 17, 2015, 6 pages, Doc 1053.
U.S. Appl. No. 13/543,729 / Issue Notification dated Aug. 5, 2015, 1 page, Doc 1054.
U.S. Appl. No. 13/675,552, filed Nov. 13, 2012, 77 pages, Doc 1001.
U.S. Appl. No. 13/675,552 / Filing Receipt and Notice to File Corrected Application Papers mailed Dec. 12, 2012, 5 pages, Doc 1002.
U.S. Appl. No. 13/675,552 / Filing Receipt mailed Jan. 11, 2013, 3 pages, Doc 1004.
U.S. Appl. No. 13/675,552 / Request for Corrected Filing Receipt filed Jun. 20, 2018, 14 pages, Doc 1067.
U.S. Appl. No. 13/675,552 / Corrected Filing Receipt dated Jul. 10, 2018, 3 pages, Doc 1068.
U.S. Appl. No. 13/675,552 / Corrected Notice of Allowability dated Nov. 12, 2020, 4 pages, Doc 2092.
U.S. Appl. No. 13/675,552 / Corrected Notice of Allowability dated Nov. 18, 2020, 6 pages, Doc 2093.
U.S. Appl. No. 13/675,552 / Issue Fee Payment and Response Under 37 CFR 1.312 filed Nov. 24, 2020, 6 pages, Doc 2095.
U.S. Appl. No. 13/675,552 / Issue Notification dated Dec. 9, 2020, 1 page, Doc 2096.
U.S. Appl. No. 13/747,371 / Filing Receipt and Notice to File Missing Parts mailed Apr. 1, 2013, 6 pages, Doc 1009.
U.S. Appl. No. 13/747,371 / Response to Notice to File Missing Parts and Replacement Figures filed Jun. 3, 2013, 24 Pages, Doc 1010.
U.S. Appl. No. 15/348,902, filed Nov. 10, 2016, 102 pages, Doc 1085.
U.S. Appl. No. 15/348,902 / Notice to File Missing Parts dated Nov. 21, 2016, 3 pages, Doc 1087.

(56) References Cited

OTHER PUBLICATIONS

U.S. Appl. No. 15/348,902 / Filing Receipt dated Nov. 21, 2016, 3 pages, Doc 1088.
U.S. Appl. No. 17/144,842—Notice of Missing Parts dated Jan. 25, 2021, 4 pages, Doc 2100.
U.S. Appl. No. 17/144,842—Filing Receipt dated Jan. 25, 2021, 4 pages, Doc 2101.
U.S. Appl. No. 17/144,842—Updated Filing Receipt dated Mar. 29, 2021, 5 pages, Doc 2109.
U.S. Appl. No. 17/144,842—First Office Action dated Jan. 6, 2022, 24 pages, Doc 2132.
U.S. Appl. No. 13/802,529, filed Mar. 13, 2013, 91 Pages, Doc 1012.
U.S. Appl. No. 13/802,529 / Notice to File Missing Parts and Filing Receipt, Mailed Apr. 23, 2013, 5 pages, Doc 1013.
U.S. Appl. No. 13/802,529 / Response to Notice of Missing Parts filed May 10, 2013, 13 Pages, Doc 1014.
U.S. Appl. No. 13/802,529 / Updated Filing Receipt dated May 20, 2013, 3 pages, Doc 1015.
U.S. Appl. No. 13/802,529 / Request for Corrected Filing Receipt filed Jun. 20, 2018, 13 pages, Doc 1113.
U.S. Appl. No. 13/802,529 / Corrected Filing Receipt dated Jul. 10, 2018, 3 pages, Doc 1114.
U.S. Appl. No. 13/802,529 / Issue Fee Payment filed Nov. 30, 2018, 3 pages, Doc 1117.
U.S. Appl. No. 13/802,529 / Issue Notification dated Dec. 20, 2018, 1 pages, Doc 1118.
U.S. Appl. No. 16/192,539, filed Nov. 15, 2018, 92 pages, Doc 1119.
U.S. Appl. No. 16/192,539 / Notice to File Missing Parts dated Dec. 7, 2018, 2 pages, Doc 1120.
U.S. Appl. No. 16/192,539 / Filing Receipt dated Dec. 7, 2018, 3 pages, Doc 1121.
U.S. Appl. No. 16/192,539 / Updated Filing Receipt dated Feb. 11, 2019, 3 pages, Doc 1123.
U.S. Appl. No. 16/192,539 / Notice of Publication dated May 23, 2019, 1 page, Doc 1258.
U.S. Appl. No. 16/192,539 / Approval of Terminal Disclaimer filed Aug. 9, 2019, 3 pages, Doc 1126.
U.S. Appl. No. 16/192,539 / Issue Fee Payment dated Nov. 11, 2019, 6 pages, Doc 1128.
U.S. Appl. No. 16/192,539 / Corrected Notice of Allowability dated Nov. 12, 2019, 6 pages, Doc 1129.
U.S. Appl. No. 16/192,539 / Issue Notification dated Nov. 20, 2019, 1 page, Doc 1130.
U.S. Appl. No. 16/688,846 / Continuation Application as filed Nov. 19, 2019, 93 pages, Doc 1131.
U.S. Appl. No. 16/688,846 / Filing Receipt dated Dec. 5, 2019, 4 pages, Doc 1132.
U.S. Appl. No. 16/688,846 / Notice to File Missing Parts dated Dec. 5, 2019, 2 pages, Doc 1133.
U.S. Appl. No. 16/688,846 / Updated Filing Receipt dated Feb. 7, 2020, 4 pages, Doc 2020.
U.S. Appl. No. 16/688,846 / Terminal Disclaimer and Response to Non-final Office Action filed Apr. 6, 2021, 29 pages, Doc 2118.
U.S. Appl. No. 16/688,846 / Notice of Allowance/Allowability dated Jul. 16, 2021, 14 pages, Doc 2119.
U.S. Appl. No. 16/688,846 / Issue Fee Payment and 1.312 Response filed Oct. 15, 2021,6 pages, Doc 2120.
U.S. Appl. No. 16/688,846 / Issue Notification dated Oct. 27, 2021, 1 page, Doc 2121.
U.S. Appl. No. 17/503,177, filed Oct. 15, 2021, 102 pages, Doc 2129.
U.S. Appl. No. 17/503,177 / Filing Receipt dated Oct. 28, 2021, 5 pages, Doc 2131.
U.S. Appl. No. 17/503,177 / Notice of Publication dated Feb. 3, 2022, 1 page, Doc 2133.
U.S. Appl. No. 13/829,611, filed Mar. 14, 2013, 85 Pages, Doc 1017.
U.S. Appl. No. 13/829,611 / Notice to File Missing Parts and Filing Receipt, Mailed May 2, 2013, 5 Pages, Doc 1018.
U.S. Appl. No. 13/829,611 / Response to Notice of Missing Parts filed Jun. 7, 2013, 9 Pages, Doc 1019.
U.S. Appl. No. 13/829,611 / Updated Filing Receipt dated Jul. 9, 2013, 3 Pages, Doc 1020.
U.S. Appl. No. 13/829,611 / After final Consideration Request dated Dec. 12, 2017, 17 pages, Doc 1148.
U.S. Appl. No. 13/829,611 / Notice of Allowance and Fees Due dated Jun. 4, 2018, 2 pages, Doc 1152.
U.S. Appl. No. 13/829,611 / Request for Corrected Filing Receipt dated Jun. 13, 2018, 7 pages, Doc 1153.
U.S. Appl. No. 13/829,611 / Filing Receipt dated Jun. 18, 2018, 3 pages, Doc 1154.
U.S. Appl. No. 13/829,611 / Notice of Allowance and Fees Due dated Aug. 3, 2018, 5 pages, Doc 1155.
U.S. Appl. No. 13/829,611 / Issue Fee Payment dated Aug. 17, 2018, 5 pages, Doc 1157.
U.S. Appl. No. 13/829,611 / Notice of Allowance and Fees Due dated Sep. 14, 2018, 3 pages, Doc 1158.
U.S. Appl. No. 13/829,611 / Issue Notification dated Oct. 3, 2018, 1 page, Doc 1159.
U.S. Appl. No. 16/125,578, filed Sep. 7, 2018, 91 pages, Doc 1160.
U.S. Appl. No. 16/125,578 / Notice to File Missing Parts dated Sep. 27, 2018, 2 pages, Doc 1161.
U.S. Appl. No. 16/125,578 / Filing Receipt dated Sep. 27, 2018, 3 pages, Doc 1162.
U.S. Appl. No. 16/125,578 / Filing Receipt dated Nov. 29, 2018, 3 pages, Doc 1164.
U.S. Appl. No. 16/125,578 / Notice of Publication dated Mar. 7, 2019, 1 page, Doc 1165.
U.S. Appl. No. 16/125,578 / Request for Continued Examination and Information Disclosure Statement filed Apr. 6, 2020, 18 pages, Doc 2031.
U.S. Appl. No. 16/125,578 / Issue Fee Payment filed Jul. 20, 2020, 6 pages, Doc 2076.
U.S. Appl. No. 16/125,578 / Issue Fee Payment and Comments filed Jul. 20, 2020, 4 pages, Doc 2085.
U.S. Appl. No. 16/125,578 / Supplemental Notice of Allowability dated Jul. 24, 2020, 4 pages, Doc 2077.
U.S. Appl. No. 16/125,578 / Supplemental Notice of Allowability dated Jul. 24, 2020, 4 pages, Doc 2086.
U.S. Appl. No. 16/125,578 / Issue Notification dated Aug. 12, 2020, 1 page, Doc 2087.
U.S. Appl. No. 16/277,911 / Application and Preliminary Amendment as filed Feb. 15, 2019, 99 pages, Doc 1168.
U.S. Appl. No. 16/277,911 / Filing Receipt dated Mar. 6, 2019, 4 pages, Doc 1169.
U.S. Appl. No. 16/277,911 / Notice of Publication dated Jun. 13, 2019, 1 page, Doc 1256.
U.S. Appl. No. 16/277,911 / Issue Fee Payment and Response Under 37 CFR § 1.312 filed Mar. 19, 2021, 8 pages, Doc 2110.
U.S. Appl. No. 16/277,911 / Issue Notification dated Mar. 31, 2021, 1 page, Doc 2111.
U.S. Appl. No. 17/212,917 / Notice to File Missing Parts Dated Apr. 7, 2021,2 pages, Doc 2122.
U.S. Appl. No. 17/212,917 / Preliminary Amendment and Response to Notice of Missing Parts filed Jun. 4, 2021, 18 pages, Doc 2123.
U.S. Appl. No. 17/212,917 / Notice of Publication dated Sep. 16, 2021, 1 pages, Doc 2124.
U.S. Appl. No. 13/831,306, filed Mar. 14, 2013, 111 Pages, Doc 1021.
U.S. Appl. No. 13/831,306 / Notice to File Missing Parts and Filing Receipt, Mailed May 6, 2013, 5 Pages, Doc 1022.
U.S. Appl. No. 13/831,306 / Applicant Response to Pre-Exam Formalities Notice, dated Jun. 27, 2013, 6 Pages, Doc 1023.
U.S. Appl. No. 13/831,306 / Filing Receipt, Mailed Jul. 9, 2013, 3 Pages, Doc 1024.
U.S. Appl. No. 13/831,306 / Notice of Allowance dated Jul. 11, 2018, 2 pages, Doc 1187.
U.S. Appl. No. 13/831,306 / Notice of Allowance dated Jul. 23, 2018, 2 pages, Doc 1188.
U.S. Appl. No. 13/831,306 / Notice of Allowance dated Aug. 3, 2018, 2 pages, Doc 1189.

(56) References Cited

OTHER PUBLICATIONS

U.S. Appl. No. 13/831,306 / Issue Fee Payment dated Sep. 7, 2018, 1 page, Doc 1192.
U.S. Appl. No. 13/831,306 / Notice of Allowance dated Oct. 9, 2018, 2 pages, Doc 1193.
U.S. Appl. No. 13/831,306 / Issue Notification dated Oct. 31, 2018, 1 page, Doc 1194.
U.S. Appl. No. 16/128,985, filed Sep. 12, 2018, 106 pages, Doc 1195.
U.S. Appl. No. 16/128,985 / Notice to File Missing Parts dated Oct. 2, 2018, 2 pages, Doc 1197.
U.S. Appl. No. 16/128,985 / Notice of Publication dated Mar. 14, 2019, 1 page, Doc 1201.
U.S. Appl. No. 16/128,985 / Notice to File Corrected Application Papers dated Feb. 10, 2020, 3 pages, Doc 2014.
U.S. Appl. No. 16/128,985 / Response to Notice to File Corrected Application Papers filed Feb. 21, 2020, 16 pages, Doc 2015.
U.S. Appl. No. 16/128,985 / Issue Notification dated Apr. 8, 2020, 1 page, Doc 2033.
U.S. Appl. No. 16/277,926 / Continuation Application and Preliminary Amendment as filed Feb. 15, 2019, 119 pages, Doc 1204.
U.S. Appl. No. 16/277,926 / Filing Receipt dated Mar. 5, 2019, 4 pages, Doc 1205.
U.S. Appl. No. 16/277,926 / Notice of Publication dated Jun. 13, 2019, 1 page, Doc 1255.
U.S. Appl. No. 16/277,926 / Response to Office Action and Terminal Disclaimer filed Jan. 2, 2020, 17 pages, Doc 2134.
U.S. Appl. No. 16/277,926 / Issue Fee Payment and Response Under 37 CFR 1.312 filed Sep. 4, 2020, 4 pages, Doc 2089.
U.S. Appl. No. 16/277,926 / Supplemental Notice of Allowability dated Sep. 23, 2020, 4 pages, Doc 2104.
U.S. Appl. No. 16/277,926 / Issue Notification dated Oct. 7, 2020, 1 page, Doc 2105.
U.S. Appl. No. 13/844,254, filed Mar. 15, 2013, 9 Pages, Doc 1024.
U.S. Appl. No. 13/844,254 / Notice to File Missing Parts and Filing Receipt, Mailed May 9, 2013, 2 Pages, Doc 1026.
U.S. Appl. No. 13/844,254 / Applicant Response to Pre-Exam Formalities Notice dated Jun. 27, 2013, 33 pages, Doc 1027.
U.S. Appl. No. 13/844,254 / Filing Receipt, Mailed Jul. 9, 2013, 3 pages, Doc 1028.
U.S. Appl. No. 13/844,254 / Advisory Action dated Jul. 20, 2016, 2 pages, Doc 2138.
U.S. Appl. No. 13/844,254 / Non-final Office Action dated Nov. 29, 2016, 17 pages, Doc 1213.
U.S. Appl. No. 13/844,254 / Amendment dated Feb. 28, 2017, 25 pages, Doc 1214.
U.S. Appl. No. 13/844,254 / Final Office Action dated Apr. 26, 2017, 19 pages, Doc 1215.
U.S. Appl. No. 13/844,254 / Notice of Allowance dated Dec. 29, 2017, 42 pages, Doc 1219.
U.S. Appl. No. 13/844,254 / Notice of Allowance dated Jan. 10, 2018, 2 pages, Doc 1220.
U.S. Appl. No. 13/844,254 / Issue Fee Payment dated Mar. 28, 2018, 1 page, Doc 1223.
U.S. Appl. No. 13/844,254 / Issue Notification dated May 16, 2018, 1 page, Doc 1224.
U.S. Appl. No. 15/940,870 / Application and Preliminary Amendment filed Mar. 29, 2018, 114 pages, Doc 1225.
U.S. Appl. No. 15/940,870 / Notice to File Corrected Application Papers dated Apr. 25, 2018, 4 pages, Doc 1226.
U.S. Appl. No. 15/940,870 / Filing Receipt dated Apr. 25, 2018, 4 pages, Doc 1227.
U.S. Appl. No. 15/940,870 / Filing receipt dated Jul. 10, 2018, 4 pages, Doc 1229.
U.S. Appl. No. 15/940,870 / Request for Corrected Filing Receipt dated Jul. 26, 2018, 11 pages, Doc 1231.
U.S. Appl. No. 15/940,870 / Filing Receipt dated Jul. 30, 2018, 4 pages, Doc 1230.
U.S. Appl. No. 15/940,870 / Notice of Publication dated Nov. 8, 2018, 1 page, Doc 1236.
U.S. Appl. No. 15/940,870 / Issue Fee Payment dated Apr. 26, 2019, 3 pages, Doc 1239.
U.S. Appl. No. 15/940,870 / Issue Notification dated May 29, 2019, 1 page, Doc 1240.
U.S. Appl. No. 16/045,624, filed Jul. 25, 2018, 102 pages, Doc 1241.
U.S. Appl. No. 16/045,624 / Preliminary Amendment filed Jul. 25, 2018, 13 pages, Doc 1242.
U.S. Appl. No. 16/045,624 / Notice of Publication dated Nov. 15, 2018, 1 page, Doc 1246.
U.S. Appl. No. 16/045,624 / Filing Receipt dated Dec. 4, 2018, 4 pages, Doc 1247.
U.S. Appl. No. 16/045,624 / Amendment and Terminal Disclaimer dated Mar. 19, 2019, 13 pages, Doc 1250.
U.S. Appl. No. 16/045,624 / Issue Fee Payment dated Jun. 25, 2019, 3 pages, Doc 1252.
U.S. Appl. No. 16/045,624 / Corrected Notice of Allowability dated Jul. 16, 2019, 11 pages, Doc , 11 pages, Doc 1253.
U.S. Appl. No. 16/045,624 / Issue Notification dated Jul. 31, 2019, 1 page, Doc 1254.
U.S. Appl. No. 16/405,825 / Continuation Application and Preliminary Amendment as filed May 7, 2019, 125 pages, Doc 2135.
U.S. Appl. No. 16/405,825 / Filing Receipt dated May 17, 2019, 4 pages, Doc 2137.
U.S. Appl. No. 16/405,825 / Request for Corrected Filing Receipt as filed Jul. 23, 2019, 13 pages, Doc 1260.
U.S. Appl. No. 16/405,825 / Response to Request for Corrected Filing Receipt dated Jul. 24, 2019, 1 page, Doc 1261.
U.S. Appl. No. 16/405,825 / Request for Corrected Filing Receipt filed Aug. 20, 2019, 12 pages, Doc 1262.
U.S. Appl. No. 16/405,825 / Corrected Filing Receipt dated Aug. 23, 2019, 4 pages, Doc 1263.
U.S. Appl. No. 16/405,825 / Notice of Publication dated Aug. 29, 2019, 1 pages, Doc 2136.
U.S. Appl. No. 16/405,825 / Corrected Notice of Allowability dated Feb. 21, 2020, 36 pages, Doc 2017.
U.S. Appl. No. 16/405,825 / Issue Notification dated Mar. 4, 2020, 36 pages, Doc 2018.
U.S. Appl. No. 16/785,992 / U.S. Appl. No. 16,785,992 as filed with Preliminary Amendment dated Feb. 10, 2020, 124 pages, Doc 2022.
U.S. Appl. No. 16/785,992 / Notice to file Corrected Application Papers dated Feb. 26, 2020, 2 pages, Doc 2023.
U.S. Appl. No. 16/785,992 / Filing Receipt dated Feb. 26, 2020, 4 pages, Doc 2024.
U.S. Appl. No. 16/785,992 / Response to Notice to File Corrected Application Papers with Replacement Specification filed Apr. 27, 2020, 166 pages, Doc 2071.
U.S. Appl. No. 16/785,992 / Notice of Publication dated Aug. 6, 2020, 1 page, Doc 2107.
U.S. Appl. No. 16/785,992 / Terminal Disclaimer and Response to First Office Action filed Jun. 24, 2021, 22 pages, Doc 2125.
U.S. Appl. No. 16/785,992 / Notice of Allowance/Allowability dated Jul. 21, 2021, 18 pages, Doc 2126.
U.S. Appl. No. 16/785,992 / Issue Fee Payment and Response Under 1.312 filed Oct. 15, 2021, 6 pages. Doc 2127.
U.S. Appl. No. 16/785,992 / Issue Notification dated Nov. 3, 3021, 1 page, Doc 2128.
U.S. Appl. No. 17/508,828, filed Oct. 22, 2021, 120 pages, Doc 2129.
U.S. Appl. No. 17/508,828 / Filing Receipt dated Nov. 2, 2021, 5 pages, Doc 2130.
U.S. Appl. No. 15/348,902: Response to Notice to File Missing Parts with Substitute Specification and Replacement Figures dated Jan. 23, 2017, 115 pages, Doc 1089.
U.S. Appl. No. 15/348,902; Updated Filing Receipt dated Jan. 25, 2017, 3 pages, Doc 1090.
U.S. Appl. No. 15/348,902: Request for Corrected Filing Receipt filed Jun. 20, 2018, 8 pages, Doc 1091.
U.S. Appl. No. 15/348,902: Corrected Filing Receipt dated Jul. 10, 2018, 3 pages, Doc 1092.
U.S. Appl. No. 15/348,902: Non-Final Rejection dated Dec. 18, 2018, 67 pages, Doc 1093.

(56) References Cited

OTHER PUBLICATIONS

U.S. Appl. No. 15/348,902: Amendment filed Mar. 18, 2019, 36 pages, Doc 1094.
U.S. Appl. No. 15/348,902: Final Office Action dated Apr. 16, 2019, 35 pages, Doc 1095.
U.S. Appl. No. 15/348,902: Response to Final Office Action and After-Final Consideration Program Request dated Jun. 14, 2019, 35 pages, Doc 1096.
U.S. Appl. No. 15/348,902: Advisory Action dated Jul. 1, 2019, 3 pages, Doc 1097.
U.S. Appl. No. 15/348,902: Request for Continued Examination dated Jul. 12, 2019, 5 pages, Doc 1098.
U.S. Appl. No. 15/348,902: Notice of Allowance and Notice of Allowability dated Sep. 23, 2019, 7 pages, Doc 1099.
U.S. Appl. No. 15/348,902: Issue Fee Payment and Response Under 37 CFR 1.312 filed Dec. 23, 2019, 6 pages, Doc 2009.
U.S. Appl. No. 15/348,902: Issue Notification dated Jan. 22, 2020, 1 page, Doc 2012.
U.S. Appl. No. 16/720,448: Continuation Application as filed Dec. 19, 2019, 81 pages, Doc 1100.
U.S. Appl. No. 16/720,448: Filing Receipt dated Jan. 14, 2020, 4 pages, Doc 1267.
U.S. Appl. No. 16/720,448: Notice of Missing Parts dated Jan. 14, 2020, 2 pages, Doc 1268.
U.S. Appl. No. 16/720,448: Response to Notice of Missing Parts and Preliminary Amendment filed Mar. 16, 2020, 38 pages, Doc 2019.
U.S. Appl. No. 16/720,448: Filing Receipt dated Mar. 19, 2020, 5 pages, Doc 2029.
U.S. Appl. No. 16/720,448: eTerminal Disclaimer filed and approved Oct. 1, 2020, 5 pages, Doc 2083.
U.S. Appl. No. 16/720,448: Notice of Allowance and Allowability dated Oct. 21, 2020, 26 pages, Doc 2084.
U.S. Appl. No. 16/720,448: Issue Fee Payment and Response Under 37 CFR 1.312 filed Dec. 4, 2020, 6 pages, Doc 2097.
U.S. Appl. No. 16/720,448: Issue Notification Dec. 22, 2020, 1 page, Doc 2098.
U.S. Appl. No. 17/144,842: Issue Fee Payment filed Jul. 15, 2022, 6 pages, Doc 2142.
U.S. Appl. No. 17/144,842: Issue Notification dated Aug. 3, 2022, 1 page, Doc 2143.
U.S. Appl. No. 17/873,738: Continuation Application as filed Jul. 26, 2022, 112 pages, Doc 2144.
U.S. Appl. No. 17/873,738: Notice to File Corrected Application Papers and Filing Receipt, dated Aug. 5, 2022, 6 pages, Doc 2145.
U.S. Appl. No. 17/508,828: Non-Final Office Action dated Sep. 21, 2022, 51 pages, Doc 2148.
U.S. Appl. No. 17/873,738: Response to Notice to File Corrected Application Papers as filed Sep. 26, 2022, 96 pages, Doc 2149.

\* cited by examiner

600

DEPLOYMENT OF NETWORK-RELATED FEATURES OVER CLOUD NETWORK

This application is a continuation of, and claims the benefit of priority from, U.S. patent application Ser. No. 16/277,926, entitled "Deployment Of Network-Related Features Over Cloud Network," filed Feb. 15, 2019, which is a continuation of, and claims the benefit of priority from, U.S. patent application Ser. No. 16/128,985, entitled "Deployment Of Network-Related Features Over Cloud Network," filed Sep. 12, 2018, which is a continuation of, and claims the benefit of priority from, U.S. patent application Ser. No. 13/831,306, entitled "Deployment Of Network-Related Features Over Cloud Network," filed Mar. 14, 2013, which is a continuation-in-part of, and claims the benefit of priority from, U.S. patent application Ser. No. 13/829,611, entitled "Private Networks Overlaid On Cloud Infrastructure," filed Mar. 14, 2013, which is a continuation-in-part of, and claims the benefit of priority from, U.S. patent application Ser. No. 13/802,529, entitled "Connecting a Cloud Network to the internet," filed Mar. 13, 2013, which is a continuation-in-part of, and claims the benefit of priority from, U.S. patent application Ser. No. 13/747,371, entitled "People Centric Management of Cloud Networks via GUI," filed Jan. 22, 2013, which is a continuation-in-part of, and claims the benefit of priority from, U.S. patent application Ser. No. 13/675,552, entitled "Linking Logical Broadcast Domains," filed Nov. 13, 2012, which is a continuation-in-part of, and claims the benefit of priority from, U.S. patent application Ser. No. 13/543,729, entitled "Communication Between Broadcast Domains," filed Jul. 6, 2012, all of which such applications are incorporated by reference herein in their entirety.

FIELD

The present application relates to virtual deployment of network-related features.

BACKGROUND

Various advancements in networking address interoperability of one or more devices across one or more networks. Two different physical networks may communicate via a network device. A network device, such as a router, may create a hardware bridge between two networks. Additionally, a remote device, such as a device on a remote network, for example, may communicate with a local network by executing a virtual private network (VPN), typically by executing a software program. In this context (e.g., throughout this document), the term "remote" or similar terms refer to the device not being a part of a particular network and the term "local" or similar terms refer to a collection of devices, for example, that are part of that network. VPN software, for example, may create a reasonably secure channel of communication between a remote device and local network and may route traffic to the remote device. This may allow the remote device to communicate with the local network as if the remote device were physically part of the local network, rather than remote. Unfortunately, such approaches have various drawbacks.

BRIEF DESCRIPTION OF THE DRAWINGS

Claimed subject matter is particularly pointed out and/or distinctly claimed in the concluding portion of the specification. However, both as to organization and/or method of operation, together with objects, features, and/or advantages thereof, claimed subject matter may be understood by reference to the following detailed description if read with the accompanying drawings in which:

Figure 1:
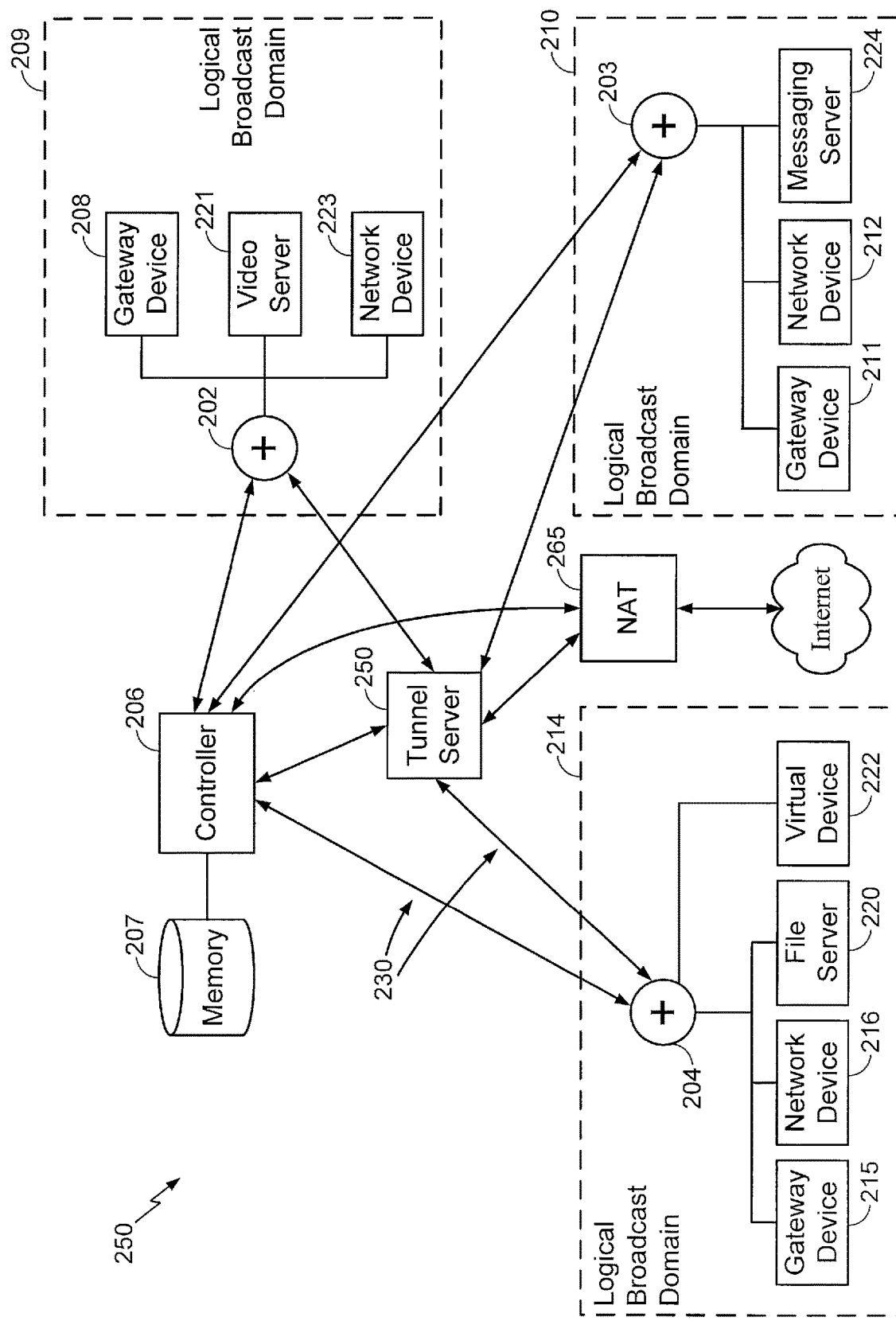
FIG. 1 is a schematic diagram illustrating an embodiment.

Reference is made in the following detailed description to accompanying drawings, which form a part hereof, wherein like numerals may designate like parts throughout to indicate corresponding and/or analogous components, for example. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or similar references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

In the following detailed description, numerous specific details are set forth to provide a thorough understanding of claimed subject matter. For purposes of explanation, specific numbers, systems and/or configurations are set forth, for example. However, it should be apparent to one skilled in the relevant art having benefit of this disclosure that claimed subject matter may be practiced without specific details. In other instances, well-known features may be omitted and/or simplified so as not to obscure claimed subject matter. While certain features have been illustrated and/or described herein, many modifications, substitutions, changes and/or equivalents may occur to those skilled in the art. It is, therefore, to be understood that appended claims are intended to cover any and all modifications and/or changes as fall within claimed subject matter.

Reference throughout this specification to one implementation, an implementation, one embodiment, an embodiment and/or the like may mean that a particular feature, structure, and/or characteristic described in connection with a particular implementation and/or embodiment may be included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described may be combined in various ways in one or more implementations. In general, of course, these and other issues may vary with context.

Therefore, particular context of description and/or usage may provide helpful guidance regarding inferences to be drawn.

Operations and/or processing, such as in association with networks, such as communication networks, for example, may involve physical manipulations of physical quantities. Typically, although not necessarily, these quantities may take the form of electrical and/or magnetic signals capable of, for example, being stored, transferred, combined, processed, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these and/or similar terms are to be associated with appropriate physical quantities and are intended to merely be convenient labels.

Likewise, in this context, the terms "coupled", "connected," and/or similar terms may be used generically. It should be understood that these terms are not intended as synonyms. Rather, "connected" if used generically may be used to indicate that two or more components, for example, are in direct physical and/or electrical contact; while, "coupled" if used generically may mean that two or more components are in direct physical or electrical contact; however, "coupled" if used generically may also mean that two or more components are not in direct contact, but may nonetheless co-operate or interact. The term coupled may also be understood generically to mean indirectly connected, for example, in an appropriate context.

The terms, "and", "or", "and/or" and/or similar terms, as used herein, may include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms may be used to describe any feature, structure, and/or characteristic in the singular and/or may be used to describe a plurality or some other combination of features, structures and/or characteristics. Though, it should be noted that this is merely an illustrative example and claimed subject matter is not limited to this example. Again, particular context of description and/or usage may provide helpful guidance regarding inferences to be drawn.

It should be understood that for ease of description a network device (also referred to as a networking device) may be embodied and/or described in terms of a computing device. However, it should further be understood that this description should in no way be construed that claimed subject matter is limited to one embodiment, such as a computing device or a network device, and, instead, may be embodied as a variety of devices or combinations thereof, including, for example, one or more illustrative examples.

In this context, the term network device refers to any device capable of communicating via and/or as part of a network. While network devices may be capable of sending and/or receiving signals (e.g., signal packets), such as via a wired or wireless network, they may also be capable of performing arithmetic and/or logic operations, processing and/or storing signals, such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, integrated devices combining two or more features of the foregoing devices, the like or any combination thereof.

A network may comprise two or more network devices and/or may couple network devices so that signal communications, such as in the form of signal packets, for example, may be exchanged, such as between a server and a client device and/or other types of devices, including between wireless devices coupled via a wireless network, for example.

A network may also include now known, or to be later developed arrangements, derivatives, and/or improvements, including, for example, past, present and/or future mass storage, such as network attached storage (NAS), a storage area network (SAN), and/or other forms of computer and/or machine readable media, for example. A network may include the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures or may be compliant and/or compatible with differing protocols, such as communication protocols (e.g., network communication protocols), may interoperate within a larger network. In this context, the term sub-network refers to a portion or part of a network. Various types of devices, such as network devices and/or computing devices, may be made available so that device interoperability is enabled and/or, in at least some instances, may be transparent to the devices. In this context, the term transparent refers to devices, such as network devices and/or computing devices, communicating via a network in which the devices are able to communicate via intermediate devices, but without the communicating devices necessarily specifying one or more intermediate devices and/or may include communicating as if intermediate devices are not necessarily involved in communication transmissions. For example, a router may provide a link or connection between otherwise separate and/or independent LANs. In this context, a private network refers to a particular, limited set of network devices able to communicate with other network devices in the particular, limited set, such as via signal packet transmissions, for example, without a need for re-routing and/or redirecting such network communications. A private network may comprise a stand-alone network; however, a private network may also comprise a subset of a larger network, such as, for example, without limitation, the Internet. Thus, for example, a private network "in the cloud" may refer to a private network that comprises a subset of the Internet, for example. Although signal packet transmissions may employ intermediate devices to exchange signal packet transmissions, those intermediate devices may not necessarily be included in the private network by not being a source or destination for one or more signal packet transmissions, for example. As another example, a logical broadcast domain, explained in more detail herein, may comprise an example of a private network. It is understood in this context that a private network may provide outgoing network communications to devices not in the private network, but such devices outside the private network may not direct inbound network communications to devices included in the private network.

The Internet refers to a decentralized global network of interoperable networks that comply with the Internet Protocol (IP). It is noted that there are several versions of the Internet Protocol. Here, the term Internet Protocol or IP is intended to refer to any version, now known or later developed. The Internet includes local area networks (LANs), wide area networks (WANs), wireless networks, and/or long haul public networks that, for example, may allow signal packets to be communicated between LANs. The term world wide web (WWW) and/or similar tends may also be used, although it refers to a sub-portion of the Internet that complies with the Hypertext Transfer Protocol or HTTP. It is noted that there are several versions of the Hypertext Transfer Protocol. Here, the term Hypertext Transfer Protocol or HTTP is intended to refer to any version, now known or later developed. It is likewise noted that in various places in this document substitution of the term Internet with the term world wide web may be made without a significant departure in meaning and may, therefore, not be inappropriate in that the statement would remain correct with such a substitution.

Signal packets, also referred to as signal packet transmissions, may be communicated between nodes of a network, where a node may comprise one or more network devices and/or one or more computing devices, for example. As an illustrative example, but without limitation, a node may comprise one or more sites employing a local network address. Likewise, a device, such as a network device and/or a computing device, may be associated with that node. A signal packet may, for example, be communicated via a communication channel or a communication path comprising the Internet, from a site via an access node coupled to the Internet. Likewise, a signal packet may be forwarded via network nodes to a target site coupled to a local network, for example. A signal packet communicated via the Internet, for example, may be routed via a path comprising one or more gateways, servers, etc. that may, for example, route a signal packet in accordance with a target address and availability of a network path of network nodes to a target address. Although the Internet comprises a network of interoperable networks, not all of those interoperable networks are necessarily available or accessible to the public.

Although physically connecting a network via a hardware bridge is done, there may be one or more drawbacks. A hardware bridge may not typically include a capability of interoperability via higher levels of a network communications protocol. A network communications protocol refers to a set of signaling conventions for communications between or among devices in a network, typically network devices; for example, devices that substantially comply with the protocol or that are substantially compatible with the protocol. In this context, the term "between" and/or similar terms are understood to include "among" if appropriate for the particular usage. Likewise, in this context, the term is "compatible with", "comply with" and/or similar terms are understood to include substantial compliance and/or substantial compatibility.

Typically, a network communications protocol has several layers. These layers may be referred to here as a network communication stack. Various types of network communications may occur across various layers. For example, as one moves higher in a network communication stack, additional operations may be available by transmitting network communications that are compatible and/or compliant with a particular network communications protocol at these higher layers. Therefore, for example, a hardware bridge may be unable to forward signal packets since it may operate at a layer of a network communication stack that does not provide that capability. Although higher layers of a network communications protocol may, for example, affect device communication permissions, user communication permissions, etc., a hardware bridge, for example, may typically provide little user control, such as for higher layer operations. Furthermore, making changes at a hardware layer may potentially affect performance of network communications, such as for one or more layers, for example. Another drawback, as mentioned previously, is that it may be difficult, time consuming and/or expensive to setup and/or modify features of a hardware bridge without specialized skills and/or experience, such as technical know-how.

A VPN, such as previously described, may enable a remote device to communicate via a local network, but may also have drawbacks. A router may allow network communications in the form of network transmissions (e.g., signal packets), for example, to occur from a remote device to a VPN server on a local network. A remote device may be authenticated and a VPN server, for example, may create a special route between a local network and the remote device through an intervening router. However, a route may be generated and/or also regenerate if the remote device is power cycled, for example. Also, a VPN typically may affect a single remote device, which may be limiting, for example, in some situations. Similarly, here too, as mentioned previously, it may be difficult, time consuming and/or expensive to setup and/or modify features of a VPN without specialized skills and/or experience, such as technical know-how.

A network may be very large, such as comprising thousands of nodes, millions of nodes, billions of nodes, or more, as examples. As the number of network devices communicating via a network grow, signals transmissions via a network, such as in the form of signal packets, for example, may begin to interfere. Thus, it may be desirable to create and/or generate a logical, private network, such as via (e.g., over) the Internet, to potentially limit the number of signal transmissions at least partially without necessarily limiting geographies, for example, by having portions of a logical, connected, secure private network in geographies of potential interest. In addition, it may be possible to purchase available capacity, such as memory and/or processing capacity of a third party, as examples, in separate markets, such as markets where costs may be more appealing, providing another potential benefit, as explained in more detail later. For example, applications, such as software applications, may execute above or on infrastructure, such as networking infrastructure and/or computing infrastructure, in a manner to provide capabilities, such as these as well as others. Thus, for example, one or more software applications may execute on computing and/or memory resources owned by a third party to create and/or generate a logical, private network for an entity other than the third party that owns the computing and/or memory resources, as explained in more detail later. In this context, networking infrastructure refers to conventional hardware and software that is deployed or deployable to provide networking functionality and/or network services without using or including components substantially in accordance with claimed subject. Likewise, in this context, computing infrastructure refers to conventional hardware and software that is deployed or deployable to provide computing functionality and/or services without using or including components substantially in accordance with claimed subject matter.

In this context, the terms cloud, cloud computing, cloud hosting and/or similar terms refers to is the use of network and/or computing resources (e.g., hardware), network and/or computing applications (e.g., software), or any combinations thereof delivered as a service over a network (typically the Internet), meaning here, in essence, the use of hardware and/or software owned by one or more third parties. A benefit of use of the cloud or cloud computing is that it permits someone, such as an entity, (e.g., a network provider, for example) to offer a product and/or service without necessarily owning the hardware and/or software, or at least large portions thereof. Thus, for example, a third party handles obtaining power, purchasing equipment, renting space, obtaining connectivity, etc., etc. An example, but not the only one, includes Amazon AWS, which, for example, owns and/or provides data centers with equipment, etc., it makes available to others, as described.

Although a router may link otherwise independent LANs through routing of signal packets, a router may also provide some limits on signal packet transmissions to a select set of devices, such as network devices and/or computing devices, for example. A router may limit signal packet transmissions via implicitly or explicitly producing a broadcast domain (also referred to as BD or as a broadcast domain). In this context, the term broadcast domain refers to a set of devices, such as network devices and/or computing devices, including associated services and/or support, occupying a network address space, such as a local network address space, in which any device is able to communicate with any other device in the broadcast domain without rerouting a transmission, such as a signal packet, for example. Although claimed subject matter is not necessarily limited in scope in this respect, additional example embodiments of a broadcast domain (along with related technology) may be discussed in U.S. patent application Ser. No. 13/543,729, titled "COMMUNICATION BETWEEN BROADCAST DOMAINS," filed on Jul. 6, 2012, by Hankins et al., herein incorporated by reference in its entirety and assigned to the assignee of currently claimed subject matter. For example, a signal packet may be transmitted to other devices in a broadcast domain without being directed or redirected via a router or similar device, such as a device capable of affecting routing of signal packets, for example. Using a router or a similar device able to perform network address translation, portions of networks may be logically separate and independent such that transmissions in the form of signal packets transmitted by a network device on a network, for example, may not necessarily be forwarded from the BD unless a destination having a particular destination address of a signal packet transmission exists outside the particular broadcast domain. In this context, a device capable of performing network address translation is referred to generically as a NAT device or a NAT. The foregoing effectively illustrates one example of logically independent and separate (e.g., non-overlapping) divisions of a network, in which the divisions may comprise examples of respective broadcast domains.

Examples of broadcast domains may include logical BDs, virtual BDs, physical BDs or non-virtual BDs. For example, in this context, a physical BD refers to a traditional BD comprising a set of physical devices, in which a physical device is able to communicate with another physical device in the broadcast domain, e.g., as previously explained, without being rerouted. For example, a signal packet may be transmitted from one device in the BD to another device in the BD without being directed or redirected via a router or similar device, such as a device capable of affecting routing of signal packets, for example. In contrast, a virtual BD refers to a BD that includes at least some virtual components within the BD, such as a virtual device, and/or to a BD in which physical devices are linked, such as via a tunnel server, for example, as explained in more detail later. If used in a networking context, rather than generically, the terms linked and/or connected, such as, for example, if used to refer to devices in separate BDs, such as network devices and/or computing devices, refers to allowing signal packets to communicate between broadcast domains as if the broadcast domains are not separate, but without substantially changing the broadcast domain configuration of the separate broadcast domains. Again, although claimed subject matter is not necessarily limited in scope in this respect, additional example embodiments (along with related technology) may be discussed in aforementioned U.S. patent application Ser. No. 13/543,729. The terms connected, linked, logically joined and/or similar terms may be used interchangeably in context, such as in a networking context. Likewise, in this context, a virtual broadcast domain may refer to a broadcast domain generated and/or created by linking two or more broadcast domains at least for a period of time. A virtual BD operates like (e.g., similar to) a physical BD, however, a virtual device that may be part of a BD (e.g., a virtual BD), for example, is not necessarily associated with the same particular physical devices at all times. For example, a virtual device in a virtual BD, may move from one physical device to a different physical device, as a simple example, and remain in the BD where, for example, state of the device, although virtual, is maintained. Thus, while a virtual device in the BD necessarily executes on a physical device, it does not necessarily always execute on the same physical device at all times.

A broadcast domain may also be referred to as a logical broadcast domain (also referred to as LBD). A logical broadcast domain may comprise a virtual broadcast domain and/or a physical broadcast domain. A logical broadcast domain that includes a virtual broadcast domain, for example, may refer to a logical broadcast domain in which spatial confines, so to speak, of at least portions of the broadcast domain may not be entirely related to a particular set of physical devices. For example, some devices in the BD may not be consistently limited or associated with any particular physical devices. Some devices of the broadcast domain, for example, may be logically independent of physical devices, as alluded to above in connection with discussion of a virtual BD.

Along similar lines, a virtual local area network (VLAN) may, for example, comprise a logical partition or sub-partition of an otherwise physical LAN and/or logically joined (e.g., linked) logical partitions or logical sub-partitions of multiple physical LANs, for example. Likewise, a virtual network may comprise a similar concept in which logical partitions or sub-partitions of LANs, VLANs or virtual broadcast domains, may, for example, in an embodiment, be logically joined (e.g., linked) at least for a period of time. A non-virtual broadcast domain simply is another way to refer to a physical BD since it refers to a broadcast domain in which the broadcast domain devices exclude any virtual devices. Thus, devices in a non-virtual BD may comprise physical devices, such as a router, a computing platform (that includes a computing device, for example), a network device, etc. The term broadcast domain is also used in a generic sense meaning that it is not limited exclusively to a broadcast type of signal packet transmission scheme and/or may include in addition to and/or in place of a broadcast, other types of signal packet transmission schemes, such as, but not limited to, anycast, broadcast, multicast, unicast, geocast, the like, or any combinations thereof.

A network device comprises a device capable of communicating via a network, as mentioned. A computing device comprises a device capable of executing computations.

Thus, for example, network devices may comprise computing devices, non-computing devices, and/or other devices. A network device may comprise, as non-limiting examples, a router, gateway, hub, switch, host, mobile device, server, client, NAT device, the like, or any combinations thereof. A server, which may comprise a computing device, may also operate as network device, by serving content over a network. For example, a server may provide now known and/or to be later developed, service arrangements, derivatives, and/or improvements, including past, present, and/or future services comprising, but not limited to, web services, third-party services, audio services, video services, email services, instant messaging (IM) services, SMS services, MMS services, voice over IP (VOIP) services, calendaring services, photo services, database services, facsimile services, file services, domain name services, game services, printing services, proxy services, data streaming services, peer-to-peer services, other services, the like or any combinations thereof. Examples of content may include text, images, audio, video, the like, or any combinations thereof, which may be processed in the form of physical signals, such as electrical signals, for example, or may be stored in memory, as physical states, for example.

As indicated above, a logical broadcast domain refers to at least a logical division of a network comprising a plurality of network devices such that network devices communicating via the logical division of the network may communicate with other network devices communicating via the logical division without use of a router or other network device capable of limiting network communications and/or rerouting signal packet transmissions. For example, as a non-limiting illustration, a single logical broadcast domain may be constructed using multiple repeaters, hubs, NAT devices, and/or switches, whereby a network device communicating via one of the multiple repeaters, hubs, NAT devices or switches may communicate with another network device communicating via one of the repeaters, hubs, NAT devices and/or switches.

In one example illustrative embodiment, use of a discovery device and a reflecting device, may allow network devices communicating via their respective broadcast domains, for example, to discover and request services available via other network devices while still communicating via remote broadcast domains and potentially with less complexity, traffic and/or expense than conventional routing. In one possible illustrative embodiment, a controller may manage a plurality of respective discovery and reflecting devices communicating via their respective broadcast domains. In still another possible embodiment, a controller may provision one or more tunnel servers, for example, to facilitate communications between network devices communicating as part of different broadcast domains. Likewise, in still another illustrative embodiment, a controller may comprise a master controller that may be used to manage other controllers, for example, although there may, of course, be more than one or even several master controllers in a particular embodiment. In one or more embodiment, operations may be performed, for example, by software implemented applications that may be executing on or above a software stack of a device, such as a network device and/or a computing device; of course, this is not necessarily required, but it may be typical in some embodiments.

For example, in an embodiment, a discovery device may comprise a network device capable of communicating as part of a broadcast domain to discover features of the particular broadcast domain without human intervention to generate a broadcast domain configuration of the particular broadcast domain. A discovery device may engage in a variety of activities to accomplish this including, but not limited to any of the following: passively monitoring signal packets, actively probing other network devices, port scanning other network devices, querying other network devices, querying servers, such as a domain controller or other server responsible for a directory of broadcast domain features, any combinations thereof, or other approaches. In this context, as mentioned, without human intervention indicates that processes may be executed without human intelligence being on hand or otherwise available to make appropriate adaptations or changes, such as, if unanticipated events take place, for example. One or more processes may execute satisfactorily to accomplish a particular result, for example, without such human intelligence, interaction or direction. Thus, in a sense, processes may be performed automatically, so to speak. As previously mentioned, in one or more embodiments, operations may be performed, for example, by software implemented applications that may be executing on or above a software stack of a device, such as a network device and/or a computing device; of course, this is not necessarily required, but it may be typical in some embodiments.

Industry software applications may also assist in generating a broadcast domain configuration. For example, Nmap, a GNU software program, written by Gordon Lyon (also known by his pseudonym Fyodor Vaskovich) and available for download, for example, at the website www.nmap.org, comprises network scanner software capable of discovering hosts and/or services on a broadcast domain. Nmap may be executed by a computing or a network device to send network transmissions in the form of signal packets to hosts on a broadcast domain and may evaluate received response packets. Nmap is at least capable of discovering a host operating system, names and versions of available services, estimated uptime, hardware parameters and/or other network parameters. A discovery device, for example, may discover a broadcast domain configuration parameter using Nmap or any other software application capable of similar discovery. Thus, a software implemented application to perform discovery, for example, may execute above or on other software of a software stack executing on a device, such as a computing device and/or a network device, for example. As an example, a virtual device may be executing discovery. Likewise, as previously indicated, in an embodiment, the virtual device may be executing on a physical device owned by a third party, for example; although, again, not necessarily.

Thus, in an example embodiment, a broadcast domain configuration may be generated by a discovery device monitoring discovery signal packets via a broadcast domain. A discovery device in an embodiment, as indicated, may comprise a network device and/or a computing device executing an appropriate software application. A discovery device may also passively monitor signal packets that may comprise information relative to a broadcast domain configuration. A discovery device may also actively probe one or more devices, such as communicating as part of a broadcast domain or addressable via a broadcast domain. For example, a discovery device may port scan another device communicating as part of a broadcast domain, or use a software application capable of accomplishing such a task, for example. In this context, a domain controller refers to a network device that is capable of responding to security authentication requests on a broadcast domain. A discovery device may request broadcast domain configuration parameters from an active directory server or other network device capable of maintaining a directory of broadcast domain configuration parameters. For example, a domain controller may comprise an active directory server, and a discovery device may query an active directory server by transmitting signal packets requesting a response comprising discovery signal information. Again, as indicated, a software implemented application, for example, may perform operations in an embodiment.

Likewise, in another embodiment, available services via a network device may be determined based at least in part on which ports are open on a network device. Port scanning a network device may determine which ports may be open by transmitting signal packets to request a connection with a network device on a port. A network device may respond, for example, by transmitting signal packets indicating an available connection. See, for example, RFC 793-Transmission Control. Protocol, available, for example, from the Internet Engineering Task Force (IETF), at www.ietf.org. Signal packets comprising responses may imply that a port may be available.

Because network port numbers may consistently map to known services, a network device monitoring these responses may at least in part discover which services may be available via other network devices. For example, an open port 20 or 21 may imply that an FTP service may be available. Additionally, SSH may be available via port 22, Telnet may be available via port 23, SMTP may be available via port 25, POP3 may be available via port 110, or HTTPS may be available via port 443, for example. As is known in the art, associations between port numbers and services may be consistent, or may change over time. As associations between port numbers and services evolve, it is intended that claimed subject matter include discovery of available services according to evolving industry standards. As in known in the art, port scanning may be accomplished via TCP scanning, SYN scanning, UDP scanning, ACK scanning, Window scanning, FIN scanning, or other scanning types or methods, as may be known in the art or may later be developed.

In another illustrative embodiment, a reflecting device may comprise a network device capable of communicating as part a broadcast domain and capable of emulating a generated (e.g., other) broadcast domain configuration without human intervention. As previously mentioned in connection with discussion of a discovery device, in one or more embodiments, operations of a reflecting device may be performed, for example, by software implemented applications that may be executing on or above a software stack of a device, such as a network device and/or a computing device; of course, this is not necessarily required, but it may be typical in some embodiments. In this context, the term emulate refers to software stored or capable of executing on a physical device in which, the software, if executed by a physical device, for example, would appear to another network device as a device other than the physical device that is executing the software. Emulation may include operating as a proxy, meaning to appear as another device that may exist or it may include appearing as a device that does not exist anywhere. Likewise, emulation may include appearing as an enhanced or augmented version of another device or as a more limited version of another device. Furthermore, the term device, unless specified to be a physical device may include a virtual device or an emulated device.

In an embodiment, emulation may comprise, for example, a first network device simulating another network device via a broadcast domain. Another network device, in this example, may comprise a physical network device, or a virtual network device. Therefore, the emulated device may not exist as a physical piece of hardware. The emulating device may, however, make services available via a broadcast domain by transmitting signal packets in which, for example, requests for services may be forwarded to the emulated device to perform advertised services, for example, if the emulated device comprises a physical device. In another embodiment, an emulating device may offer services via a broadcast domain without forwarding requests to another network device. Additionally, emulation, in an embodiment, may comprise imitating another network device. However, another network device may exist virtually, and/or may comprise a set instructions being executed via another network device and/or computing device. Although services may appear to be available via a device, the device may, therefore, in an embodiment, comprise a virtual device. For example, a software application may execute instructions such as a virtual device on or above a software stack of a physical device.

In a possible example embodiment, a reflecting device may receive signal packets from a discovery device communicating via a remote broadcast domain, which may comprise a broadcast domain configuration including features of a broadcast domain, such as those disclosed below, for example. A reflecting device may forward signal packets via a local broadcast domain in a manner so as to emulate a generated broadcast domain configuration.

In this context, the term logical broadcast domain configuration refers to various hardware devices, firmware, and/or software applications (if residing in one or more locations within a LBD so as to be capable of being accessed or executed electronically, such as via a computing device) supporting a logical broadcast domain. As used in this specification, a logical broadcast domain configuration, therefore, may include stored signal packets relating to one or more features of a logical broadcast domain. For example, a configuration may represent, characterize and/or specify information, although in physical form, such as signals, related to one or more features, and/or other stored information, again, in physical form, such as memory states, relating to one or more features of a network device communicating via the logical broadcast domain, such as to represent, characterize and/or specify the one or more features of the LBD. Although claimed subject matter is not necessarily limited in scope in this respect, additional example embodiments of a broadcast domain configuration (along with related technology) may be discussed in aforementioned U.S. patent application Ser. No. 13/543,729.

For example, a broadcast domain configuration may include a subset of, and/or additions to the following non-limiting illustrative examples of features: one or more network protocols, available addresses, used addresses, topologies, devices used, such as switches or hubs, historical settings, such as for security, for a network protocol, etc., modifications of the foregoing, user accounts, including status, authentication, etc., security settings of a broadcast domain, workgroup or domain names, device names including status, available device features, etc., services available and/or used, status of the network devices, as well as other features.

In one example illustrative embodiment, use of a network device, for example, may allow network devices communicating via their respective logical broadcast domains, for example, to discover and/or request services available via network devices of another logical broadcast domain while still communicating via their respective logical broadcast domains, potentially at least partially with less complexity, traffic and/or expense than conventional routing. In this context, the term gateway device may also be employed to refer to a network device able to link logical broadcast domains via a tunnel server. As a matter of convenience, however, it is understood that any network device may include such a capability, such as, for example, if loaded with software providing an appropriate capability, as described in more detail throughout this specification. Therefore, it is not intended that the term gateway be used in this document to exclusively refer to devices having such capability. Likewise, in this context, the term linking logical broadcast domains refers to allowing signal packets to communicate between logically separate broadcast domains as if the logical broadcast domains are not separate, but without substantially changing the broadcast domain configuration of the separate, logical broadcast domains. As mentioned, the terms connected, linked, logically joined and/or similar terms are used interchangeably in context, such as in a networking context (as opposed to generically). Likewise, in this context, a virtual broadcast domain may be generated and/or created by linking logical broadcast domains at least for a period of time. It is also noted that in an embodiment or implementation, a logical broadcast domain may comprise a single and/or remote stand-alone device.

Thus, in one embodiment, devices communicating as part of a virtual broadcast domain, may communicate with devices operating as part of a non-virtual broadcast domain, respectively, for example. In one illustrative embodiment, this may be accomplished via use of a tunnel server linking several network devices, for example. A tunnel server may, for example, execute software capable of receiving and/or sending signal packets from network devices in different logical broadcast domains. Different logical broadcast domains may otherwise use separate routers, for example. Typically, therefore, different logical broadcast domains may occupy separate network address spaces, such as separate IP address spaces, as an example. Also, typically, routers may provide network address translation so that signal packets may be properly routed after leaving a particular logical broadcast domain. However, if, for example, separate routers for respective BDs include a routing table, or similar mechanism, such that signal packets intended to reach another logical broadcast domain are routed to a tunnel server, in this example embodiment, as a result, network address translation may be by-passed. Network devices in separate logical broadcast domains may, therefore, communicate with and/or via a tunnel server. A tunnel server may forward traffic (e.g., signal packet transmissions) between gateway devices, for example, such as for communications between different logical broadcast domains Although claimed subject matter is not necessarily limited in scope in this respect, additional example embodiments of a tunnel server (along with related technology) may be discussed in U.S. patent application Ser. No. 13/675,552, titled "LINKING LOGICAL BROADCAST DOMAINS," filed on Nov. 13, 2012, by Hankins et al., herein incorporated by reference in its entirety and assigned to the assignee of currently claimed subject matter.

Thus, for example, if a virtual broadcast domain provides a signal packet A to a tunnel server, it may be encapsulated. Likewise, if a non-virtual broadcast domain provides a signal packet B to a tunnel server it may be encapsulated. However, in this embodiment, a tunnel server may likewise remove encapsulation (e.g., referred to as termination) to determine where to forward a signal packet and re-encapsulate it for forwarding. It is noted that the encapsulation is a term of art, but may take a variety of forms. Claimed subject matter is not intended to be limited to a particular form of encapsulation. Likewise, in an embodiment, as a few non-limiting illustrative examples, encapsulation may include encryption as well, and/or may separate encapsulation from termination. Of course, use of gateway devices, network devices and/or tunnel servers may involve much more complex network transmission and/or routing arrangements as well. The previous description is simplified for purposes of illustration and, therefore, is not intended to be limiting.

In one possible illustrative embodiment, a controller may manage a plurality of respective gateway devices communicating via their respective logical broadcast domains. In still another possible embodiment, a controller may provision one or more tunnel servers, for example, to facilitate communications between network devices communicating as part of different, respective logical broadcast domains (e.g., gateways in respective LBDs may communicate via a tunnel server). Likewise, in still another illustrative embodiment, a controller may comprise a master controller that may be used to manage other controllers, for example, although there may, of course, be more than one or even several master controllers, as well as several private networks, in a particular embodiment. As shall become clear later, in an embodiment, although subject matter is not limited in scope in this respect, use of a controller may provide a capability for centralized management of a private network, for example. In an embodiment, for example, this may at least partially, for example, include one or more software implemented applications.

The term tunnel server refers to a mechanism or technique capable of being implemented in a network, such as in software, firmware, hardware or any combination thereof (other than software per se, since software is executed, of course, typically on one or more computing devices), that includes a capability to link logical broadcast domains, such as via encapsulation of signal packets, as previously described, for example. For example, a tunnel server may comprise a software application initiated by a controller, but potentially executed elsewhere, such as on a separate server. Throughout this document the term software application and/or software implemented application is understood to also encompass more than one software application and/or more than one software implemented application. For example, in an embodiment, a tunnel server may be implemented as a virtual device executing on one or more servers owned by one or more third parties; although claimed subject matter is not limited in scope in this respect. Furthermore, in another embodiment, a tunnel server may comprise a network device physically, logically, virtually or non-virtually separate from a controller. Likewise, a tunnel server may execute additional services. For example, in an embodiment, a tunnel service may also include a capability to implement a private network policy and inspection. In this context, the term private network policy and inspection refers to a capability to implement a unified networking policy, despite potentially being physically or logically separate networks and/or physically or logically separate sub-networks, for example. Furthermore, implementing a private network policy and inspection includes a capability for selected networks and/or sub-networks to implement selected policies or for selected networks and/or sub-networks to implement or employ a unified policy. Selected networking policies or a unified networking policy may, for example, include particulars regarding implementing at least one of the following processes: virus scanning, authentication, filtering (including URL filtering, for example), deep packet inspection, encryption, a firewall, or any combinations thereof.

Additionally, a tunnel server may, in an embodiment, be employed to provide a virtual and/or online presence that may be employed to deploy network services, resources and/or applications, referred to here as network-related features. It is, of course, however, appreciated that claimed subject matter is not limited to creating a virtual and/or online presence for deployment of network-related features to a private network via a tunnel server. Other approaches are possible and are intend to be included within claimed subject matter. Nonetheless, continuing with this embodiment example, as mentioned, a tunnel server, for example, may be employed to monitor and/or measure network traffic. To do so may involve, for example, termination of signal packet encapsulation. After termination of encapsulation, subsequent re-encapsulation may then permit a signal packet to continue to traverse a private network in an embodiment. A process of termination of encapsulation and re-encapsulation may in this context be termed a private network "hop." Implementation of a private network "hop," in an embodiment, provides, in addition to centralized management of a private network, as previously mentioned, a capability to generate or provide a mechanism for deployment of network-related features. Thus, a private network provider, such as Pertino, Inc., for example, in effect, may become a virtual member of every private network that it provides or generates for its users, if desired. As a network member, Pertino, therefore, it able to deploy network-related features largely on demand, in a seamless, turnkey fashion, with little technical know-how needed by the user, in a manner that is dynamic, configurable and/or reconfigurable in real-time, potentially global in scope, scalable, without ownership of hardware, as well as other potential benefits, as described in more detail later. Of course, claimed subject matter is not limited in scope to any particular advantage since it may dependent on the particular embodiment.

Of course, deployment of network-related features may depend at least in part on details of a feature. For example, "in line" type services, such as deep packet inspection and/or virus protection, as discussed, may relate to a private network "hop," for example. Likewise, addition (or removal) of infrastructure, such as adding memory, adding an exchange server or even adding a virtual device, may be accomplished via a logical broadcast domain, along with an associate logical broadcast domain configuration. For example, without limit, after a user request, a controller may initiate provisioning and/or deployment. Along similar lines, services related to generating reports of private network related activity, for example, may be accomplished via a management device, which may or may not be included in a private network, as described, for example, in previously referenced US patent application U.S. patent application Ser. No. 14/763,805. For example, a user request may result in a controller query of a database, which may be local or otherwise accessible. Likewise, some network-related features may be deployed using one or more controllers, one or more tunnel servers, one or more gateway devices of one or more logical broadcast domains, one or more logical broadcast domain configurations, querying one or more databases, or any combinations thereof. For example, a geo location feature, as one example, may employ some combination of components.

Likewise, in an embodiment, a gateway device may comprise a network device capable of communicating as part of a broadcast domain to discover features of another broadcast domain without human intervention, such as, for example, to generate a broadcast domain configuration of another broadcast domain. Although claimed subject matter is not necessarily limited in scope in this respect, additional example embodiments of a broadcast domain configuration (along with related technology) may be discussed in aforementioned U.S. patent application Ser. No. 13/543,729. As described previously, the term gateway device is introduced as a matter of convenience; it is intended that within this specification any network device may include such a capability, such as via one or more software implemented applications, for example. For example, a network device may engage in a variety of activities to accomplish this including, but not limited, to any of the following: passively monitoring signal packets, actively probing other network devices, port scanning other network devices, querying other network devices, querying servers, such as a domain controller and/or other server responsible for a directory of broadcast domain features, any combinations thereof, or even other approaches. Thus, although a gateway device may be referred to as a matter of convenience in connection with a broadcast domain, for example, it is to be understood, of course, that a gateway device is provided as merely one illustration of a network device, such as a network device with capability to perform operations, as described, for example, such as, discovery, reflection, communication with a tunnel server, operating as a tunnel server, operating as a controller, etc. Likewise, a network device may be implemented virtually (e.g., logically) or non-virtually (e.g., physically). Furthermore, in this context, without human intervention indicates that processes may be executed without human intelligence being on hand or otherwise generally available to make appropriate adaptations or changes, such as, if unanticipated events take place, for example. Throughout this specification, unless otherwise stated, it is intended that a process or processes be interpreted as being executed without human intervention. Thus, one or more processes may execute satisfactorily to accomplish a particular result, without human intelligence, interaction and/or direction, for example. Thus, in a sense, such processes at least may be said to be performed automatically. Typically, although not necessarily, this may include one or more software implemented applications.

As previously described, in an embodiment, for example, a controller may provide a capability of centralized management of a private network, such as a network comprising at least two logical broadcast domains, for example. Likewise, centralized management also provides a capability to virtually deploy or provision network services, resources and/or applications, referred to here as network-related features, as alluded to previously and explained in more detail later. As suggested, although claimed subject matter is not necessarily limited in this respect, in an embodiment, for example, a controller may be implemented via a server that may be associated with a node on the Internet, for example. However, as also suggested previously, management of a network, such as a private network, (which may, as simply an example, comprise a communications network for a business or an entity, for example) conventionally or typically involves some depth of technical knowledge and/or experience, such as typically may reside in a company's IT department, for example. Unfortunately, however, for small businesses or the like, as non-limiting examples, such knowledge, experience and/or capability may at least in some respects be out of reach, as a result of overhead expense, for example, that may accompany maintaining such a department.

One advantage of employing approaches consistent with embodiments previously discussed and/or related subject matter may be that a communications network may be initiated, expanded, modified and/or maintained yet still realize an associated reduced cost and/or performance improvement in comparison with traditional, conventional or state of the art networking approaches. Of course, medium or large size business may also benefit from such as approach. As will be discussed, additional advantages may also be present in an embodiment.

Possible benefits depending, of course, on particulars of an embodiment may include, for example, providing essentially a "turnkey" mechanism to bring "online" a private network of potentially worldwide geographical scope with roughly little more than an amount of technical knowledge usually employed to operate a standardly available web browser on a standardly available computing device, for example, such as the amount of technical knowledge employed to participate in a social network, such as Facebook or Google+, as simply illustrative examples. Thus, in an embodiment, a private network "in the cloud" may be managed via a GUI essentially as easily as it is to "friend" someone via Facebook, for example. Furthermore, in some embodiments, for example, hardware installation or even ownership may not necessarily be involved, as alluded to previously and explained in more detail later. Likewise, as alluded to, an embodiment of a private network in accordance with claimed subject matter, for example, may be secure, seamless, scalable and provide real-time, nearly instant (e.g., on demand) service.

As alluded, embodiments, for example, may be of benefit to smaller businesses, entities or the like, that typically may not have sufficient resources to finance or maintain an IT department on even a modest scale (although, as indicated, larger businesses may likewise benefit). Likewise, as also alluded, embodiments may leverage, for example, common place technical knowledge possessed by individuals, for example, such as those who may not be technical professionals and/or may possess a passing familiarity with computing and/or network communications technology (e.g., an amount of familiarity to use conventional computing devices, such as laptops, for example, and/or to communicate with others via those devices, etc.), but little more. Of course, it is also appreciated that these are merely illustrative examples and it is not intended that claimed subject matter be limited in scope to examples provided merely for illustrative purposes.

To provide only a few non-limiting examples here, in an embodiment, simple, but also seamless management capabilities may include provisioning and/or removing network services, resources and/or applications, including the following non-limiting examples: provisioning and/or removing computing and/or memory resources, provisioning and/or removing technical services, provisioning and/or removing software applications, adding and/or removing network users, adding and/or removing network devices, structuring groups of users and/or devices, such as for merger and/or segregation for on-going business projects, etc. As suggested, in this context, in general, resources refer to physical resources, such as may be provided by hardware (e.g., additional memory and/or processing capability). Likewise, in general, applications refer to software-related applications (e.g., at least partially implemented via software). The term 'services' refers generally to provisioning a capability for use, such as via a particular private network, which may, for example, include provisioning of resources and/or applications for use.

For example, in an embodiment, to manage a private network, such as one including at least two LBDs, for example, signal packet transmissions through a network may be initiated via (e.g., from) a network device. The initiating network device, nonetheless, need not be included in the private network. Devices included in a private network, as previously discussed, refers to a particular, limited set of network devices able to communicate with other network devices in the particular, limited set, such as via signal packet transmissions, for example, without a need for re-routing and/or redirecting such communications. In contrast, however, a device not included in the private network may be capable of being employed in management of the private network, without necessarily being a device within the private network. Of course, likewise, a device within the private network may also be capable of being employed to manage the private network. Likewise, one or more third party devices, such as a virtual device executing on one or more third party servers, as an example, may be employed.

For example, in an embodiment, a network device may be associated with a node and a controller may be associated with another node. Although claimed subject matter is not limited in scope in this respect, thus, in one example, the network device and the controller may respectively be associated with separate nodes, the nodes being accessible via the Internet, as an illustration. Thus, signal packet transmissions may be initiated from a network device to a controller, for example. In this example, a controller may comprise a mechanism for centralized management of a private network, such as previously described. For example, a controller may be implemented on a server, as one example, mentioned previously. Typically, but not necessarily, a controller may exist virtually, and/or may comprise a set instructions being executed via a device, such as a network device and/or computing device. Although a controller may appear to be available, the device may, in an embodiment, comprise a virtual device. For example, a software application may execute instructions such as a virtual device on or above a software stack of a physical device.

A network device, such as described in this example, typically may include a GUI, so that rendering of the GUI may take place. Of course, any one of a host of mechanisms to accomplish this are possible. For example, a standard web browser may be employed to render a GUI. A GUI, for example, may be rendered on a network device and/or a computing device based at least in part on signal packet transmissions to the device that may be initiated by a controller, for example. Thus, a client-server model in which, for example, a controller serves content to a client may be employed to render a GUI on a network device via a conventional browser without a plug-in, for example. Alternately, a plug-in may be employed to facilitate rendering of a GUI. In still another possible embodiment, a device, such as a network device and/or computing device, may include native software to render a GUI. These, of course, are merely illustrative examples and claimed subject matter is not restricted in scope to these or any other particular approaches, now known or later developed, that may be employed to render a GUI on a device having a display, such as on a network device, for example. Although in this example, the Internet was discussed, in an alternative embodiment, of course, the network may comprise any network, such as a stand-alone private network, an Intranet, a local area network, a wide area network, etc. Thus, as alluded to previously, a device, such as a network device and/or a computing device, to manage a private network may be included within the private network, but is not necessarily so.

Figure 6:
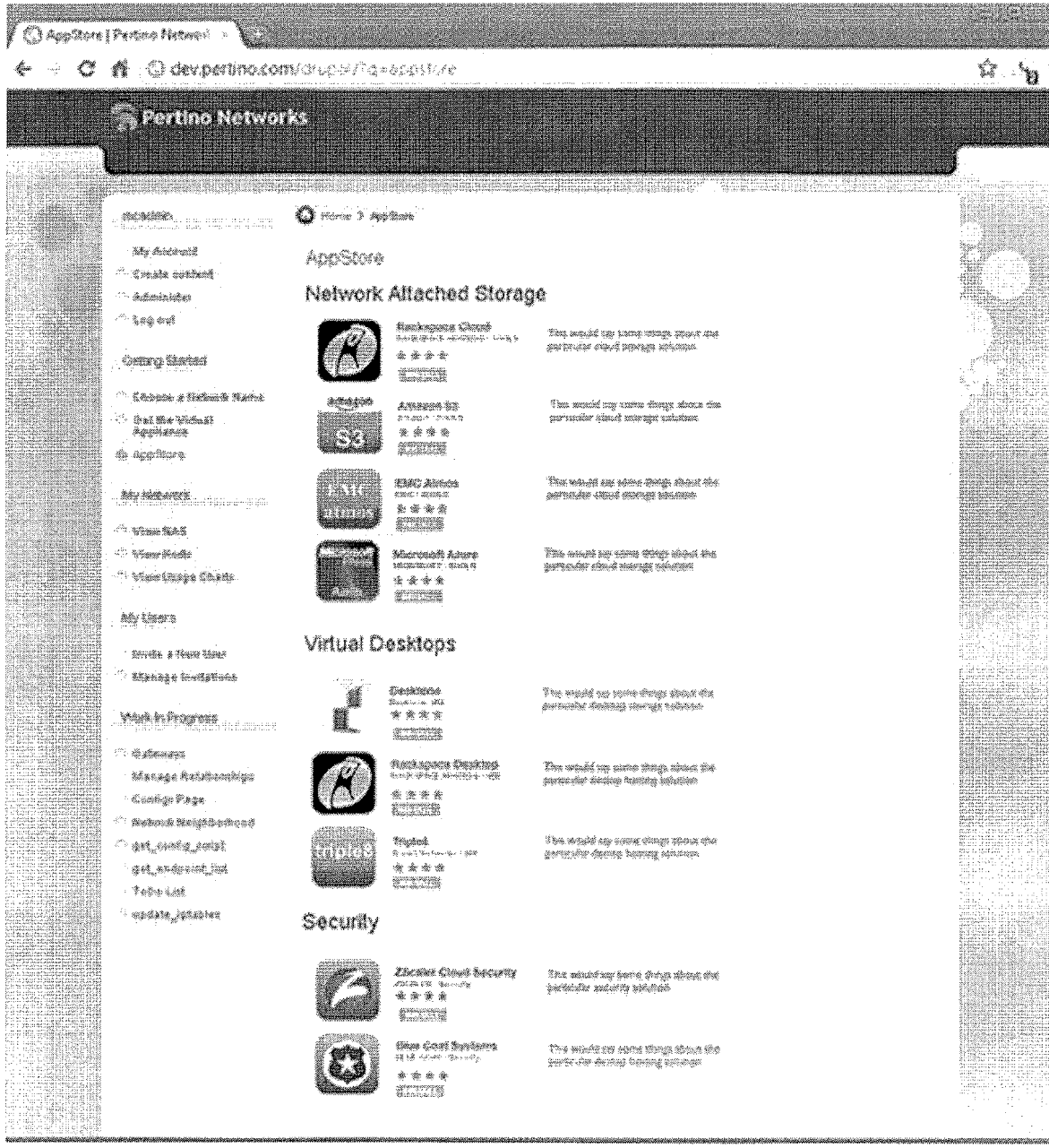
FIGS. 6-10 are screen shots of an embodiment of graphical user interface (GUI).
Figure 7:
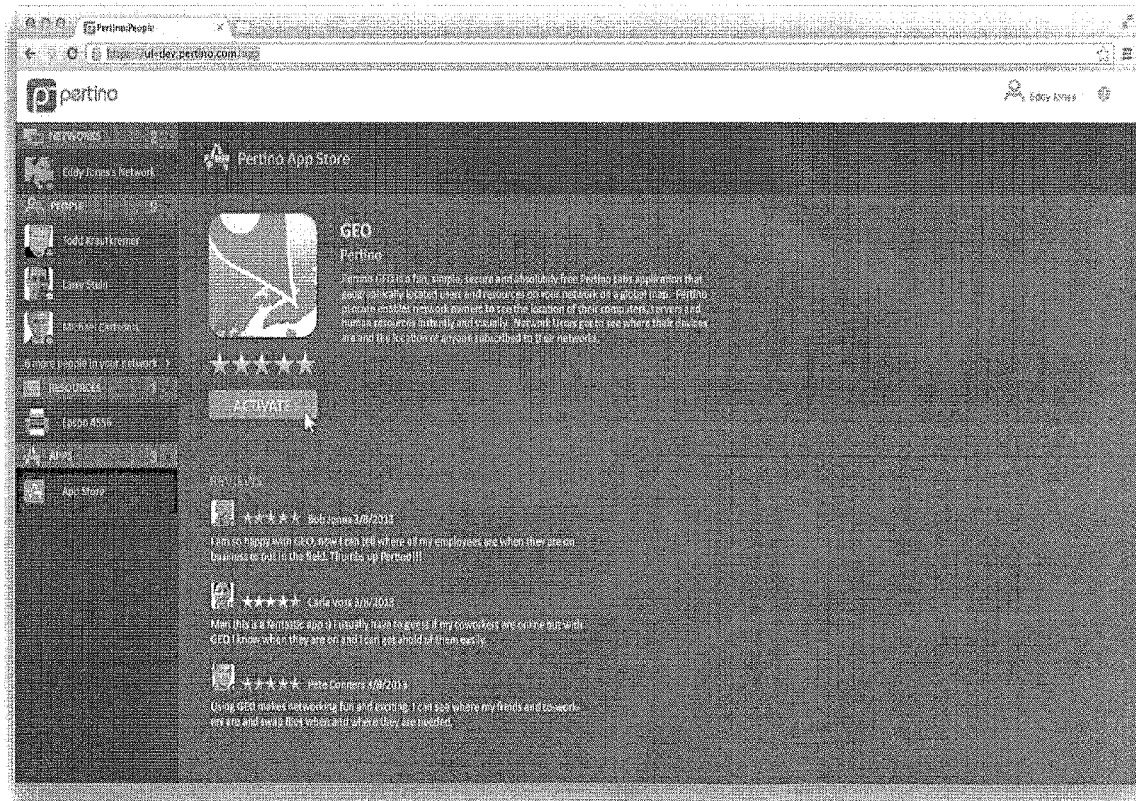
Figure 8:
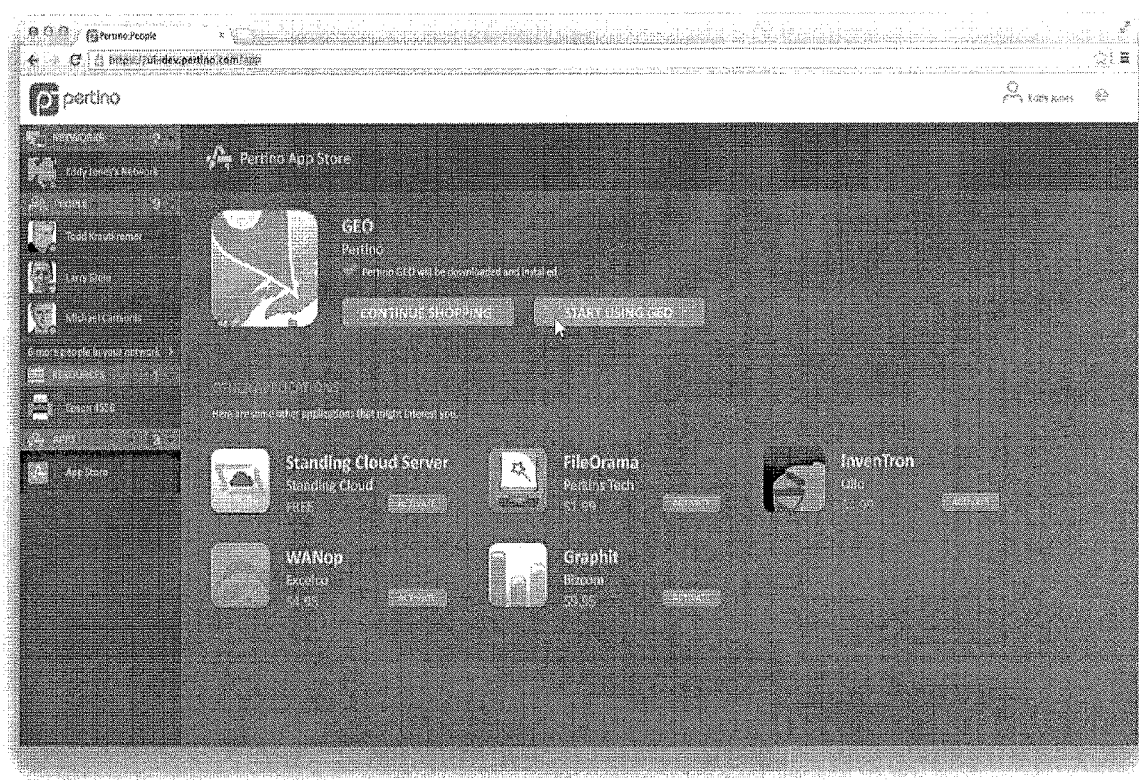
Figure 9:
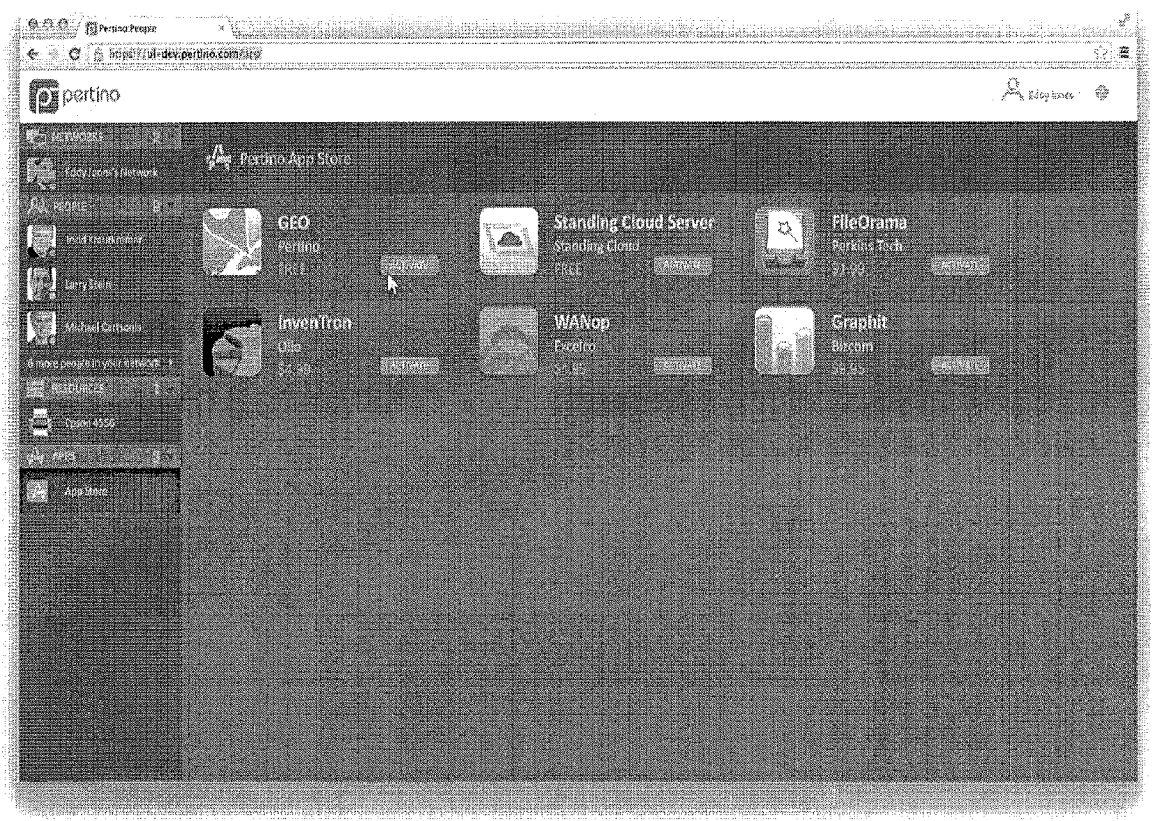

Likewise, in addition to management of a private network, as described in more detail and illustrated, for example, by FIG. 6, a GUI may be employed in connection with virtual deployment of network services, resources and/or applications. For example, a GUI may be rendered giving a user of a private network an ability to request provisioning and/or removal of services, resources and/or applications, such as, for example, the previously described non-limiting set of examples. Likewise, although navigating a GUI by a user involves human activity to make a selection, after a user request is provided, such as via a GUI, provisioning and/or removal of requested services, resources and/or applications may take place without further human intervention.

Figure 10:
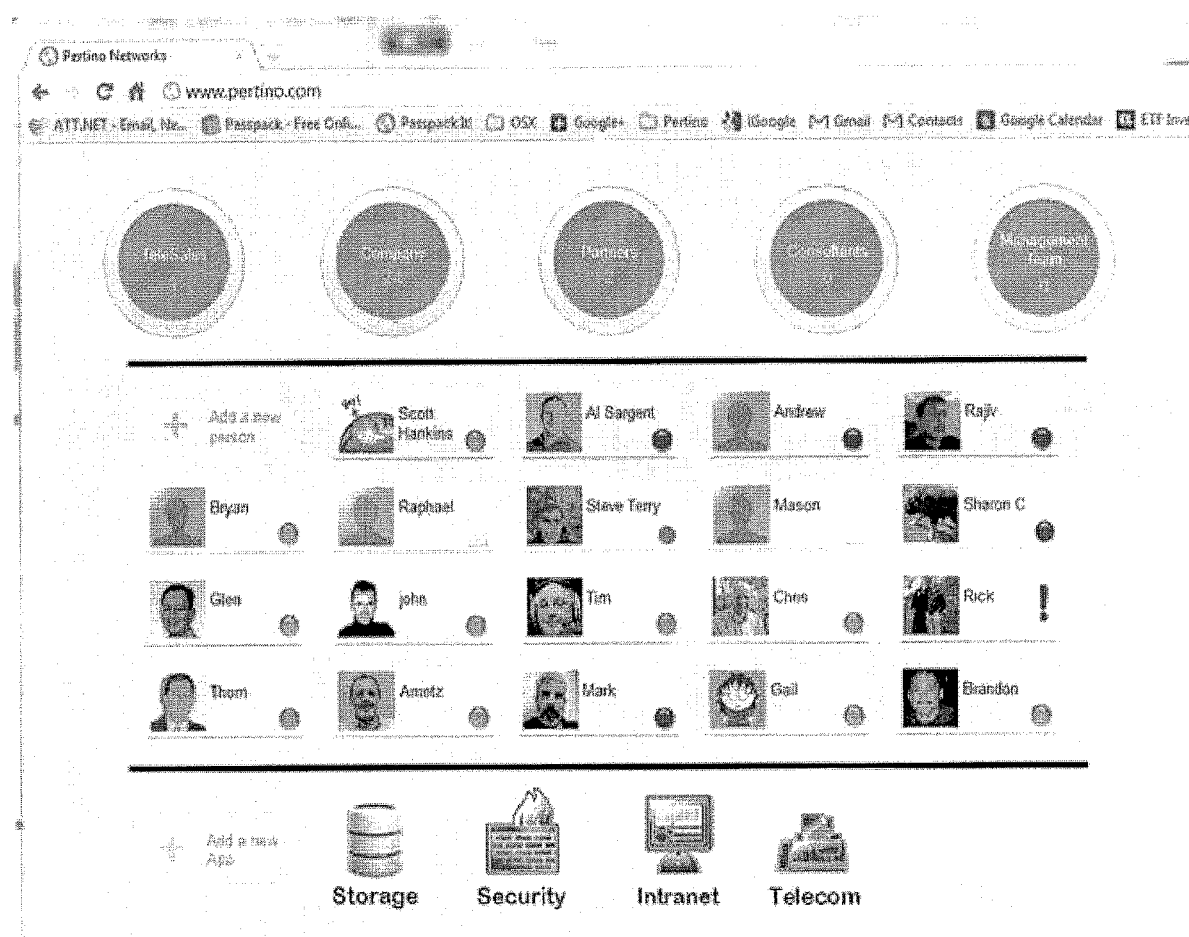

FIGS. 6-9, for example, illustrate screen shorts of an example of GUI for a virtual and/or online presence in which network-related features may be requested that may be offered without charge and/or for purchase. Likewise, FIG. 10 illustrates a GUI as described in previously mentioned U.S. patent application Ser. No. 14/763,805, in which a capability to request network related features, such as network resources, services and/or applications, is also illustrated.

As suggested previously, signal packet transmissions may be initiated from a device, such as a network device and/or a computing device. Initiated signal packet transmissions may be of use at least in part in terms of management of a private network, such as one comprising at least two or more logical broadcast domains. Again, as one simple and non-limiting example, initiated signal packet transmissions may result in a controller generating a separate logical broadcast domain that includes several devices that are included in a particular private network and are accessible to a controller of that network, for example. Similarly, but alternately, initiated signal packet transmissions may result in a controller generating a separate logical broadcast domain that includes several users for a private network, where, for example, users may be accessible via devices on the private network, the devices being associated with the users.

Although the previous example referred to a single device, of course, multiple devices may respectively have GUIs with similar capabilities. Likewise, an embodiment may involve multiple private networks. Furthermore, although a network device and/or a computing device may comprise a physical device; likewise, a device may comprise a virtual device in an embodiment, such as previously indicated. Along similar lines, in a generated LBD, as discussed above, one of the devices associated with one of the users may comprise a physical device, a virtual device or a user may, for example, have both an associated physical device and another associated virtual device, as an example.

In an embodiment, a device may relationally depict or display a network, such as a private network, in terms of users on the network, rather than in terms of devices on the network. One possible advantage includes a capability to thereby manage the network in a manner more in terms of the particular trait being depicted. For example, a network may be managed or oriented with respect to users, rather than devices, which may, in some situations or environments, turn out to be more useful or desirable. It is noted that the terms depict, display or similar terms may be used interchangeably. Although claimed subject matter is not necessarily limited in scope in this respect, additional example embodiments of a broadcast domain configuration (along with related technology) may be discussed in U.S. patent application Ser. No. 14/763,805, titled "PEOPLE CENTRIC MANAGEMENT OF CLOUD NETWORKS VIA GUI", filed on Jan. 22, 2013, by Cartsonis et al., herein incorporated by reference in its entirely and assigned to the assignee of claimed subject matter. In addition, as previously suggested, another advantage in an embodiment may include a capability for a private network user, for example, to make a request that results in virtual deployment of network services, resources and/or applications.

In an example embodiment, a database, such as a relational database, may store network-related associations (e.g., traits), for example. Therefore, in an illustrative, yet simplified embodiment, a device may display a relational GUI. For example, a depiction of a network may be rendered in terms of users, for example. However, it may be desirable to see a display of geographies in which those users are located, for example. In an embodiment, manipulation of a relational GUI on a device may result in querying a relational database. Signal packet transmissions from a controller may provide query results and a relational GUI may re-render a display of a network of users in terms of geography. Again, this is merely an illustrative, yet simplified, example and it is not intended that claimed subject matter be limited to simplified, illustrative examples, of course.

An example of an embodiment of a private network, such as at least two LBDs, is discussed below. FIG. 1 is a diagram illustrating an embodiment. For example, in an embodiment, one or more networks may be overlaid on or above network connectivity via networking infrastructure and/or computing infrastructure in a manner so as to form a connected, secure private network, as mentioned previously. The one or more overlaid private networks typically are implemented via one or more software implemented applications, for example. Although claimed subject matter is not necessarily limited in scope in this respect, additional example embodiments of a broadcast domain configuration (along with related technology) may be discussed in U.S. patent application Ser. No. 14/763,805, titled "PEOPLE CENTRIC MANAGEMENT OF CLOUD NETWORKS VIA GUI", filed on Jan. 22, 2013, by Cartsonis et al., herein incorporated by reference in its entirely and assigned to the assignee of claimed subject matter.

As shall be seen, such a network may also be flexible (e.g., reconfigurable in real-time). Of course, claimed subject matter is not limited in scope to examples or illustrations, such as discussed below, for example. Rather, typically, examples or illustrations may be simplified for ease of understanding, for example. In this context, network connectivity refers to the presence of sufficient connectivity among devices of a network or sub-network to support network communications. In this context, networking infrastructure refers to conventional hardware and software that is deployed or deployable to provide networking functionality and/or network services without using or including components substantially in accordance with claimed subject. Likewise, in this context, computing infrastructure refers to conventional hardware and software that is deployed or deployable to provide computing functionality and/or services without using or including components substantially in accordance with claimed subject matter. Thus, overlaying one or more networks, such as a private network on or over connectivity via infrastructure (and/or one or more networks being overlaid on or above) refers to creating and/or generating a private address space within a network. For example, in an embodiment encapsulation may be employed in a manner so that the one or more private networks reside on or above another network that includes another network address spec, for example. In an embodiment, for an interoperable system of software applications, software implemented applications may be employed in connection with the one or more private networks, such as executing as a virtual device on a computing device and/or network device, although, of course, this is not required and is merely one example.

As suggested previously, management of a network, such as a private network, (which may, as simply an example, comprise a communications network for a business or an entity, for example) conventionally or typically involves some depth of technical knowledge and/or experience, such as typically may reside in a company's IT department, for example. Unfortunately, however, for small businesses or the like, as non-limiting examples, such knowledge, experience and/or capability may at least in some respects be out of reach, as a result of overhead expense, for example, that may accompany maintaining such a department.

One advantage of employing approaches consistent with embodiments previously discussed and/or related subject matter may be that a communications network may be initiated, expanded, modified and/or maintained yet still realize an associated reduced cost and/or performance improvement in comparison with traditional, conventional or state of the art networking approaches. Of course, medium or large size business may also benefit from such as approach. As will be discussed, additional advantages may also be present in an embodiment.

Possible benefits depending, of course, on particulars of an embodiment may include, for example, providing essentially a "turnkey" mechanism to bring "online" a private network of potentially worldwide geographical scope with roughly little more than an amount of technical knowledge usually employed to operate a standardly available web browser on a standardly available computing device, for example, such as the amount of technical knowledge employed to participate in a social network, such as Facebook or Google+, as simply illustrative examples. Thus, in an embodiment, a private network "in the cloud" may be managed via a GUI essentially as easily as it is to "friend" someone via Facebook, for example. Furthermore, in some embodiments, for example, hardware installation or even ownership may not necessarily be involved, as explained in more detail. Likewise, as alluded to, an embodiment of a private network in accordance with claimed subject matter, for example, may be secure, seamless, scalable and provide real-time, nearly instant (e.g., on demand) service.

Likewise, in an embodiment, a private network may include one or more virtual network portions. A virtual network portion, likewise, may include one or more virtual devices. Virtual devices were discussed previously. For example, a virtual device in a virtual BD, may move from one physical device to a different physical device, as a simple example, and remain in the BD where, for example, state of the device, although virtual, is maintained. Thus, while a virtual device in the BD necessarily executes on a physical device, it does not necessarily always execute on the same physical device at all times.

Furthermore, in an embodiment, the private network may comprise a dynamic network. Thus, as alluded to, the network, or a portion thereof, such as a sub-network, may be configured or re-configured in real-time. As on example, discussed in more detail later, the private network may be configured or reconfigured geographically for any one of a host of possible reasons, including to improve performance and/or reduce costs. For example, as a non-limiting illustration, a private network may be reconfigured if throughput for a route through a provisioned tunnel server begins to drop below an acceptable level. Likewise, as discussed in an example, infra., reduced proximity between gateway devices and a provisioned tunnel server may reduce latency, for example. Of course, these are merely a few illustrative examples. Many more are possible and claimed subject matter is not limited in scope to illustrations.

As mentioned, a secure, connected private network may be overlaid on or over network connectivity via networking and/or computing infrastructure. Here, as mentioned, this includes conventional networking and computing hardware and software. Likewise, it may include one or more servers owned by one or more third parties. Thus, software implemented applications may include one or more virtual devices, as mentioned above, executing on one or more servers owned by one or more third parties, for example. As alluded to previously, a virtual device may execute on or above a software stack, for example. In an embodiment, the one or more virtual devices may include one or more tunnel servers provisioned, such as by a controller, for example. Likewise, the one or more virtual devices, or other virtual devices, may include one or more controllers, such as a master controller. Furthermore, in an embodiment, a tunnel server and a controller may be combined as part of a virtual device, for example. Although claimed subject matter is not necessarily limited in scope in this respect, additional example embodiments (along with related technology) may be discussed in U.S. patent application Ser. No. 13/829,611, titled "PRIVATE NETWORKS OVERLAID ON CLOUD INFRASTRUCTURE," filed on Mar. 13, 2013, by Hankins et al., herein incorporated by reference in its entirety and assigned to the assignee of currently claimed subject matter.

Likewise, a tunnel server may perform other services, as well. For example, in an embodiment, a tunnel service may also include a capability implement a private network policy and inspection process, which may, for example, including a unified networking policy, despite potentially being physically or logically separate networks and/or physically or logically separate sub-networks, for example. A private network policy and inspection process may also include for selected networks and/or sub-networks employing selected policies or selected networks and/or sub-networks employing a unified policy. Selected networking policies or a unified networking policy may, for example, include particulars regarding implementing at least one of the following processes: virus scanning, authentication, filtering (for example, URL filtering), deep packet inspection, encryption, a firewall, or any combinations thereof, as examples. Likewise, in an embodiment, one or more tunnel servers may, for example, perform network address translation.

Additionally, a tunnel server may, in an embodiment, be employed to provide a virtual and/or online presence that may be employed to deploy network-related features, such as services, resources and/or applications. As mentioned, a tunnel server, for example, may be employed to monitor network traffic. For example, in an implementation, as discussed, a private network "hop," in an embodiment, may provide a capability to generate or provide a virtual mechanism for deployment of network-related features, along with centralized management, also previously discussed. Thus, a private network provider, such as Pertino, for example, in effect, may become a virtual member of every private network it provides or generates for its users, if desired. As a network member, Pertino, therefore, is able to deploy network-related features, largely on demand, for example, as previously discussed and as discussed in more detail later.

Of course, deployment of network-related features may depend at least in part on details of a feature. For example, "in line" type services, such as deep packet inspection and/or virus protection, as discussed, may relate to a private network "hop," for example. Likewise, addition (or removal) of infrastructure, such as adding memory, adding an exchange server or even adding a virtual device, may be accomplished via a logical broadcast domain, along with an associate logical broadcast domain configuration. For example, without limit, after a user request, a controller may initiate provisioning and/or deployment. Along similar lines, services related to generating reports of private network related activity, for example, may be accomplished via a management device, which may or may not be included in a private network, as described, for example, in previously referenced US patent application U.S. patent application Ser. No. 14/763,805. For example, a user request may result in a controller query of a database, which may be local or otherwise accessible. Likewise, some network-related features may be deployed using one or more controllers, one or more tunnel servers, one or more gateway devices of one or more logical broadcast domains, one or more logical broadcast domain configurations, querying one or more databases, or any combinations thereof. For example, a geo location feature, as one example, may employ some combination of components.

As indicated previously, a private network may comprise at least two logical broadcast domains. Thus, in an embodiment, for example, one or more overlaid networks may include a capability to perform discovery and reflection of at least one of the at least two logical broadcast domains, of both of at least two LBDs, or of some or even of all LBDs where there may be more than two. In an embodiment, at least two logical broadcast domains forming an overlaid private network may be virtually linked, such as previously described. For example, in an embodiment, a tunnel server may be employed to link two logical broadcast domains. Thus, in an embodiment, for example, one or more overlaid private networks may include a capability to bypass routers performing network address translation. One potential benefit, although claimed subject matter is not limited in scope in this respect, may include potentially reduced network traffic at least in connection with network discovery, for example.

Another potential benefit, although again, claimed subject matter is not limited in scope in this respect, may include a capability to execute deployment of network services and/or network resources, as described in more detail, in particular on demand deployment. As suggested, in this context, in general, resources refer to physical resources, such as may be provided by hardware (e.g., additional memory and/or processing capability). Likewise, in general, applications refer to software-related applications (e.g., at least partially implemented via software). The term 'services' refers generally to provisioning a capability for use, such as via a particular private network, which may, for example, include provisioning of resources and/or applications for use.

In an embodiment, the capability to execute on demand deployment of network services and/or network resources may include marginal network resource allocation. As a non-limiting illustrative example, a private network or subnetwork may operate more effectively if additional memory or computing resources are brought online relatively quickly. Likewise, the capability to execute deployment of network services and/or network resources may include network scaling, such as up scaling or downscaling, which may also be implemented via on demand deployment of network services and/or network resources. Again, for example, if network utilization or network packet latency increases or decreases to an extent that may result in a noticeable effect on network performance, scaling up or scaling down resources as appropriate may be handled in real time, for example. Furthermore, in an embodiment, one or more overlaid private networks may include a capability to execute deployment of network services and/or network resources without human intervention based at least in part on a measured increase in network utilization and/or network latency, a measured reduction in network bandwidth or any combinations thereof. For example, without limitation as an illustrative example, network traffic may be monitored and/or measured.

As mentioned previously, a capability also exists in an embodiment to virtually deploy network-related features, such as network resources, network services and/or network applications. By providing both a simple graphical user interface and a sophisticated network infrastructure, as previously described, for example, it is possible to quickly integrate additional services that are developed by Pertino or by other companies that may work in cooperation with Pertino, without the use of costly hardware, experience and/or IT staff. These services, some of which may be pre-integrated, may, for example, in an embodiment, be presented to a user as an upgrade or add-on option to a base connectivity service, for example, if desired.

As a part of network generation, management and/or operation, a private network provider, such as Pertino, for example, should have access to a particular company or customer's network configuration, billing information and/or other related information. In addition, as previously described, control and/or visibility over network traffic is also available, such as for example, via a private network hop. Thus, with components such as these, provisioning additional features, such as service, resources and/or applications, into a generated private network may be executed with little effort and/or technical know-how needed. These features, in many cases may be rendered nearly instantly or in a greatly accelerated fashion, particularly in comparison with traditional deployment of network hardware. As previously alluded to, non-limiting examples of some potential offerings by Pertino, either alone or in association with another entity, may include: Wide Area Network Management and/or Optimization; Publishing/Sharing of Private Network Generated Information, such as Geo Location of users and/or devices; Data Loss Management and/or Prevention; Security Services and/or Protections (e.g., Antivirus, Malware protection etc.); Print services; Telephony and/or teleconferencing services; Network policy and/or Permissions, etc.

Although these are non-limiting examples rather than an exhaustive list, examples of potential network-related features may include the following:

Packet Path Services—These services may, for example, involve processing and/or redirection of network traffic, including virus scanning, URL filtering, deep packet inspection, intrusion detection, intrusion prevention and/or data loss prevention services, etc. Typically, these services may be pre-integrated as private network "in line" services.

Network Resources and/or Application—These may add infrastructure (e.g., hardware and/or software) to an existing private network. Examples may include additional memory, such as network attached storage, a service area network, additional processing capability such as (virtual) application servers and/or other devices, unified communication services, private email services, etc. Typically, these services need not be pre-integrated as private network "in line" services, and instead may take the form of an end point, such as an exchange server or memory that may be attached.

Network Data Services—These services may provide information about the network, such as analysis and/or diagnostics, including inventory, business activity analysis, traffic analysis, geo-location information, etc. An example may include deployment of a private network dashboard providing real-time or nearly real-time monitoring and/or measurement of the private network, etc.

Additional Network Services—These may deliver additional services to users via a private network. Services might include browser access to files and folders joining networks and/or LBDs together, re-addressing networks (cloaking), merging networks, network access control (NAC), etc.

Of course, deployment of network-related features may depend at least in part on details of a feature. For example, "in line" type services, such as deep packet inspection and/or virus protection, as discussed, may relate to a private network "hop," for example. Likewise, addition (or removal) of infrastructure, such as adding memory, adding an exchange server or even adding a virtual device, may be accomplished via a logical broadcast domain, along with an associate logical broadcast domain configuration. For example, without limit, after a user request, a controller may initiate provisioning and/or deployment. Along similar lines, services related to generating reports of private network related activity, for example, may be accomplished via a management device, which may or may not be included in a private network, as described, for example, in previously referenced US patent application U.S. patent application Ser. No. 14/763,805. For example, a user request may result in a controller query of a database, which may be local or otherwise accessible. Likewise, some network-related features may be deployed using one or more controllers, one or more tunnel servers, one or more gateway devices of one or more logical broadcast domains, one or more logical broadcast domain configurations, querying one or more databases, or any combinations thereof. For example, a geo location feature, as one example, may employ some combination of components.

Of course, claimed subject matter is not limited to illustrative embodiments, nonetheless, in one example embodiment, a simple to use graphical user interface that enables network owners/administrators to choose network-related features may be provided. For example, although claimed subject matter is not necessarily limited in scope in this respect, an example of a GUI (along with related technology) may be discussed in U.S. patent application Ser. No. 14/763,805, titled "PEOPLE CENTRIC MANAGEMENT OF CLOUD NETWORKS VIA GUI", filed on Jan. 22, 2013, by Cartsonis et al., herein incorporated by reference in its entirely and assigned to the assignee of claimed subject matter. After provisioning, an interface may also in an embodiment enable management and/or decommission of services, if desired, in an embodiment. As an example, a dashboard using widgets and well as dedicated management applications may be provided in an embodiment.

FIGS. 6-10 are screen shots illustrating examples of an embodiment of a possible GUI, discussed in more detail later, although, of course, this is simply one non-limiting example. A user interface may, for example, present a user with a menu of optional features, including resources, services and/or application, that may be purchased or added without additional change. Thus, in an embodiment, using available private network information a user may, without human intervention other than an initial request, add one or more additional services.

As previously mentioned, a tunnel server, for example, may, in an embodiment, be employed to provide a virtual and/or online presence that may be employed to deploy network-related features. It is, of course, however, appreciated that claimed subject matter is not limited to creating a virtual and/or online presence for deployment of network-related features to a private network via a tunnel server. Other approaches are possible and are intend to be included within claimed subject matter. Nonetheless, continuing with this embodiment example, as mentioned, a tunnel server, for example, may be employed to monitor and/or measure network traffic. To do so may involve, for example, termination of signal packet encapsulation. After termination of encapsulation, subsequent re-encapsulation may then permit a signal packet to continue to traverse a private network in an embodiment. A process of termination of encapsulation and re-encapsulation may in this context be termed a private network "hop." Implementation of a private network "hop," in an embodiment, provides, in addition to centralized management of a private network, as previously mentioned, a capability to generate or provide a mechanism for deployment of network-related features. Thus, a private network provider, such as Pertino, for example, in effect, may become a virtual member of every private network that it provides or generates for its users, if desired. As a network member, Pertino therefore, is able to deploy network-related features largely on demand, in a seamless, turnkey fashion, with little technical know-how needed by the user, in a manner that is dynamic, configurable and/or reconfigurable in real-time, potentially global in scope, scalable, without ownership of hardware, as well as other potential benefits, as described in more detail later. Of course, claimed subject matter is not limited in scope to any particular advantage since it may dependent on the particular embodiment.

As mentioned previously, an embodiment of claimed subject matter may include deploying networking services, resources and/or applications for one or more private networks via the Internet without human intervention. In an embodiment, deploying of network-related features may be executed via a virtual online presence, such as may be, for example, accessible via the Internet. In an embodiment, network features that are capable of being virtually deployed, such as via an online presence, for example, may include packet path services, network diagnostic and/or analysis services, such as a private network dashboard, for example, network configuration and/or reconfiguration services, network resource additions and/or reductions, and/or network application additions and/or reductions, to provide only a few out of a host of possible examples.

As has been mentioned, in one embodiment, a virtual online presence may comprises one or more virtual devices executing on one or more servers, such as one or more servers owned by one or more third parties. Although claimed subject matter is not limited in scope in this respect, virtual deploying of network-related features may comprise intercepting private network signal packet transmissions via one or more devices, such as virtual devices. Typically, although not necessarily, intercepting private network signal packet transmissions may comprises intercepting any and all private network outbound and inbound signal packet transmissions. As discussed, in an embodiment, interception network traffic may take place via a private network hop for private network signal packet transmissions. For example, a private network hop may be implemented in connection with a tunnel server. Likewise, of course, multiple private network hops may be employed to intercept network traffic, such as at various locations of a private network (e.g., where private network traffic is accessible).

In connection with monitoring network traffic various parameters may be measured. As a non-limited list of examples, average throughput in a particular unit of time, real-time through put, average utilization in a particular unit of time, real-time utilization, average latency in a particular unit of time and/or real-time latency of network communication packets may be monitored and/or measured. In addition, measurements may be taken over different routes, over a complete loop, over the entire private network, over sub-networks, over a logical broadcast domain, between any two or more nodes, etc., etc. These are just a few examples of the almost limitless set of measurements that may be computed for a private network. Likewise, therefore, an embodiment may also include a capability to reconfigure the private network without human intervention to improve network performance and/or to reduce network cost and/or a capability to reconfigure the private network including reallocation of network resources and/or geographical reconfiguration of the private network, such as substantially in accordance with various measured network performance and/or cost parameters so as to result in adjustment and/or tuning thereof.

Referring to FIG. 1, LBDs 209, 210 and 214 are illustrated, for example. A controller 206 and a tunnel server 260 are also illustrated, as described in more detail below. In one embodiment, independent logical broadcast domains may exist before a virtual broadcast domain is to be generated via linking LBDs, for example; although "pre-existing" BDs is not intended to be a requirement. Gateway devices (GDs) 215, 211, and 208 may be included within respective LBDs or may be generated or produced, such as, in one example embodiment, through installation of a software application on a device, such as a network device, for example, or through another mechanism. GDs 215 and 211 may communicate with controller 206 in one embodiment. Gateway devices 211 and 215 may, for example, transmit a broadcast domain configuration to controller 206. Likewise, controller 206 may provision tunnel server 260 and may notify gateway devices 211 and/or 215 of a network address for tunnel server 260. Likewise, tunnel server 260 may link logical broadcast domains 214 and 210, in an embodiment. Tunnel server 260 may in another embodiment also link more than two independent logical broadcast domains, such as more than two pre-existing LBDs, for example. Again pre-existing BDs are discussed for illustration purposes, but being pre-existing is not intended as a requirement.

Gateway devices 211 and 215 may transmit signal packets comprising a broadcast domain configuration to tunnel server 260. A tunnel server may forward signal packets, previously received, for example, that may comprise a broadcast domain configuration, such as via forwarding from gateway device 211 to gateway device 215, for example. A tunnel server, such as 260, may also forward signal packets, previously received, for example, that may comprise a broadcast domain configuration, such as forwarding to gateway device 211, for example. A virtual broadcast domain (VBD), therefore, may be generated at least for a period of time by linking logical broadcast domain 214 and logical broadcast domain 210, for example, to generate a private network.

Depending at least in part on particulars of an embodiment, gateway devices, such as 211 and 215, for example, may, in an embodiment, emulate a received broadcast domain configuration, as shall be explained in more detail infra., and as may be discussed, for example, (along with related technology) in previously referenced U.S. patent application Ser. No. 13/543,729, titled "COMMUNICATION BETWEEN BROADCAST DOMAINS," filed on Jul. 6, 2012, by Hankins et al., which is assigned to the assignee of the presently claimed subject matter and is herein incorporated by reference in its entirety; however, these examples, including examples from U.S. patent application Ser. No. 13/543,729, of course, are simply provided as illustrative examples and are not intended to limit claimed subject matter in scope. Gateway devices 211 and 215 may, for example, emulate a received broadcast domain configuration from other sources, such as, but not limited to, controllers, tunnel servers, other gateway devices, etc., for example. In a similar manner, more than two logical broadcast domains may be linked, such as previously mentioned. A gateway device may receive a broadcast domain configuration from a plurality of other gateway devices communicating entirely, primarily or at least partially via other logical broadcast domains, for example.

In one embodiment, as previously disclosed, responsive to initiated signal packets, a controller may initiate instructions for gateway devices, such as 208, 211, and 215, for example, to communicate with and/or via a tunnel server, such as 260, for example. Gateway devices 208, 211, and 215 may communicate with and/or via a tunnel server, such as 260. Gateway device 211 may generate a broadcast domain configuration corresponding to logical broadcast domain 210, for example. Gateway device 208 may generate a broadcast domain configuration corresponding to logical broadcast domain 209, for example.

Gateway devices 208 and 211 may transmit respective generated broadcast domain configuration to controller 206. Controller 206 may forward broadcast domain configurations, such as received from other gateway devices, for example, to gateway device 215. Gateway device 215 may emulate multiple received broadcast domain configurations as part of logical broadcast domain 214. For example, as an illustration, network device 216 may discover network device 223 communicating as part of logical broadcast domain 209 and/or network device 212 communicating as part of logical broadcast domain 210. As mentioned, although not necessarily required, in an embodiment, software implemented applications may at least partially or primarily be employed to implement operations, such as these illustrations, for example.

Continuing with the embodiment of FIG. 1, as an illustration of one possible scenario, network device 216 may communicate a request, such as by transmitting one or more signal packets, such as to network device 223, for example. Thus, via gateway device 215, for example, one or more signal packets comprising a request may be forwarded from network device 216 to tunnel server 260. Tunnel server 260 may, as a result, forward one or more signal packets, such as to gateway device 208, for example. Gateway device 208 may transmit signal packets via a logical broadcast domain, here 209, for example. Since network device 223 comprises part of logical broadcast domain, it may therefore receive a request that may be viewed as an emulation of a request from network device 216 via the now local logical broadcast domain Thus, network device 223 may accept the request and respond according to established network protocols in an embodiment, for example. In this illustrative example, a response may likewise be forwarded back via gateway device, 208, and tunnel server 260, to gateway device 215 for emulation as part of logical broadcast domain 214.

Gateway device 215 may transmit one or more signal packets via logical broadcast domain 214 indicating an accepted request from network device 223 to network device 216. Thus, network devices 216 and 223 may communicate via a virtual broadcast domain comprising LBDs 209 and 214, in this example, and by-passing NAT implemented by routers, for example. Thus, a private network managed by controller 206 has been illustrated by this example. In an implementation, network devices 216 and 223 may or may not recognize that their transmissions are forwarded via a tunnel server and/or to other logical broadcast domains. As mentioned, again, in an embodiment, although not necessarily required, software implemented applications may at least partially or primarily be employed to implement operations, such as these illustrations, for example.

In FIG. 1, routers 202, 203, or 204, for example, may route signal packets, such as between logical broadcast domains or to a controller, such as a master controller. Thus, a gateway device 215 may transmit a generated broadcast domain configuration to a controller or a master controller, such as 206. Controller 206 may store a generated broadcast domain configuration received from a gateway device, such as device 215, for example, using a memory device 207. Memory device 207 may comprise a local storage device or a non-local memory device otherwise accessible by controller 206, for example. In an embodiment, as previously described, likewise a database associating users, devices and other network-related traits may also be stored there.

In one embodiment, routers 202, 203, or 204 may employ network address translation (NAT). Typically, routers that employ NAT may modify a signal packet by altering a source address of a source device that may be part of a logical broadcast domain (likewise, a router employing NAT may also modify a destination address). Therefore, a signal packet transmission from a router employing NAT may appear as though the signal packet originated from the router rather than having originated elsewhere. Likewise, network devices on a logical broadcast domain may have an intervening router, or a similar device performing network address translation, for example, between the logical broadcast domain and other networks. Therefore, other portions of a network that have other logical broadcast domains, may not conventionally be accessible to devices operating as part of the other broadcast domains, at least not without some form of network address translation conventionally taking place. Likewise, routers employing NAT also may in some situations not necessarily allow signal packets to traverse a particular logical broadcast domain if the packets originate from outside the particular logical broadcast domain (e.g., not permit signal packets to reach a network device that may be part of the particular LBD). However, in an embodiment, for example, such as implementing a private network, NAT may be by-passed, such as previously described, for example. Thus, other devices may be accessible despite intervening routers without a significant change in infrastructure.

While, as described NAT implemented by routers are by-passed for signal packet transmissions within the private network, in this example; nonetheless, a NAT device may be included for connecting or linking the private network to the Internet, as previously suggested. Although claimed subject matter is not limited in scope in this respect, as mentioned, a feature of such an embodiment, for example, may include a unified networking policy being implemented across a private network as well as selected networking policies implemented for selected portions (e.g., selected sub-networks), as previously described. Thus, for example, referring to FIG. 1, a NAT device 265 coupled to tunnel server 260 may be able to connect a private network to the Internet by implementing network address translation for signal packets outbound from TS 260 to the Internet. As shown in FIG. 1, NAT device 265 may be in communication with controller 206. Thus, controller 206, in this example, may exercise oversight of inbound and outbound communications between the private network and the Internet. Likewise, as previously described, a unified networking policy or selected networking policies may be implemented in this manner for a network or selected sub-networks.

As discussed previously, in an embodiment, a virtual broadcast domain may comprise logical broadcast domain 214, and logical broadcast domain 210. Therefore, network device 216, communicating as part of logical broadcast domain 214, may discover and/or request services from a messaging server 224, communicating as part of logical broadcast domain 210. Also, network device 212, communicating as part of logical broadcast domain 210, may discover and/or request services from a file server 220, communicating as part of logical broadcast domain 214. Of course, claimed subject matter is not limited in scope to example embodiments, such as the foregoing provided for illustrative purposes, for example.

Although claimed subject matter is not limited in scope in this respect, in an embodiment, as was mentioned, a potential feature may include centralized management, such as, for example, of a broadcast domain, and/or multiple broadcast domains, despite, for example, the distributed nature of devices in the respective BDs, such as with intervening independently managed network devices, as occurs in connection with the Internet, as one example. Additionally, in an embodiment, a secure, scalable, real-time, turnkey, web-related private network that is relatively simple and/or easy to maintain, modify and/or manage may be set up. As mentioned, again, in an embodiment, although not necessarily required, software implemented applications on or above infrastructure, such as computing and/or networking infrastructure, as well as network connectivity, may at least partially or primarily be employed to implement operations, such as these illustrations, for example.

As was discussed, in an embodiment, controller 206 may be accessed via a device, such as a network device. A controller, such as controller 206, may receive broadcast domain configurations from other gateway devices communicating via other logical broadcast domains, whereby more than two logical broadcast domains may be similarly linked such that devices communicating via one of a plurality of logical broadcast domains, may discover and/or request services available via devices communicating via another of the plurality of logical broadcast domains. For example, controller 206 may also receive a broadcast domain configuration from gateway device 208, communicating via logical broadcast domain 209. Controller 206, may also forward other received broadcast domain configurations from logical broadcast domains 214, or 210, for example, to logical broadcast domain 209, for example, to be emulated via gateway device 208 or otherwise emulated.

Referring to FIG. 1, as previously discussed, a broadcast domain configuration may include devices communicating via a virtual private network (VPN), for example. In this context, a VPN refers to a mechanism in which a remote host, such as a network device, communicates with a VPN server to encrypt a communication stream in a manner so that the remote host is able to reasonably securely communicate with other devices of the broadcast domain and in which an intervening router has a configuration that allows the remote host to initiate the VPN even with network address translation being implemented. A device communicating via a VPN, such as virtual device 222, may connect to logical broadcast domain 214, or disconnect from logical broadcast domain 214. Likewise, as discussed with other examples, here, an example embodiment, such as this one, may be manageable from a device, such as a network device and/or a computing device.

Likewise, a tunnel server may be accessed and/or managed from a device, such as a network device and/or a computing device. In one embodiment, a tunnel server, such as tunnel server 260, shown in FIG. 1, for example, may be employed to also perform functions of a controller. For example, one or more software implemented applications may implement desired operations. Tunnel server 260 may, for example, receive a broadcast domain configuration. Tunnel server 260 may forward one or more broadcast domain configurations to one or more gateway devices. Tunnel server 260 may forward one or more broadcast domain configurations based at least in part on currently communicating devices, such as a network device, or otherwise, for example, such as stored BD configurations, as another example. Additionally, a linking table or other mechanism, for example, may specify forwarding rules or the like, to, for example, specify linking or additional functionality, such as between logical broadcast domains, for example, to form a virtual broadcast domain. In another embodiment, tunnel server 206 may transmit a portion (e.g., digest or subset) of a generated broadcast domain configuration. For example, in an embodiment, a generated broadcast domain configuration may comprise a selection of a set or subset of features of a logical broadcast domain 210 to be forwarded, such as to one or more gateway devices, for example, by tunnel server 260, operating as a controller, in this illustrative example.

Similarly, virtual devices for a private network may also be managed from a network device, even a virtual network device or other virtual device. In an embodiment, emulation may comprise, for example, a first device simulating another device via a broadcast domain. Another device, in this example, may comprise a physical network device, or a virtual network device. Therefore, the emulated device may not exist as a physical piece of hardware, although may be executed or stored on a physical device, of course. An emulating device may, however, make services available via a broadcast domain by transmitting signal packets in which, for example, requests for services may be forwarded to the emulated device to perform advertised services, for example, if the emulated device comprises a physical device. In another embodiment, an emulating device may offer services via a logical broadcast domain without forwarding requests to another network device. Additionally, emulation, in an embodiment, may comprise imitating another device, such as a network device and/or a computing device. However, another device may exist virtually, and/or may comprise a set instructions being executed via another device. Although services may appear to be available via a device (e.g., physical device), the device may, therefore, in an embodiment, comprise a virtual device. Likewise, as suggested previously, the virtual device may be executing on a physical device owned by a third party making processing and/or memory capacity available for purchase, for example. Likewise, as indicated previously, for these various aspects, NAT 265 is able to provide a capability to connect a private network to the Internet, such as under direction or oversight of controller 206, for example.

It is likewise noted that in an alternate embodiment, a NAT device may be incorporate into a tunnel server, such as 260, for example. Likewise, as was described, a tunnel server may execute additional services. Again, although not necessarily, typically services may be implemented using one or more software applications, as was mentioned. For example, in an embodiment, a tunnel service may also include a capability implement a private network policy and inspection process, which may, for example, including a unified networking policy, despite potentially being physically or logically separate networks and/or physically or logically separate sub-networks, for example. A private network policy and inspection process may also include for selected networks and/or sub-networks employing selected policies or selected networks and/or sub-networks employing a unified policy. Selected networking policies or a unified networking policy may, for example, include particulars regarding implementing at least one of the following processes: virus scanning, authentication, filtering (for example, URL filtering), deep packet inspection, encryption, a firewall, or any combinations thereof, as an example. A NAT device, such as 260, may be employed to maintain state of interactions between devices in the private network and devices outside the private network, such as Internet host devices, for example. As a result, some trade-offs may exist regarding whether to incorporate the NAT within the tunnel server in an embodiment. Since, if the NAT fails, state may be lost between the private network and the Internet, and a disruption of service may occur until connections may be re-established.

In one possible approach, NAT functionality may be included with a tunnel server, such as one tunnel server per NAT. If a server fails on which a TS is executed, the users on the private network are impacted, but not necessarily others. In another approach, the NAT may comprise a separate component, such as 265, illustrated in FIG. 1, and multiple tunnel servers may potentially connect to the Internet via 265, for example. Thus, if a TS fails, but not the NAT, state is generally maintained with the Internet; however, if the NAT fails, more users may be impacted. In still another approach, a TS and a NAT may comprise separate components (such as software applications executing on separate physical devices, for example), but may still do so in one-to-one relationship. This approach has some partial fault tolerance benefits, but may increase cost and/or complexity. Likewise, an approach other than one-to-one, such as two-to-one, etc., may be employed in an embodiment. Although claimed subject matter is not necessarily limited in scope in this respect, additional example embodiments of connecting to the Internet via a NAT (along with related technology) may be discussed in U.S. patent application Ser. No. 13/802,529, titled "CONNECTING A CLOUD NETWORK TO THE INTERNET," filed on Mar. 13, 2012, by Hankins et al., herein incorporated by reference in its entirety and assigned to the assignee of currently claimed subject matter.

Additionally, as previously mentioned, a tunnel server may, in an embodiment, be employed to provide a virtual and/or online presence that may be employed to deploy network services, resources and/or applications, referred to here as network-related features. It is, of course, however, appreciated that claimed subject matter is not limited to creating a virtual and/or online presence for deployment of network-related features to a private network via a tunnel server. Furthermore, as previously explained, deployment may likewise vary with details regarding particular network-related features. Other approaches are possible and are intend to be included within claimed subject matter. Nonetheless, a tunnel server, for example, may be employed to monitor and/or measure network traffic. Implementation of a private network "hop," in an embodiment, provides, in addition to centralized management of a private network, as previously mentioned, a capability to generate or provide a mechanism for deployment of network-related features. Thus, a private network provider, such as Pertino, for example, in effect, may become a virtual member of every private network that it provides or generates for its users, if desired. As a network member, Pertino therefore, is able to deploy network-related features largely on demand, in a seamless, turnkey fashion, with little technical know-how needed by the user, in a manner that is dynamic, configurable and/or reconfigurable in real-time, potentially global in scope, scalable, without ownership of hardware, as well as other potential benefits, as described in more detail later. Of course, claimed subject matter is not limited in scope to any particular advantage since it may dependent on the particular embodiment.

Figure 2:
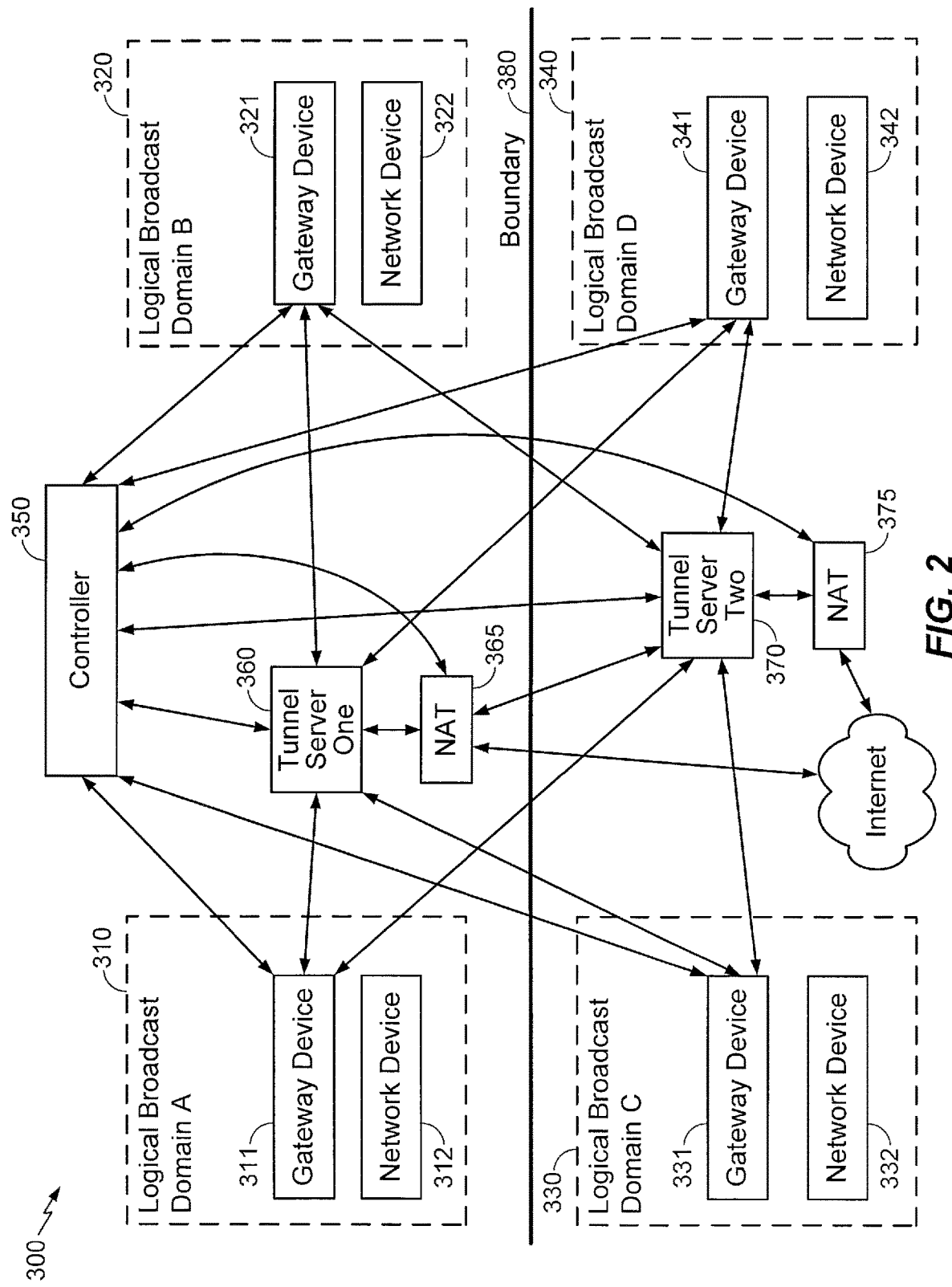
FIG. 2 is a schematic diagram illustrating another embodiment.

In an embodiment, more than one tunnel server may be employed to link a plurality of logical broadcast domains to form a virtual broadcast domain, although, of course, claimed subject matter is not limited in scope in this respect. FIG. 2 is a schematic diagram showing an embodiment with more than one tunnel server in one illustrative non-limiting example. In one embodiment, for example, four logical broadcast domains may be in communication via more than one tunnel server. Gateway devices 311, 321, 331, and 341 may generate a broadcast domain configuration for their respective logical broadcast domains, for example. Gateway devices 311, 321, 331, and 341 may forward respective broadcast domain configurations to controller 350. Controller 350 may provision tunnel server one, shown as 360. Controller 350 may initiate instructions to gateway devices 311, 321, 331, and 341 to communicate with tunnel server one 360. Gateway devices 311, 321, 331, and 341 may therefore initiate communications, such as via signal packet transmissions, for example.

In one embodiment, logical broadcast domain A 310, and logical broadcast domain B 320 may be located within a similar geographic boundary, such as, the same building, the same city, the same state, the same country, the same continent, the same planet, or other, for example. In an embodiment, logical broadcast domain C 330, and logical broadcast domain D 340, may reside in another geographic region different from the geographic region where logical broadcast domain A 310 or logical broadcast domain B may reside. In one embodiment, for example, logical broadcast domain A 310 and logical broadcast domain B 320 may be physically located in Los Angeles, Calif., U.S.A, while logical broadcast domain C 330 and logical broadcast domain D 340 may be physically located in New York City, N.Y., U.S.A. Of course, these are simply examples for illustration and are not meant to be limiting in any way.

In this embodiment, tunnel server one 360, may also be physically located in Los Angeles, Calif., U.S.A. so that transmissions (e.g., signal packets) between logical broadcast domain C 330 and logical broadcast domain D 340 (e.g., communicating via tunnel server one 360, located in Los Angeles), may be transmitted to Los Angeles, and back to New York.

A path or channel for communications may potentially be enhanced by controller 350 provisioning an additional tunnel server located more physically proximate to logical broadcast domain C 330 and logical broadcast domain D 340, for example. Controller 350 may provision tunnel server two 370. For example, in an embodiment, provisioning a tunnel server may be accomplished via execution of one or more software applications. Controller 350 may therefore initiate instructions to gateway devices 311, 321, 331, and 341 to additionally initiate communications with tunnel server two 370, while also continuing to be in communication with tunnel server one 360, for example. Gateway devices 311, 321, 331, and 341 may thus initiate communications to tunnel server two 370 after being deployed. Furthermore, in an embodiment, although claimed subject matter is not limited in scope in this respect, transmissions, such as signal packet transmissions may take place between tunnel servers, such as 360 and 370, in this example.

Provisioning an additional tunnel server may be based at least in part on a variety of factors or considerations. For example, signal packets communicated via tunnel server one 360 may be a factor or a consideration. Provisioning an additional tunnel server may likewise be based at least in part on signals from a controller, other than controller 350, for example. Likewise, gateway devices may optionally communicate with other gateway devices, such as via tunnel server one or tunnel server two, for example, depending at least in part on a host of possible factors, such as, geography, latency, utilization, bandwidth (e.g., throughput), availability, efficiency, cost, etc. Furthermore, via a controller, such as 350, a private network may be reconfigured without human intervention, for example, to improve performance and/or reduce cost. For example, if available bandwidth decreases, if latency increases, and/or if network utilization increases, controller 350 may provision additional tunnel servers or may provision tunnel servers in a manner to improve performance and/or reduce cost without human intervention. Examples of possible monitoring and/or measurement of network performance and/or cost-related parameter were previously discussed.

As an example, gateway device 311 may transmit signal packets to gateway device 321. Gateway device 311 may transmit signal packets via tunnel server one 360 since tunnel server one 360 is more proximate to both gateway device 311 and gateway device 321 in this example. In another embodiment, gateway device 311 may transmit signal packets via tunnel server two 370, such as if tunnel server one may be unavailable, for a variety of reasons, such as, but not limited to one or more of the following situations: a software issue, a configuration issue, a power issue, scheduled maintenance, insufficient permissions, a security issue, other issues, or combinations thereof.

Likewise, a variety of factors or considerations may likewise affect signal packet transmissions between already provisioned tunnel servers, such as 360 and 370, for example, in an embodiment. As a simple illustrative example, not meant to limit claimed subject matter, a tunnel server in Europe may communicate with a tunnel server in the United States to pass signal packet transmissions, such as from a broadcast domain in Europe to a broadcast domain in the United States; however, respective broadcast domains in Europe may communicate via the tunnel server in Europe while respective broadcast domains in the United States may communicate via the tunnel server in the United States. For example, again, without intending to limit claimed subject matter, it may be that latency is potentially reduced in comparison with using only either the tunnel server in Europe or only the tunnel server in the United States to pass signal packet transmissions from a broadcast domain in Europe to a broadcast domain in the United States. Of course, communications may also take place between more than two tunnel servers in an embodiment.

In still another example implementation involving more than two tunnel servers, for a stream of successive signal packets to be communicated between two broadcast domains, the signal packets may be communicated using more than one tunnel server in a manner so that immediately successive signal packets have a signal communication path that includes different tunnel servers. As one non-limiting example, a first broadcast domain may communicate signal packet transmissions to a second broadcast domain using a plurality of tunnel servers in a manner so that, for example, for N tunnel servers, where N is an integer greater than one, every Nth signal packet from the first broadcast domain may be transmitted to the second broadcast domain via the Nth tunnel server. Likewise, of course, every Nth signal packet from the second broadcast domain may be transmitted to the first broadcast domain via the Nth tunnel server; however, the Nth tunnel server from the first BD to the second BD may not necessarily correspond to the Nth tunnel server from second BD to the first BD. Of course, other approaches of distributing signal packet transmissions across multiple tunnel servers are also intended to be included. Implementations in which multiple tunnel servers are employed may offer a variety of potential benefits, although claimed subject matter is not necessarily limited in scope to implementations having these benefits. For example, security may be enhanced. Likewise, improved fault tolerance, redundancy and/or load balancing of tunnel servers may also be accomplished.

In one embodiment, tunnel server one 360, may specialize in file serving, and tunnel server two 370 may specialize in message serving. In an embodiment, gateway device 331, transmitting signal packets comprising file serving, may do so via tunnel server 360 or tunnel server 370. In general, a plurality of gateway devices may communicate with a plurality of tunnel servers. For example, provisioning additional tunnel servers may as one possible consideration, potentially enhance communications by providing alternate paths between gateway devices communicating as part of other logical broadcast domains that may be linked via tunnel servers. Nonetheless, one or more networks of logical broadcast domains and tunnel servers may be generated based at least in part on a host of considerations, such as, for example, cost, capability, efficiency, compatibility, resources, proximity, latency, bandwidth (e.g., throughput), utilization, others or combinations thereof. In one embodiment, network device 312 may communicate with or access network device 322, such as using gateway devices 311 and 321 communicating via tunnel server one 360, for example. Again, typically, but not necessarily, one or more software implemented applications may be utilized. Network device 322 may communicate with or access network device 342, such as using gateway devices 311 and 341 communicating via tunnel server two 370, for example. Gateway device 311 may also communicate via tunnel server one 360 and via tunnel server two 370, concurrently.

In an embodiment, a tunnel server may, for example, store one or more service requests, such as in local memory. In an embodiment, if multiple devices, such as a network device, request similar services, a tunnel server may provide service, or a response to a service request to a requesting device perhaps without forwarding the service request to a device able to initiate service, for example; however, this may vary at least in part on particulars of a situation and/or an embodiment, for example.

Additionally, in an embodiment, a tunnel server may acknowledge receipt of one or more signal packets before arrival at a destination device, such as a network device. For example, in one embodiment, network device 332 may transmit a file, or other large amount of stored information states (e.g., stored as physical states in memory), for example, to network device 322, such as via tunnel server one 360. In an embodiment, tunnel server one may acknowledge receipt of one or more signal packets before network device 322 acknowledges receipt of the one or more signal packets, for example. This may accelerate transmissions. For example, network device 322 may receive acknowledgement of one or more signal packets, and transmit subsequent signal packets with less delay as a result, for example, potentially improving wide area network communications, for example.

A tunnel server may also replicate services available via other network devices. In this context, replication comprises reading and writing stored information states (e.g., stored as physical states in memory). Replication may be desirable for a variety of reasons, including, improved consistency between two or more redundant resources, such as software or hardware components, improved reliability, improved accessibility, improved fault tolerance, or combinations thereof. Replication may comprise storage replication, and/or replication of computational tasks, or may comprise active or passive replication as is known in the art. Again, an implementation may be in accordance with execution of one or more software applications.

In one embodiment, tunnel server two 370, may store network communications. Network device 322 may comprise a file server, for example. A device, such as network device 312, may request file services from file server 322 via tunnel server two 370. Network device 312 may receive requested services. Subsequently, network device 332 may request similar file services from file server 322 via tunnel server two 370. Tunnel server two 370, having stored previous requests for file service, for example, may respond by providing a requested file service, without necessarily communicating a request to file server 322. A tunnel server may, for example, in an embodiment, potentially provide a faster response by storing previous service requests, referred to here as caching the previous service requests. In another example embodiment, a device such as network device 342 may comprise a database server. Tunnel server 370 may replicate the database (or a portion thereof) of database server 342. In an embodiment, if a device, for example, were to request database services from database server 342, via tunnel server two 370, tunnel server two 370 may respond, for example, without necessarily communicating with database server 342.

FIG. 2 also illustrates an embodiment in which, as previously described, separate NAT devices may be employed in a one-to-one relationship with tunnel servers; although, claimed subject matter is not limited to a one-to-one relationship, as previously explained. Thus, as illustrated, NAT 365 corresponds with TS 360 and NAT 375 corresponds with TS 370. Likewise, NATs 365 and 375 also may communicate with controller 350 in the embodiment illustrated. Therefore, benefits, such as previously described, may be available, although claimed subject matter is not limited in this respect. As one example, a unified networking policy or selected networking policies may be implemented, such as previously described. Again, software may execute or be executable on or above infrastructure to implement such policies, for example. Although claimed subject matter is not necessarily limited in scope in this respect, additional example embodiments of connecting to the Internet via a NAT (along with related technology) may be discussed in U.S. patent application Ser. No. 13/802,529, titled "CON- NECTING A CLOUD NETWORK TO THE INTERNET," filed on Mar. 13, 2012, by Hankins et al., herein incorporated by reference in its entirety and assigned to the assignee of currently claimed subject matter.

Figure 4:
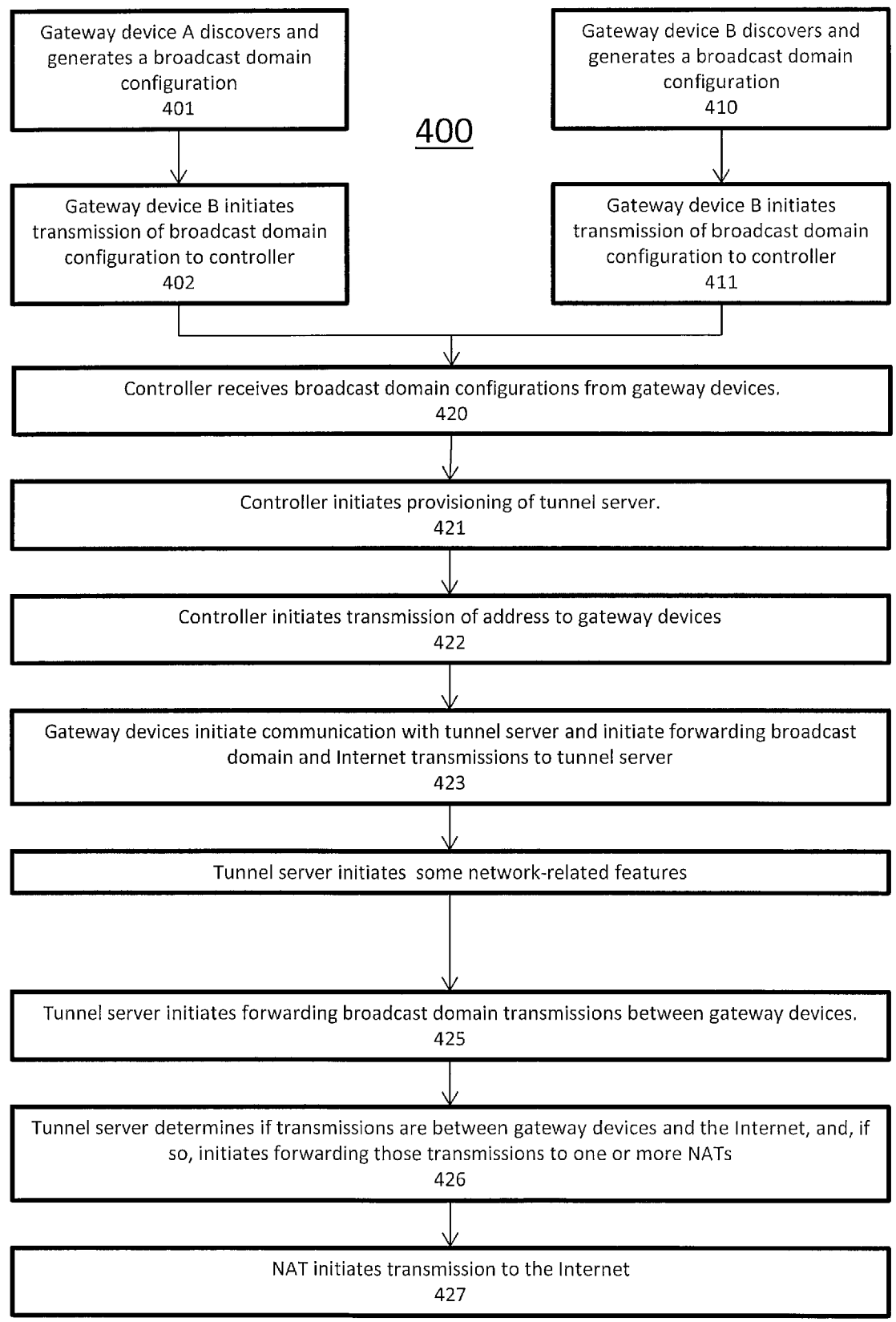
FIG. 4 is a flowchart illustrating an embodiment of a method for virtual deploying of network-related features.

FIG. 4 is a flowchart illustrating an embodiment of a method of communication between broadcast domains. Of course, claimed subject matter is not limited in scope to the particular order or arrangement of blocks shown. Likewise, additional or replacement blocks may be included in an embodiment, such as blocks depicting one or more operations in place of those shown may be used in an embodiment, for example.

Referring to FIG. 4, gateway devices A and B may be included as part of separate logical broadcast domains in an example embodiment. As shown by block 401, gateway device A may discover and generate a broadcast domain configuration without human intervention, as part of a logical broadcast domain, for example. As shown by block 410, gateway device B may likewise discover and generate a broadcast domain configuration as part of a logical broadcast domain, for example. At block 402, gateway device A may initiate transmission of a generated broadcast domain configuration, such as in the form of signal packets, for example, to a controller or a master controller. At block 411, gateway device B may initiate transmission of a generated broadcast domain configuration, such as in the form of signal packets, for example, to a controller or a master controller. At block 420, a controller may receive one or more generated broadcast domain configurations from one or more gateway devices, such as A and/or B, for example.

FIG. 4 shows an embodiment including the blocks described above as well as the blocks described immediate below, starting with block 421. However, likewise, in an embodiment, a flowchart of provisioning a tunnel server may begin with block 421. Of course, as indicated above, claimed subject matter is not limited in scope to the particular order or arrangement of blocks shown. Likewise, additional or replacement blocks may be included in an embodiment, such as blocks depicting one or more operations in place of those shown may be used in an embodiment.

Referring to block 421, for example, a controller may initiate provisioning of one or more tunnel servers, such as for device A and/or device B, for example. At block 422, a controller may initiate transmission of one or more network addresses for one or more tunnel servers to gateway device A and/or gateway device B, for example. At block 423, gateway devices A and/or B may initiate communication with one or more tunnel servers, for example, via one or more network addresses for the respective one or more tunnel servers, for example. Likewise, the gateway devices may therefore forward broadcast domain and/or Internet signal packet transmissions to the one or more tunnel servers. At block 424, one or more tunnel servers may receive signal packets and may initiate network-related feature in an embodiment; however, as previously described, initiation of network-related features may depend at least in part on particulars of the feature. Thus, a feature may be initiated in another way, such as via a controller, for example. Services may include, for example, a private network policy and inspection process, which may include, as examples, virus scanning, filtering (for example, URL filtering), deep packet inspection, a firewall, and others, in connection with processing of the received signal packets. Likewise, as shown at block 425, the one or more tunnel servers may initiate forwarding of signal packets, such as between gateway devices, such as A and/or B, for example.

At block 426, one or more tunnel servers may determine if any of the received signal packet transmissions are between a gateway device and the Internet (e.g., one or more devices accessible via the Internet) and, if so, may initiate forwarding of signal packets to one or more NAT devices, for example. At block 427, the one or more NAT devices may initiate transmission of signal packets to the Internet (e.g., to one or more devices accessible via the Internet to which the signal packets are directed). It is noted, that in an embodiment in which a NAT device is incorporated into a tunnel server, although this operation may occur, it may take place as part of tunnel server operation. Therefore, again, benefits, such as previously described, may be available, although claimed subject matter is not limited in this respect. For example, a unified networking policy or selected networking policies may be implemented.

Figure 3:
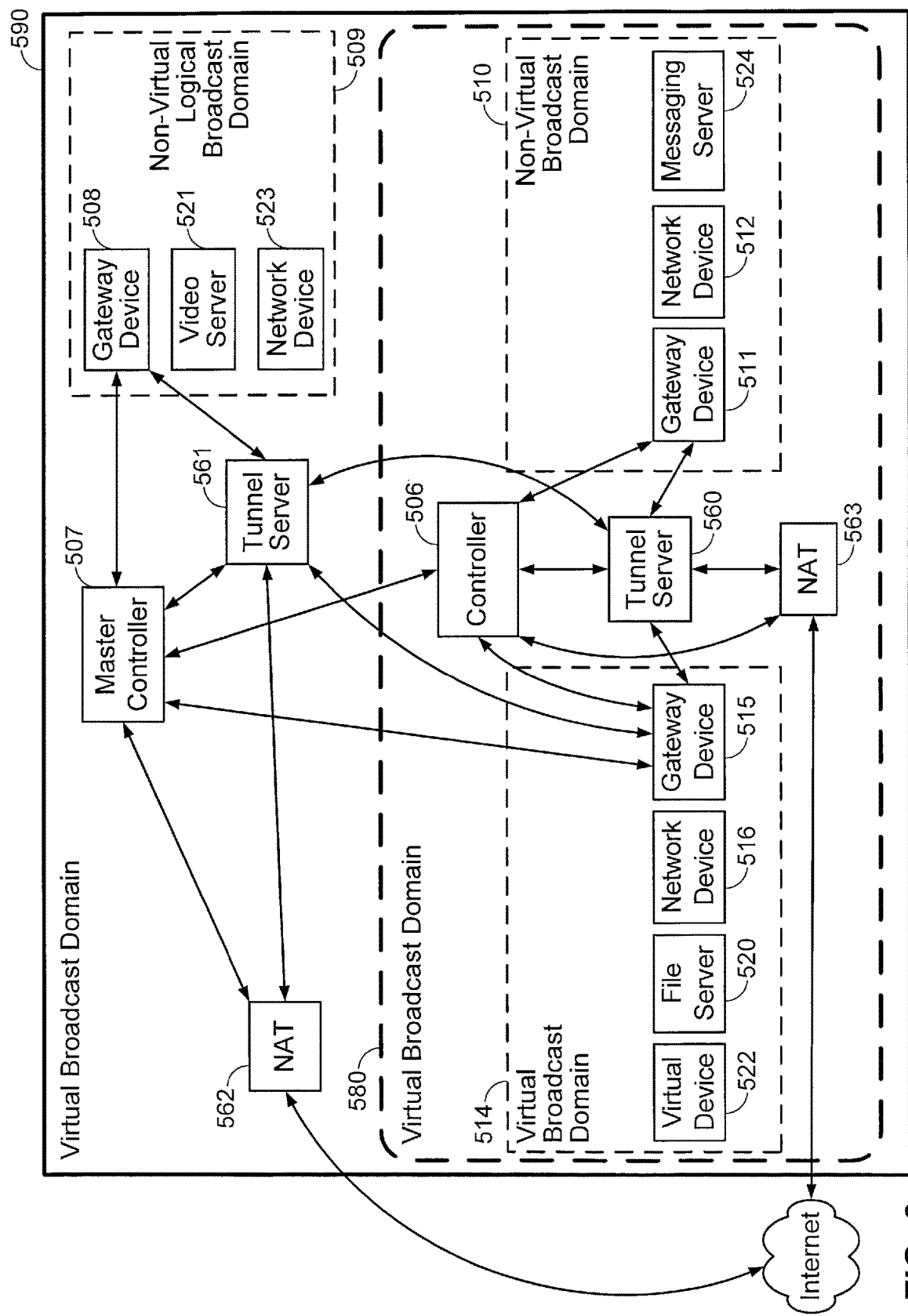
FIG. 3 is a schematic diagram illustrating yet another embodiment.

FIG. 3 is a schematic diagram illustrating still another embodiment 590 of a virtual broadcast domain comprising a plurality of logical broadcast domains. In one embodiment, respective gateway devices (e.g., 511, 515) may generate respective broadcast domain configurations and may, for example, initiate transmission to a controller, such as 506, for example, via a router. That is, it is not necessarily required that a tunnel server always be employed, such as, for example, if network devices are network addressable, such as via an IP address, for example.

Respective gateway devices (e.g., 511, 515) may request from a controller, such as 506, broadcast domain configurations of other logical broadcast domains and may emulate the generated broadcast domain configurations via the respective logical broadcast domains of which the respective gateway devices may be a part. Likewise, a gateway device may, instead, request that a controller, for example, instruct a gateway device to initiate transmission of a generated broadcast domain configuration to a requesting gateway device. In one embodiment, gateway device 515 may, for example, request a generated broadcast domain configuration from controller 506 corresponding to non-virtual broadcast domain 510, for example. Likewise, gateway device 511 may request a generated broadcast domain configuration from controller 506 corresponding to virtual broadcast domain 580.

In one embodiment, devices communicating as part of virtual broadcast domain 514 may communicate with devices operating as part of non-virtual broadcast domain 510. In one illustrative embodiment, this may be accomplished via a tunnel server, such as 560. Tunnel server 560 may, for example, execute software capable of receiving and sending signal packets from network devices in different logical broadcast domains that may otherwise use separate routers, for example. If, for example, the separate routers include a routing table or similar mechanism such that signal packets intended to reach another logical broadcast domain are routed to a tunnel server, such as 560, then, in this example embodiment, as a result, network address translation may be by-passed. Thus, devices, such as network devices, may communicate with tunnel server 560 and tunnel server 560 may forward traffic between devices, such as on different logical broadcast domains.

Thus, for example, if virtual broadcast domain 514 provides a signal packet A to tunnel server 560, it may be encapsulated. Likewise, if non-virtual broadcast domain 510 provides a signal packet B to tunnel server 560, it may be encapsulated. However, in an embodiment, a tunnel server may remove encapsulation (e.g., referred to as termination) to determine where to forward a signal packet and re-encapsulate it for forwarding so that it may be routed via intermediate network devices. As discussed previously, in this context, this may be referred to as a private network hop, which provides a capability to monitor and/or measure network traffic as well as create a virtual online presence for deployment of network-related features largely on demand. Likewise, in an embodiment, as a few non-limiting illustrative examples, encapsulation may include encryption as well, or may separate encapsulation from termination.

In an embodiment, tunnel server 560 may be controlled at least in part by a controller 506. For example, tunnel server 560 may be instructed to forward network transmission signal packets from gateway device 515 to gateway device 511, and forward network transmission signal packets from gateway device 511 to gateway device 515, for an embodiment, for example. For an embodiment, gateway device 515 in virtual broadcast domain 514 and gateway device 511 in non-virtual broadcast domain 510 may be linked for at least a period of time, in this example, by tunnel server 560, resulting in a path for signal packet network communications between gateway device 515 and gateway device 511 and thereby forming a virtual BD, at least for a period of time, so as to forming a secure, private network, for example.

Signal packets from gateway device 515 may comprise network communication signal packets transmitted via virtual broadcast domain 514 from network device 516, and signal packets from gateway device 511 may comprise network communication signal packets transmitted via non-virtual broadcast domain 510 from network device 512. Gateway devices forwarding signal packets, or variations thereof, as part of respective logical broadcast domains, for example, may allow other devices, such as network devices, communicating as part of the respective logical broadcast domain to communicate with network devices in different, other logical broadcast domains as if part of a single logical broadcast domain but without a significant change in configuration etc. for the participating logical broadcast domains, referred to here as forming a virtual broadcast domain.

In an embodiment, network device 516 may access and/or communicate with messaging server 524, and network device 512 may access and/or communicate with file server 520. Additionally, a virtual device 522, via a traditional VPN in this example in communication with virtual broadcast domain 514, may access and/or communicate with network devices communicating as part of non-virtual broadcast domain 510, such as network device 512, or messaging server 524, for example. No additional substantial configuration changes or modifications are necessarily involved to accomplish such as result beyond those to communicate with virtual broadcast domain 514. In an embodiment, such as this example, a virtual broadcast domain 580, may be generated at least for a period of time by linking virtual broadcast domain (e.g., a logical broadcast domain) 514 with non-virtual broadcast domain (e.g., a logical broadcast domain) 510.

Tunnel server 560 may likewise receive signal packets from devices communicating as part of other logical broadcast domains. For example, tunnel server 560 may receive network communication signal packets from gateway device 515 communicating as part of virtual broadcast domain 514, and also from gateway device 511 communicating as part of non-virtual broadcast domain 510. Tunnel server 560 may receive network communication signal packets from gateway device 515 and forward network communication signal packets to gateway device 511, for example. Tunnel server 560 may also receive signal packets from gateway device 511 and forward signal packets to gateway device 515, for example. In an embodiment, this may allow gateway device 515 and gateway device 511 to communicate, in this example, bypassing for the respective broadcast domains execution or implementation of NAT by routers, or another or similar address modification technique, for example. Likewise, tunnel server 560, for example, may provide a private network hop for virtual deployment of network-related features.

In another embodiment, virtual broadcast domain 514 may employ a different network protocol than non-virtual broadcast domain 510, such as a different network discovery protocol, for example. In one embodiment, a controller, such as controller 506, may translate a generated broadcast domain configuration, such as by modifying network transmission signal packets comprising the generated broadcast domain configuration for virtual broadcast domain 514 so as to be substantially compatible with or substantially complaint with non-virtual broadcast domain 510, such as, for example, its particular network discovery protocol. In another embodiment, a controller may initiate a gateway device to modify a generated broadcast domain configuration, such as for virtual broadcast domain 514, for example, so as to be substantially compatible with or substantially compliant with non-virtual broadcast domain 510, such as, for example, its particular network discovery protocol. Likewise, rather than being initiated, such as by a controller, perhaps a difference in protocol, such as a network discovery protocol, may be detected, such as by a gateway device and, with or without being initiated, a gateway device may translate features, such as discovery related features, of the generated broadcast domain configuration in an embodiment. For example, in one illustrative embodiment, devices communicating as part of virtual broadcast domain 514 may perform discovery via WS-Discovery, previously referenced, and devices communicating as part of non-virtual broadcast domain 510 may do so via Bonjour, available from Apple Inc., Cupertino, Calif., see, for example, https://developer.apple.com/bonjour/. Thus, a gateway device may, for example, convert a generated broadcast domain configuration from WS-Discovery to Bonjour for substantial compliance or substantial compatibility within logical broadcast domain including gateway device. Of course, this is merely an illustrative embodiment and claimed subject matter is not limited in scope to illustrative embodiments.

In this context, 'IPv4' refers to using signal packets substantially compatible or substantially compliant with Internet Protocol version 4, also referred to as IPv4 signal packets in this context. IPv4 is described in IETF publication RFC 791 (September 1981), replacing an earlier definition (RFC 760, January 1980). IPv6 refers to using signal packets substantially compatible or substantially compliant with Internet Protocol version 6, also referred to as IPv6 signal packets. IPv6 is described in IETF publication RFC 2460, published in December 1998. Gateway device 511 in an embodiment, for example, may communicate using IPv4 signal packets or IPv6 signal packets. It is noted, of course, that claimed subject matter is not limited in scope to IPv4 and/or IPv6 signal packets. Any one of a host of known or to be developed signal packets, such as network communication signal packets, may be employed. Nonetheless, in this illustrative example, network communications between gateway device 511 and tunnel server 560 may, for example, comprise IPv6 signal packets. Network communications between gateway device 511 and network device 512 may, for example, comprise IPv4 signal packets.

In an embodiment, gateway device 511, for example, may assign IPv6 addresses to IPv4 network devices communicating as part of non-virtual broadcast domain 510, without transmitting the IPv6 addresses to the IPv4 devices. In this embodiment, a device, such as a network device 512, may communicate using IPv4 signal packets whereas file server 520 may communicate using IPv6 signal packets. For example, network device 512 may request services from file server 520. In an embodiment, gateway device 511 may translate IPv4 signal packets from network device 512 to IPv6 signal packets to be forwarded via tunnel server 560 to file server 520. Response signal packets transmitted to gateway device 511 may be translated from IPv6 signal packets to IPv4 signal packets, such that they may be readily understood and/or processed by network device 512, communicating using IPv4 signal packets. In this context, a gateway device may, for example, perform translate services so that devices of a logical broadcast domain that communicate using IPv4 signal packets may be able to communicate with devices of a logical broadcast domain that communicate using IPv6 signal packets, for example. In another embodiment, tunnel server 560 may provide translation between IPv4 and IPv6 signal packets, such that gateway device 511 communicates using IPv4 signal packets without necessarily performing translation.

In one embodiment, gateway device 515, may assign IPv6 addresses to other devices communicating as part of virtual broadcast domain 514, such as, network device 516, file server 520, or virtual device 522, in addition to already assigned IPv4 addresses. Gateway device 515 may also provide updated routing tables to other devices communicating as part of virtual broadcast domain 514, such as, network device 516, file server 520, or virtual device 522.

In another embodiment, linking with another logical broadcast domain may potentially result in a multi-layered collection or nesting of logical broadcast domains. For example, in one embodiment, a virtual broadcast domain 580 may comprise virtual broadcast domain 514 and non-virtual broadcast domain 510, linked as previously discussed. Gateway device 515 may generate and forward a broadcast domain configuration to controller 506. Gateway device 515, may also forward signal packets, or derivatives thereof, from devices communicating as part of virtual broadcast domain 514, to tunnel server 560.

Virtual broadcast domain 590 may comprise linking virtual broadcast domain 580 and non-virtual broadcast domain 509. Gateway device 515, operating as a gateway device for virtual broadcast domain 580, may transmit a broadcast domain configuration for virtual broadcast domain 580 to master controller 507. Master controller 507 may request and/or receive a broadcast domain configuration from another controller, such as controller 506, for example. In an embodiment, therefore, gateway device 515 may in effect concurrently operate as a gateway device for different virtual broadcast domains. Of course, as previously described, an alternate approach may employ signal packet transmissions between tunnel servers, such as between 560 and 561 of FIG. 3, or another approach.

As discussed previously, NAT implemented by routers are by-passed for signal packet transmissions within a private network, such as in this example; nonetheless, one or more NAT devices may be included for connecting or linking a private network to the Internet, as previously suggested. As mentioned, a feature may include implementing a private network policy and inspection process, which may, for example, include a unified networking policy being implemented across a private network, such as, for example, implementing virus scanning, authentication, filtering, (for example, URL filtering) deep packet inspection, encryption, a firewall, any combinations thereof, etc. Likewise, as previously described, selected networking policies for selected portions of a private network may be implemented as a private network policy and inspection process. Thus, for example, referring to FIG. 3, a NAT device 662 coupled to tunnel server 561 is able to connect the private network to the Internet by implementing network address translation for signal packets outbound from TS 561 to the Internet. As shown in FIG. 3, NAT device 563 provides a similar capability for TS 560. Likewise, the NATs may also receive inbound signal packet transmissions which may be forwarded as appropriate. Although claimed subject matter is not necessarily limited in scope in this respect, additional example embodiments of connecting to the Internet via a NAT (along with related technology) may be discussed in U.S. patent application Ser. No. 13/802,529, titled "CONNECTING A CLOUD NETWORK TO THE INTERNET," filed on Mar. 13, 2012, by Hankins et al., herein incorporated by reference in its entirety and assigned to the assignee of currently claimed subject matter.

Figure 5:
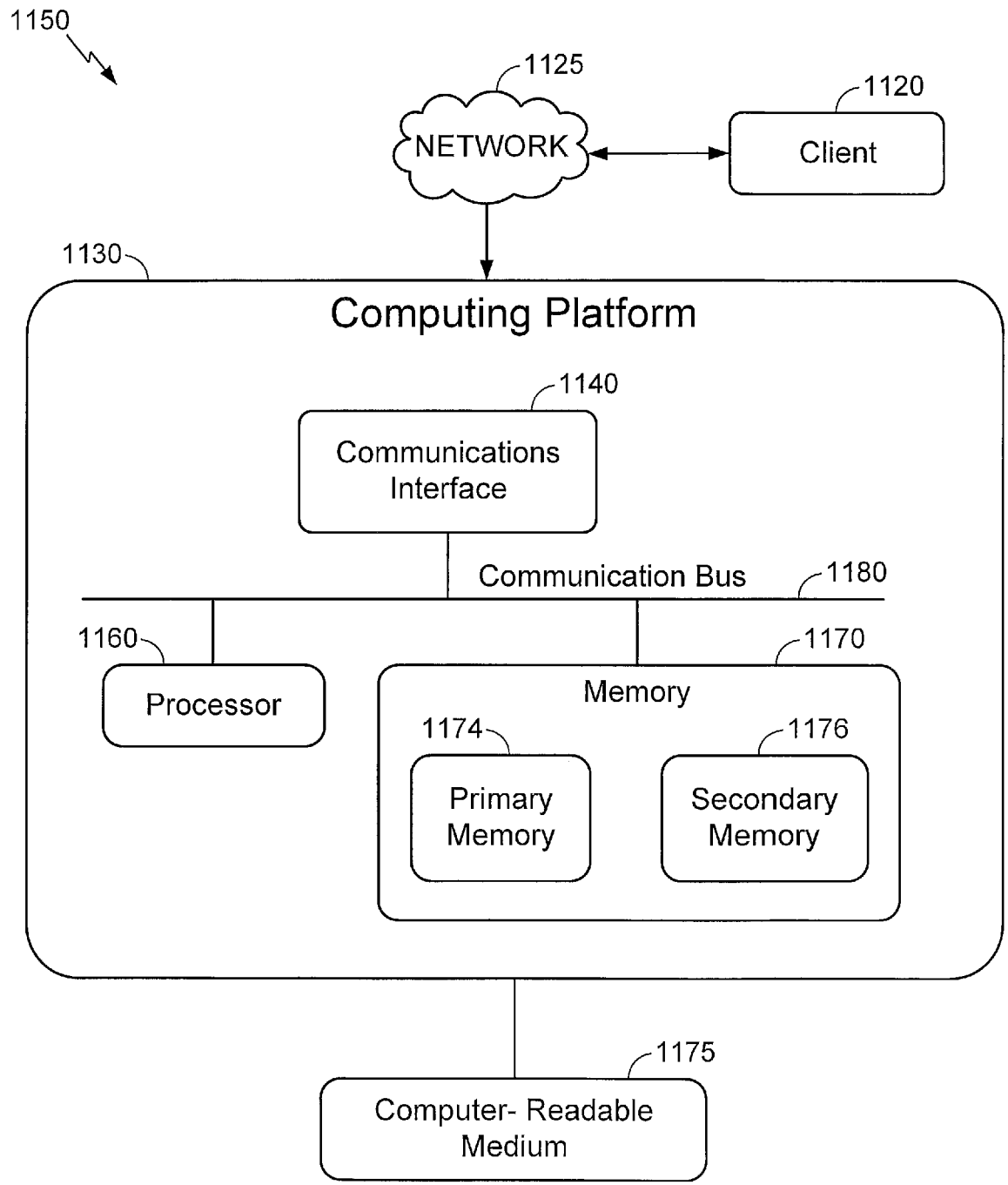
FIG. 5 is a schematic diagram illustrating a computing environment in which an embodiment may be implemented.

For purposes of illustration, FIG. 5 is an illustration of an embodiment of a computing platform 1150 that may be employed in a client-server type interaction, such as described infra. in connection with rendering a GUI via a device, such as a network device and/or a computing device, for example. In FIG. 5, computing platform 1130 may interface with client 1120, which may comprise features of a conventional client device, for example. Communications interface 1140, processor (e.g., processing unit) 1160, and memory 1170, which may comprise primary memory 1174 and secondary memory 1176, may communicate by way of communication bus 1180, for example. In FIG. 5, client 1120 may represent one or more or more sources of analog, uncompressed digital, lossless compressed digital, or lossy compressed digital formats for content of various types, such as video, imaging, text, audio, etc. in the form physical states or signals, for example. Client 1120 may communicate with computing platform 1130 by way of an Internet connection via network 1125, for example. Although the computing platform of FIG. 5 shows the above-identified components, claimed subject matter is not limited to computing platforms having only these components as other implementations may include alternative arrangements that may comprise additional components, fewer components, or components that function differently while achieving similar results. Rather, examples are provided merely as illustrations. It is not intended that claimed subject matter to limited in scope to illustrative examples.

Processor 1160 may be representative of one or more circuits, such as digital circuits, to perform at least a portion of a computing procedure or process. By way of example, but not limitation, processor 1160 may comprise one or more processors, such as controllers, microprocessors, microcontrollers, application specific integrated circuits, digital signal processors, programmable logic devices, field programmable gate arrays, and the like, or any combination thereof. In implementations, processor 360 may perform signal processing to manipulate signals or states and/or to construct signals or states, for example.

Memory 1170 may be representative of any storage mechanism. Memory 1170 may comprise, for example, primary memory 1174 and secondary memory 1176, additional memory circuits, mechanisms, or combinations thereof may be used. Memory 370 may comprise, for example, random access memory, read only memory, or one or more data storage devices or systems, such as, for example, a disk drive, an optical disc drive, a tape drive, a solid-state memory drive, just to name a few examples. Memory 1170 may be utilized to store a program. Memory 1170 may also comprise a memory controller for accessing computer readable-medium 1175 that may carry and/or make accessible content, code, and/or instructions, for example, executable by processor 1160 or some other controller or processor capable of executing instructions, for example.

Under the direction of processor 1160, memory, such as memory cells storing physical states, representing for example, a program, may be executed by processor 1160 and generated signals may be transmitted via the Internet, for example. Processor 1160 may also receive digitally-encoded signals from client 1120.

Network 1125 may comprise one or more network communication links, processes, services, applications and/or resources to support exchanging communication signals between a client, such as 1120 and computing platform 1130, which may, for example, comprise one or more servers (not shown). By way of example, but not limitation, network 1125 may comprise wireless and/or wired communication links, telephone or telecommunications systems, Wi-Fi networks, Wi-MAX networks, the Internet, a local area network (LAN), a wide area network (WAN), or any combinations thereof.

The term "computing platform," as used herein, refers to a system and/or a device, such as a computing device, that includes a capability to process (e.g., perform computations) and/or store data in the form of signals and/or states. Thus, a computing platform, in this context, may comprise hardware, software, firmware, or any combination thereof (other than software per se). Computing platform 1130, as depicted in FIG. 5, is merely one such example, and the scope of claimed subject matter is not limited to this particular example. For one or more embodiments, a computing platform may comprise any of a wide range of digital electronic devices, including, but not limited to, personal desktop or notebook computers, high-definition televisions, digital versatile disc (DVD) players and/or recorders, game consoles, satellite television receivers, cellular telephones, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by a computing platform.

Memory 1170 may store cookies relating to one or more users and may also comprise a computer-readable medium that may carry and/or make accessible content, code and/or instructions, for example, executable by processor 1160 or some other controller or processor capable of executing instructions, for example. A user may make use of an input device, such as a computer mouse, stylus, track ball, keyboard, or any other similar device capable of receiving user actions and/or motions as input signals. Likewise, a user may make use of an output device, such as a display, a printer, etc., or any other device capable of providing signals, generating visual or audio stimuli or other similar output stimuli for a user.

Regarding aspects related to a communications or computing network, a wireless network may couple client devices with a network. A wireless network may employ stand-alone ad-hoc networks, mesh networks, Wireless LAN (WLAN) networks, cellular networks, and/or the like. A wireless network may further include a system of terminals, gateways, routers, or the like coupled by wireless radio links, and/or the like, which may move freely, randomly or organize themselves arbitrarily, such that network topology may change, at times even rapidly. Wireless network may further employ a plurality of network access technologies, including Long Term Evolution (LTE), WLAN, Wireless Router (WR) mesh, 2nd, 3rd, or 4th generation (2G, 3G, or 4G) cellular technology, other technologies, and/or the like. Network access technologies may enable wide area coverage for devices, such as client devices with varying degrees of mobility, for example.

A network may enable radio frequency or other wireless type communications via a network access technology, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or other, or the like. A wireless network may include virtually any type of now known, or to be developed, wireless communication mechanism by which signals may be communicated between devices, such as a client device, such as a computing device and/or a network device, between or within a network, or the like.

Communications between a computing device and/or a network device and a wireless network may be in accordance with known, or to be developed cellular telephone communication network protocols including, for example, global system for mobile communications (GSM), enhanced data rate for GSM evolution (EDGE), and worldwide interoperability for microwave access (WiMAX). A computing device and/or a networking device may also have a subscriber identity module (SIM) card, which, for example, may comprise a detachable smart card that is able to store subscription information of a user, and/or is also able to store a contact list of the user. A user may own the computing device and/or networking device or may otherwise be a user, such as a primary user, for example. A computing device may be assigned an address by a wireless or wired telephony network operator, or an Internet Service Provider (ISP). For example, an address may comprise a domestic or international telephone number, an Internet. Protocol (IP) address, and/or one or more other identifiers. In other embodiments, a communication network may be embodied as a wired network, wireless network, or any combinations thereof.

A device, such as a computing and/or networking device, may vary in terms of capabilities and/or features. Claimed subject matter is intended to cover a wide range of potential variations. For example, a device may include a numeric keypad or other display of limited functionality, such as a monochrome liquid crystal display (LCD) for displaying text, for example. In contrast, however, as another example, a web-enabled device may include a physical or a virtual keyboard, mass storage, one or more accelerometers, one or more gyroscopes, global positioning system (GPS) or other location-identifying type capability, and/or a display with a higher degree of functionality, such as a touch-sensitive color 2D or 3D display, for example.

A computing and/or network device may include or may execute a variety of now known, or to be developed operating systems, derivatives and/or versions thereof, including personal computer operating systems, such as a Windows, iOS, Linux, a mobile operating system, such as iOS, Android, Windows Mobile, and/or the like. A computing device and/or network device may include or may execute a variety of possible applications, such as a client software application enabling communication with other devices, such as communicating one or more messages, such as via email, short message service (SMS), and/or multimedia message service (MMS), including via a network, such as a social network including, but not limited to, Facebook, LinkedIn, Twitter, Flickr, and/or Google+, to provide only a few examples. A computing and/or network device may also include or execute a software application to communicate content, such as, for example, textual content, multimedia content, and/or the like. A computing and/or network device may also include or execute a software application to perform a variety of possible tasks, such as browsing, searching, playing various forms of content, including locally stored or streamed video, or games such as, but not limited to, fantasy sports leagues. The foregoing is provided merely to illustrate that claimed subject matter is intended to include a wide range of possible features or capabilities.

A logical broadcast domain may also be extended to another device communicating as part of another network, such as via a virtual private network (VPN). To support a VPN, logical broadcast domain transmissions may be forwarded to the VPN device via another network. For example, a software tunnel may be created between a logical broadcast domain, and a VPN device. Tunneled traffic may, or may not be encrypted, and a tunneling protocol may be substantially compliant with and/or substantially compatible with any past, present or future versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, another existing protocol, and/or another protocol that may be developed.

A logical broadcast domain may communicate via signal packets, such as in a network of participating digital communications, A logical broadcast domain may be compatible with now known, or to be developed, past, present, or future versions of any, but not limited to the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A logical broadcast domain may employ, for example, TCP/IP, UDP, DECnet, NetBEUI, IPX, Appletalk, other, and/or the like. Versions of the Internet Protocol (IP) may include IPv4, IPv6, other, and/or the like.

It will, of course, be understood that, although particular embodiments will be described, claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example (other than software per se). Likewise, although claimed subject matter is not limited in scope in this respect, one embodiment may comprise one or more articles, such as a storage medium or storage media. Storage media, such as, one or more CD-ROMs and/or disks, for example, may have stored thereon instructions, executable by a system, such as a computer system, computing platform, and/or other system, such as a computing device and/or a network device, for example, that may result in an embodiment of a method in accordance with claimed subject matter being executed, such as a previously described embodiment, for example; although, of course, claimed subject matter is not limited to previously described embodiments. As one potential example, a computing platform may include one or more processing units or processors, one or more devices capable of inputting/outputting, such as a display, a keyboard and/or a mouse, and/or one or more memories, such as static random access memory, dynamic random access memory, flash memory, and/or a hard drive.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involves physical manipulation of physical quantities. Typically, although not necessarily, such quantities may take the form of electrical and/or magnetic signals and/or states capable of being stored, transferred, combined, compared, processed or otherwise manipulated as electronic signals and/or states representing information. It has proven convenient at times, principally for reasons of common usage, to refer to such physical signals and/or physical states as bits, data, values, elements, symbols, characters, terms, numbers, numerals, information, and/or the like. It should be understood, however, that all of these or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other information storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

While there has been illustrated and/or described what are presently considered to be example features, it will be understood by those skilled in the relevant art that various other modifications may be made and/or equivalents may be substituted, without departing from claimed subject matter. Additionally, many modifications may be made to adapt a particular situation to the teachings of claimed subject matter. Therefore, it is intended that claimed subject matter not be limited to the particular examples disclosed, but that such claimed subject matter may also include all aspects falling within appended claims and/or equivalents thereof.

The invention claimed is:

1. A method of managing a network comprising a plurality of logical broadcast domains, the method comprising:
    storing a configuration of the plurality of logical broadcast domains;
    provisioning a tunnel server by a controller, wherein the tunnel server and the controller are outside the plurality of logical broadcast domains;
    implementing by the tunnel server a network hop for signal packets transmitted between a first network device in one of the plurality of logical broadcast domains and a second network device in another of the plurality of logical broadcast domains, wherein the signal packets are transmitted as if the plurality of logical broadcast domains are not separate,
    wherein the implementing of the network hop comprises:
        receiving the signal packets transmitted from the first network device;
        terminating encapsulation of the signal packets;
        re-encapsulating the signal packets; and
        forwarding the re-encapsulated signal packets to the second network device;
    rendering a display of a graphical user interface (GUI) so that a menu of one or more features is displayed, wherein the one or more features comprise one or more of resources, services and/or applications not included in the stored configuration; and
    in response to a manipulation of the GUI for selecting at least one of the one or more features, transmitting a command via the Internet for deploying the selected at least one of the one or more features to be added to the plurality of logical broadcast domains.

2. The method of claim 1, wherein the resources, services and/or applications comprise one or more of virus scanning, URL filtering, deep packet inspection, intrusion detection, intrusion prevention and/or data loss prevention services, or any combination thereof.

3. The method of claim 1, wherein the resources, services and/or applications comprise one or more of additional memory, a service area network, additional processing capability, unified communication services, and/or private email services, or any combination thereof.

4. The method of claim 1, wherein the resources, services and/or applications comprise providing information about the network.

5. The method of claim 4, wherein the providing information about the network comprises providing one or more of network inventory, network business activity analysis, network traffic analysis, and/or geo-location information, or any combination thereof.

6. The method of claim 1, wherein the resources, services and/or applications comprise providing browser access to files and/or folders or providing network access control (NAC), or both.

7. The method of claim 1, wherein the deploying the selected at least one of the one or more features includes deploying the selected at least one of the one or more features without human intervention.

8. A system for managing a network comprising a plurality of logical broadcast domains, wherein the system is for use with a first network device in one of the plurality of logical broadcast domains, for use with a second network device in another of the plurality of logical broadcast domains, and for use with a third device, the system comprising:
    a tunnel server;
    a controller to provision the tunnel server, wherein the controller and the tunnel server are outside the plurality of logical broadcast domains; and
    a non-transitory memory to store a configuration of the plurality of logical broadcast domains;
    wherein the tunnel server to implement a network hop for signal packets transmitted between the first network device and the second network device, wherein the signal packets to be transmitted as if the plurality of logical broadcast domains are not separate,
    wherein to implement the network hop includes:
        to receive the signal packets transmitted from the first network device;
        to terminate encapsulation of the signal packets;
        to re-encapsulate the signal packets; and
        to forward the re-encapsulated signal packets to the second network device;
    wherein the third device to render a display of a graphical user interface (GUI) so that a menu of one or more features is displayed, wherein the one or more features comprise one or more of resources, services and/or applications not included in the stored configuration; and
    wherein the third device further to transmit a command via the Internet in response to a manipulation of the GUI for selecting at least one of the one or more features, wherein the command is to deploy the selected at least one of the one or more features to be added to the plurality of logical broadcast domains.

9. The system of claim 8, wherein the resources, services and/or applications comprise one or more of virus scanning, URL filtering, deep packet inspection, intrusion detection, intrusion prevention and/or data loss prevention services, or any combination thereof.

10. The system of claim 8, wherein the resources, services and/or applications comprise one or more of additional memory, a service area network, additional processing capability, unified communication services, and/or private email services, or any combination thereof.

11. The system of claim 8, wherein the resources, services and/or applications comprise providing information about the network.

12. The system of claim 11, wherein the providing information about the network comprises providing one or more of network inventory, network business activity analysis, network traffic analysis, and/or geo-location information, or any combination thereof.

13. The system of claim 8, wherein the resources, services and/or applications comprise providing browser access to files and/or folders or providing network access control (NAC), or both.

14. The system of claim 8, wherein to deploy the selected at least one of the one or more features includes to deploy the selected at least one of the one or more features without human intervention.

15. An article for managing a network comprising a plurality of logical broadcast domains, wherein the article is for use with a tunnel server outside of the plurality of logical broadcast domains, wherein the article further is for use with a first network device in one of the plurality of logical broadcast domains and a second network device in another of the plurality of logical broadcast domains, and wherein the article further is for use with a third device, wherein the article comprises a non-transitory storage medium having stored thereon instructions executable by a controller outside of the plurality of logical broadcast domains, and wherein the instructions are executable by the controller to:

store a configuration of the plurality of logical broadcast domains;

provision the tunnel server to implement a network hop for signal packets transmitted between the first network device and the second network device, wherein the signal packets are to be transmitted as if the plurality of logical broadcast domains are not separate, wherein to implement the network hop includes to:

receive the signal packets transmitted from the first network device;

terminate encapsulation of the signal packets;

re-encapsulate the signal packets; and forward the re-encapsulated signal packets to the second network device;

wherein the instructions further are executable by the controller to send instructions to cause the third device to:

render a display of a graphical user interface (GUI) so that a menu of one or more features is displayed, wherein the one or more features comprise one or more of resources, services and/or applications not included in the stored configuration; and in response to a manipulation of the GUI for selecting at least one of the one or more features, transmit a command via the Internet, wherein the command is to deploy the selected at least one of the one or more features to be added to the plurality of logical broadcast domains.

16. The article of claim 15, wherein the resources, services and/or applications comprise one or more of virus scanning, URL filtering, deep packet inspection, intrusion detection, intrusion prevention and/or data loss prevention services, or any combination thereof.

17. The article of claim 15, wherein the resources, services and/or applications comprise one or more of additional memory, a service area network, additional processing capability, unified communication services, and/or private email services, or any combination thereof.

18. The article of claim 15, wherein the resources, services and/or applications comprise providing information about the network.

19. The article of claim 18, wherein the providing information about the network comprises providing one or more of network inventory, network business activity analysis, network traffic analysis, and/or geo-location information, or any combination thereof.

20. The article of claim 15, wherein the resources, services and/or applications comprise providing browser access to files and/or folders or providing network access control (NAC), or both.

21. The article of claim 15, wherein to deploy the selected at least one of the one or more features includes to deploy the selected at least one of the one or more features without human intervention.

* * * * *